(12) United States Patent
Tago et al.

(10) Patent No.: US 9,465,860 B2
(45) Date of Patent: Oct. 11, 2016

(54) STORAGE MEDIUM, TRIE TREE GENERATION METHOD, AND TRIE TREE GENERATION DEVICE

(75) Inventors: Shinichiro Tago, Kawasaki (JP); Tatsuya Asai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/137,818

(22) Filed: Sep. 14, 2011

(65) Prior Publication Data

US 2012/0005234 A1    Jan. 5, 2012

Related U.S. Application Data

(63) Continuation of application No. PCT/JP2009/055521, filed on Mar. 19, 2009.

(51) Int. Cl.
    *G06F 17/30* (2006.01)
(52) U.S. Cl.
    CPC .............. *G06F 17/30625* (2013.01)
(58) Field of Classification Search
    None
    See application file for complete search history.

(56) References Cited

U.S. PATENT DOCUMENTS

| | | | |
|---|---|---|---|
| 2006/0020638 A1* | 1/2006 | Shadmon | 707/200 |
| 2007/0094313 A1* | 4/2007 | Bolotin | 707/205 |
| 2007/0150497 A1* | 6/2007 | De La Cruz et al. | 707/101 |
| 2008/0114765 A1* | 5/2008 | Asai et al. | 707/7 |
| 2008/0270435 A1* | 10/2008 | Furusho | 707/101 |

FOREIGN PATENT DOCUMENTS

| | | |
|---|---|---|
| AU | 60999/90 | 4/1991 |
| EP | 1 063 827 A2 | 12/2000 |
| JP | 59-47669 | 3/1984 |
| JP | 3-122766 | 5/1991 |
| JP | 11-7451 | 1/1999 |
| JP | 2000-324172 | 11/2000 |

OTHER PUBLICATIONS

International Search Report for PCT/JP2009/055521, mailed Apr. 21, 2009.
"Radix Tree", Wikipedia. http://ja.wikipedia.org/wiki%E5%9F%BA%E6%95%B0%E6%9C%A8 Mar. 17, 2009.
Kenshin Yamada et al., "Address Resolution Engine for IP Routing", Technical Report of IEICE, Sep. 24, 1998, vol. 98, No. 297, pp. 1-6.

* cited by examiner

*Primary Examiner* — Yuk Ting Choi
(74) *Attorney, Agent, or Firm* — Staas & Halsey LLP

(57) ABSTRACT

A retrieval device according to the present embodiment associates one tag key with one node and removes a node not having a tag key when a trie tree generating unit generates a trie tree. Moreover, because a tag key having a low priority is registered in a node close to a root node when the trie tree generating unit registers tag keys in the nodes of the trie tree, the retrieval device can narrow down a node region that is a comparison target when a trie tree searching unit performs a retrieval process.

12 Claims, 52 Drawing Sheets

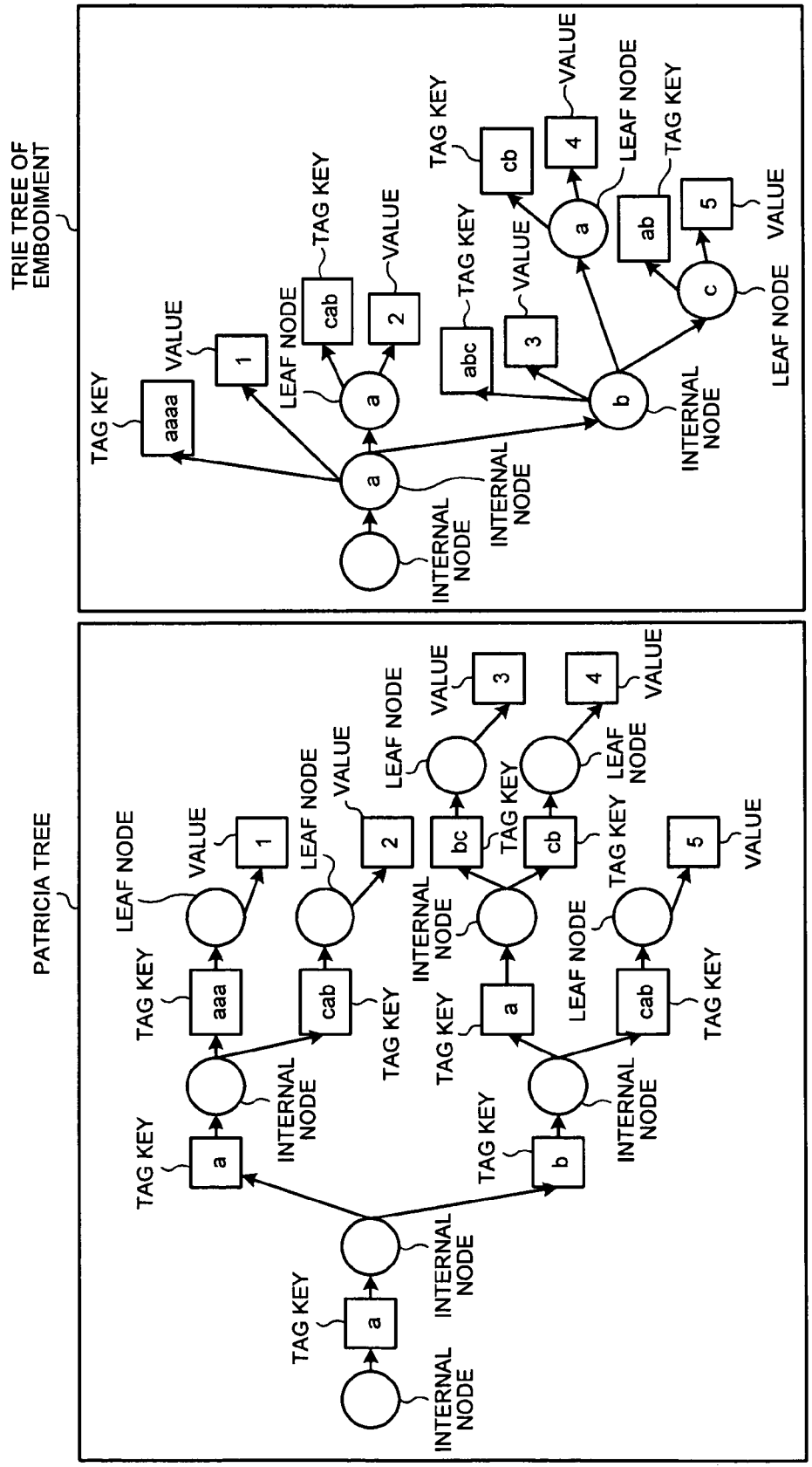

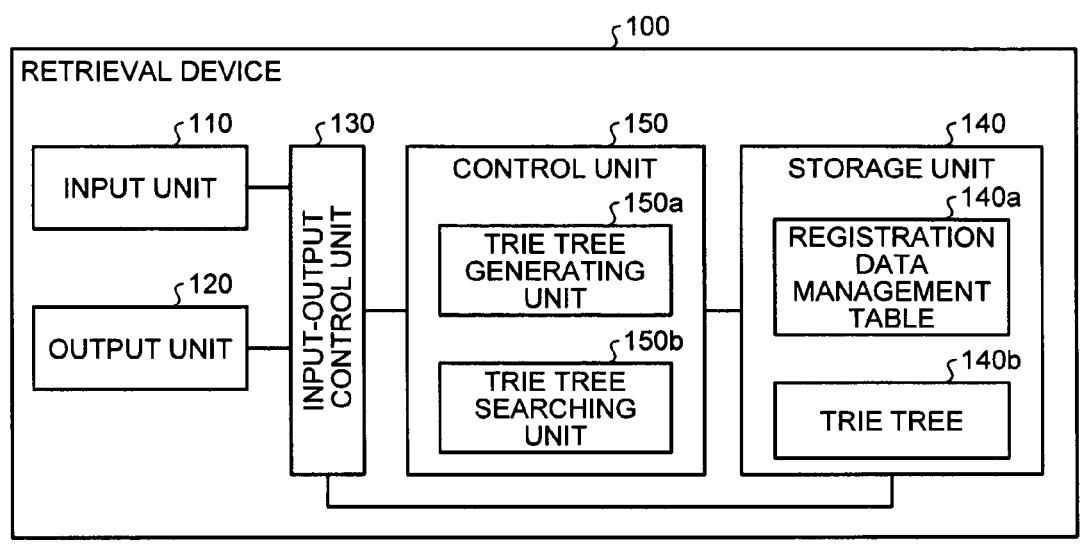

STORAGE MEDIUM, TRIE TREE GENERATION METHOD, AND TRIE TREE GENERATION DEVICE

CROSS-REFERENCE TO RELATED APPLICATION

This application is a continuation of International Application No. PCT/JP2009/055521, filed on Mar. 19, 2009, the entire contents of which are incorporated herein by reference.

FIELD

The embodiment discussed herein is directed to a trie tree generation device and a trie tree generation method that are used for performing various types of processes by using a trie tree.

BACKGROUND

A document retrieval system uses a trie tree in order to retrieve a desired document, value, or the like from a key at high speed. The technique has been known as disclosed in, for example, Japanese Laid-open Patent Publication No. 59-47669 and Japanese Laid-open Patent Publication No. 11-7451. FIG. 55 is a diagram illustrating an example of a conventional trie tree. The trie tree constructs a tree structure by assigning one node per one character with respect to nodes excluding a root node. The trie tree illustrated in FIG. 55 indicates that values "1, 3, 4, 5, 3, 2, and 1" are respectively assigned to keys "black, green, blue, grey, black, grey, and greenyellow".

When a conventional retrieval device performs a retrieval process on a trie tree, the retrieval device takes out characters from an input key one by one and traces the nodes of the same key on the trie tree. For example, when the input key "blue" is designated, the retrieval device traces the nodes of the trie tree in order of b, l, u, and e, and detects "4" assigned to "blue".

Meanwhile, the trie tree illustrated in FIG. 55 has a problem in that the number of nodes increases and thus an amount of used memory increases when the trie tree has a long key. Moreover, there is a problem in that the number of nodes to be compared during a retrieval process increases and thus a retrieval process completion time increases when a key is long.

Therefore, in order to solve the problems on the trie tree, a trie tree called a Patricia tree is devised. The technique has been known as disclosed in, for example, "Radix tree" [online] [Retrieval on Mar. 17, 2009], Internet <ja.wikipedia.org/wiki/%E5%9F%BME6%95%B0%E6%9C%A8 (To avoid URL, "http://" has been omitted)>. FIG. 56 is a diagram illustrating an example of a Patricia tree. The Patricia tree expresses an edge part, through which a node is transited to another node, by using a character string instead of a character, in order to reduce an amount of used memory. In this case, the Patricia tree illustrated in FIG. 56 indicates that values "1, 3, 4, 5, 3, 2, and 1" are assigned to keys "black, green, blue, grey, black, grey, and greenyellow".

When the conventional retrieval device performs a retrieval process on a trie tree, the retrieval device sequentially compares an input key with the character strings of edge parts to trace the Patricia tree. For example, when the input key "blue" is designated, the retrieval device traces the edge parts of the Patricia tree in order of bl and ue, and detects "4" assigned to "blue".

However, although the Patricia tree described above can solve a problem on an amount of used memory as compared to a normal trie tree, there is a problem in that an amount of used memory increases when a key has many characters because a node is created for each predetermined character string.

SUMMARY

According to an aspect of an embodiment of the invention, a non-transitory computer-readable storage medium stores therein a program causing a computer to execute a process storing a trie tree in which nodes corresponding to predetermined characters are connected in accordance with a tree structure, reading out, when a new character string is registered in the trie tree, characters of the new character string in sequence from a head thereof to trace nodes included in the trie tree in accordance with characters corresponding to the nodes; and adding a new node below any of the traced nodes or a leaf node arriving in accordance with the new character string to register the new character string in the node in such a manner that a single character string is registered for a single node.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a diagram illustrating an amount of used memory according to the data structure of the conventional Patricia tree and an amount of used memory according to the trie tree of the present embodiment when an amount of memory is reduced by using the technique illustrated in FIGS. 6 and 8;

FIG. 10 is a diagram illustrating the configuration of the retrieval device according to the present embodiment;

FIG. 11 is a diagram illustrating an example of a data structure of a registration data management table according to the present embodiment;

DESCRIPTION OF EMBODIMENT

Preferred embodiments of the present invention will be explained with reference to accompanying drawings.

The present invention is not limited to the embodiments explained below.

Embodiment

Figure 1:
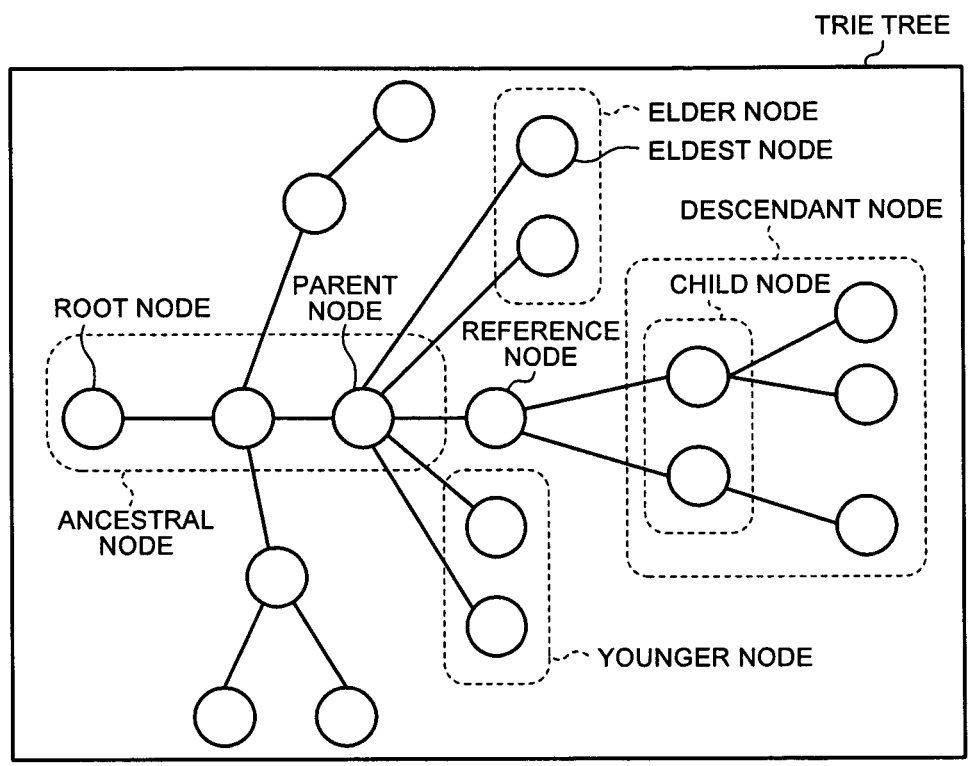
FIG. 1 is a diagram explaining a term of a node included in a tree structure.

First, it will be explained about a term of a node included in a tree structure before a retrieval device according to the present embodiment is explained. FIG. 1 is a diagram explaining a term of a node included in a tree structure. As illustrated in FIG. 1, a node that is located in the highest layer is defined as a root node among nodes that constitutes a trie tree. Moreover, a node that is directly located in a layer above a reference node and is connected to the reference node is defined as a parent node for the reference node (simply, parent node). Furthermore, a node that is directly located in a layer below the reference node and is connected to the reference node is defined as a child node for the reference node (simply, child node).

A node that is located in the same layer as that of the reference node, is connected to the same parent node as that of the reference node, and is located at the upper side of the reference node is defined as an elder node for the reference node (simply, elder node). Moreover, a node that is located in the same layer as that of the reference node, is connected to the same parent node as that of the reference node, and is located at the lower side of the reference node is defined as a younger node for the reference node (simply, younger node). Furthermore, nodes from a root node to a parent node are defined as an ancestral node in a mass. Furthermore, nodes connected below the reference node are defined as a descendant node in a mass.

Figure 2:
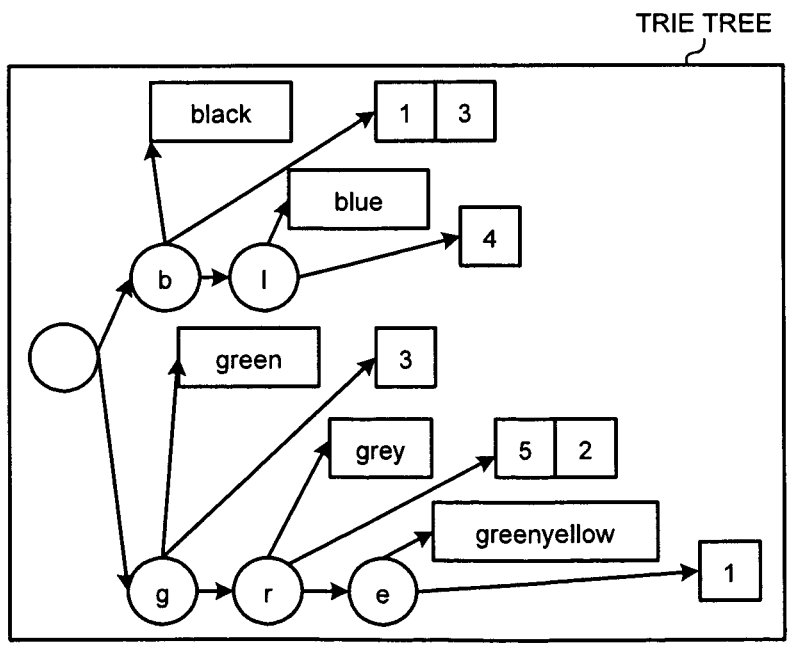
FIG. 2 is a schematic diagram (1) explaining a retrieval device according to the present embodiment.
Figure 3:
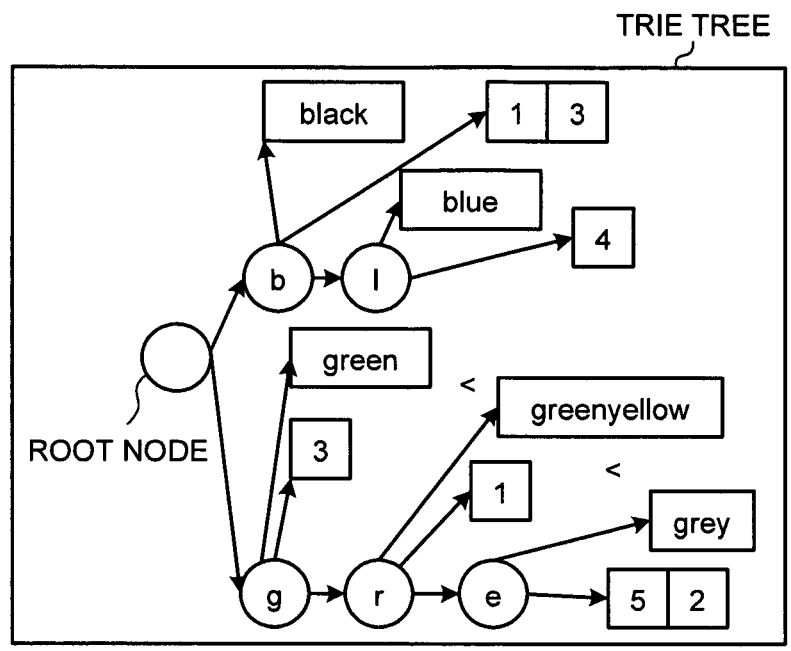
FIG. 3 is a schematic diagram (2) explaining the retrieval device according to the present embodiment.

Next, it will be explained about the brief of the retrieval device according to the present embodiment. FIGS. 2 and 3 are schematic diagrams explaining the retrieval device according to the present embodiment. First, as illustrated in FIG. 2, when a trie tree is generated on the basis of the designated key, the retrieval device according to the present embodiment assigns one key to one node. In the following explanation, a key assigned to a node is expressed as a tag key. In FIG. 2, tag keys "black, blue, green, grey, and greenyellow" are respectively assigned to nodes "b, l, g, r, and e". Moreover, values "1, 3", "4", "3", "5, 2", and "1" are respectively assigned to the nodes "b, l, g, r, and e".

Figure 55:
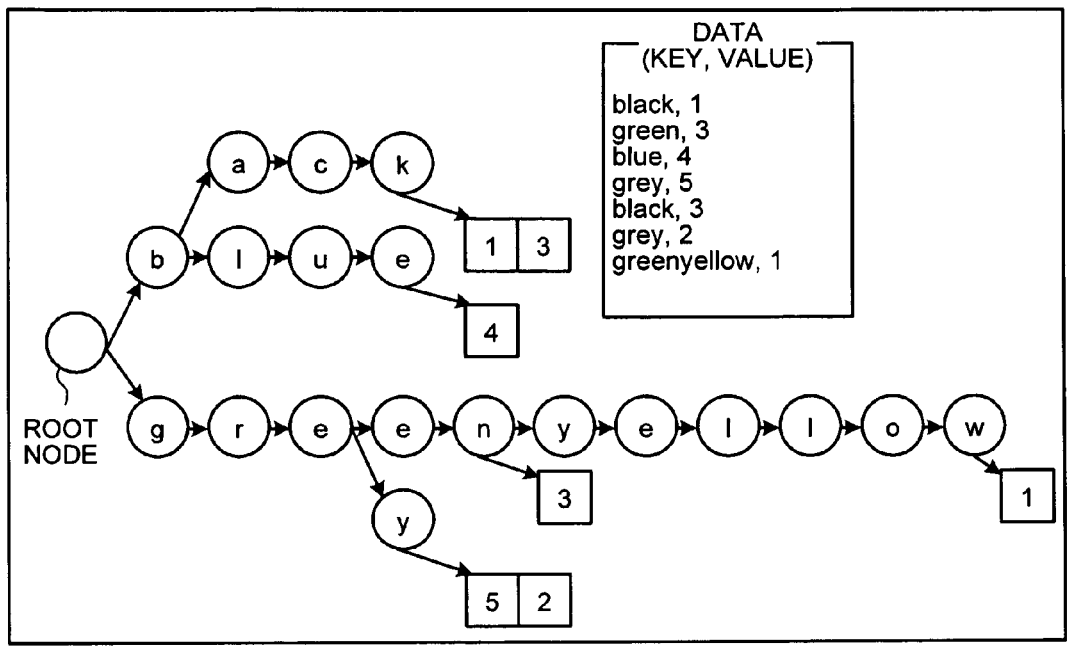
FIG. 55 is a diagram illustrating an example of a conventional trie tree.
Figure 56:
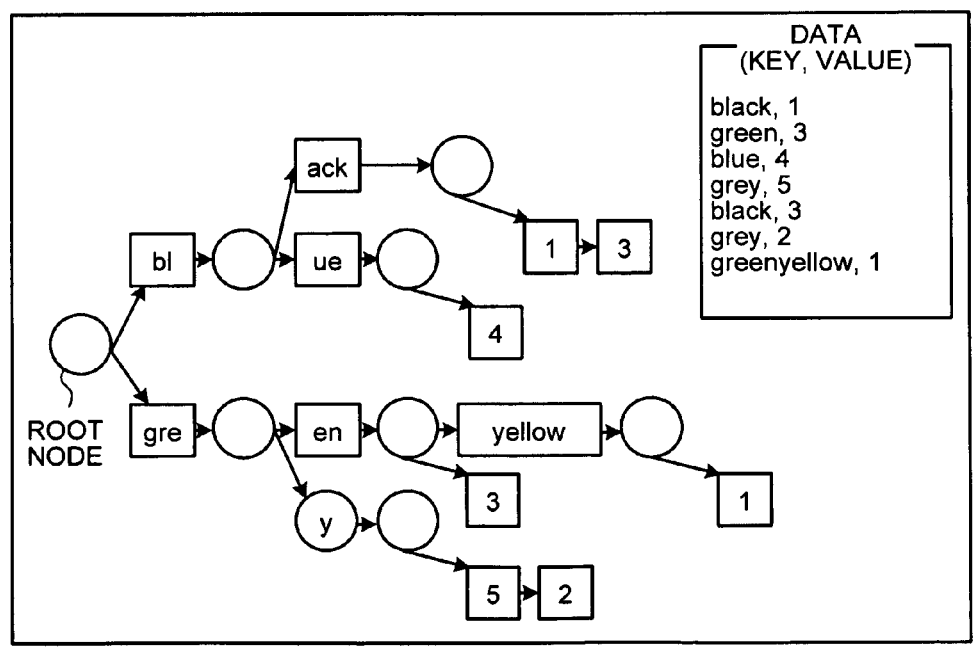
FIG. 56 is a diagram illustrating an example of a Patricia tree.

In the trie tree illustrated in FIG. 2, values "1, 3, 4, 5, 3, 2, and 1" are respectively assigned to the tag key "black, green, blue, grey, black, grey, and greenyellow" in the same way as in the trie tree illustrated in FIG. 55 or the Patricia tree illustrated in FIG. 56. However, unlike with the trie tree and the Patricia tree illustrated in FIGS. 55 and 56, the trie tree according to the present embodiment does not have a node that does not have data because one tag key is associated with one node, and thus memory utilization efficiency can be raised. Moreover, because the trie tree according to the present embodiment does not increase the number of nodes in the trie tree even if a node has many characters, an amount of used memory can be suppressed.

However, because one tag key is assigned to one node, the trie tree according to the present embodiment does not determine whether an input key hits a tag key if it does not actually refer to the tag key registered in a node. For example, in the trie tree illustrated in FIG. 2, when nodes are traced in accordance with the first character "b" of an input key "blue", the transition first moves from the root node to the node "b". At the transition point to the node "b", it cannot be determined whether the input key hits the tag key. Actually, at the time point at which the input key is compared with the tag key "black" of the node "b", it can be determined that the input key does not hit the tag key.

Then, the node is transited to the node "l" in accordance with the second character "l". Because it can be determined that the input key is identical with the tag key after the input key "blue" is compared with the tag key "blue" of the node "l", the value "4" added to the node "l" is detected as a detection result. Therefore, when tag keys are respectively assigned to nodes at random, an input key is sequentially compared with the tag keys of nodes that are transited in accordance with the input key, and thus processing efficiency cannot be improved.

In order to solve such a problem, as illustrated in FIG. 3, the retrieval device according to the present embodiment constructs the trie tree in such a manner that tag keys are arranged in depth first order. In this way, when tag keys are arranged in depth first order, processing efficiency can be improved because nodes having tag keys to be compared with an input key during retrieval of data can be narrowed down. When the trie tree is constructed in such a manner that keys are arranged in depth first order, the retrieval device determines the priority of each key and assigns a key that has a smaller priority to a node closer to a root node.

When determining a priority, the retrieval device extracts characters of each key in sequence from the head until a different character is detected. In this case, in alphabetical order among the extracted characters, a character closer to "a" has a smaller priority and a character closer to "z" has a larger priority. In other words, a priority is "a<b<c<d<e<f<g<h<i<j<k<l<m<n<o<p<q<r<s<t<u<v<w<x<y<z". It may be said that character strings having the same priority are the same character string.

For example, when the tag keys "black" and "blue" are compared, different characters are extracted at the third character. Specifically, "a" is extracted from "black" and "u" is extracted from "blue". Then, when "a" and "u" are compared, "u" has a priority larger than that of "a". Therefore, "black" having a small priority is assigned to a node closer to the root node than "blue".

Moreover, when "green" and "greenyellow" are compared, different characters are extracted at the sixth character. Specifically, because the sixth character does not exist in "green", "null" is extracted from "green" and "y" is extracted from "greenyellow". In such a case, the retrieval device determines that the key "greenyellow" from which a null is not extracted has a priority larger than that of "green". Therefore, "green" having a small priority is assigned to a node closer to the root node than "greenyellow".

In the present embodiment, when a plurality of child nodes is directly connected to the same parent node, a key having a small priority is arranged at an elder node and a key having a large priority is arranged at a younger node. For example, when "black" and "green" are compared, different characters are extracted at the first character. Specifically, "b" is extracted from "black" and "g" is extracted from "green". Then, when "b" and "g" are compared, "g" has a priority larger than that of "b". Therefore, "black" having a small priority is arranged in an elder node than "green". As illustrated in FIG. 2, when the tag keys are assigned, a priority size relation between the tag key of a parent node having child nodes and the tag keys of brother nodes is like "a key of a parent node<a key of an eldest node<a key of a second node<a key of a third node< . . . ". Moreover, a node located at the lower location has a larger priority. For example, in FIG. 3, the priority of the key of the node "e" is larger than those of the nodes "r" and "g".

As illustrated in FIG. 3, when the tag keys are arranged at the nodes, the location of an input key to be retrieved can be narrowed down from a relationship between the priority of the input key and the priority of the tag key. This means that it is enough simply to search a tag key that has the same priority as that of an input key. In other words, among nodes that are traced in accordance with the characters of an input key, it is not required to compare the input key with the tag keys of nodes (descendant node) after a node having a priority larger than that of the input key and also to compare the input key with the tag keys of nodes (ancestral node) before a node having a priority smaller than that of the input key.

Herein, when the nodes of the trie tree are traced by reading out the characters of the input key one-by-one from the head, a node to arrive at finally is defined as an arrival node. Moreover, among nodes having an elder node from the root node to the arrival node, a node having a key having the largest priority is defined as a specific node. In this case, when a node having an elder node does not exist, the child node of the root node is defined as a specific node.

When the retrieval device according to the present embodiment retrieves the tag key identical with an input key, it is enough that any node among nodes from an arrival node to a specific node is a retrieval object. When a tag key identical with an input key does not exist among nodes to be retrieved, it can be determined that a tag key identical with the input key does not exist even if the other tag keys are not referred to.

This reason is that the key priority of the parent node of a specific node is smaller than the key priority of the elder node and the key priority of the elder node is smaller than the priority of the input key (registration target) belonging to the key string of the younger node (specific node). Furthermore, this reason is that it is decided that the priority of the input key is larger than the priority of the tag key of the elder node side at the time point at which the input key traces the younger node.

In the following explanation, nodes from an arrival node to a specific node are referred to as comparison target nodes. When a key identical with an input key is retrieved, it is only necessary that the retrieval device executes a comparison process on the tag keys of the comparison target nodes.

Figure 4:
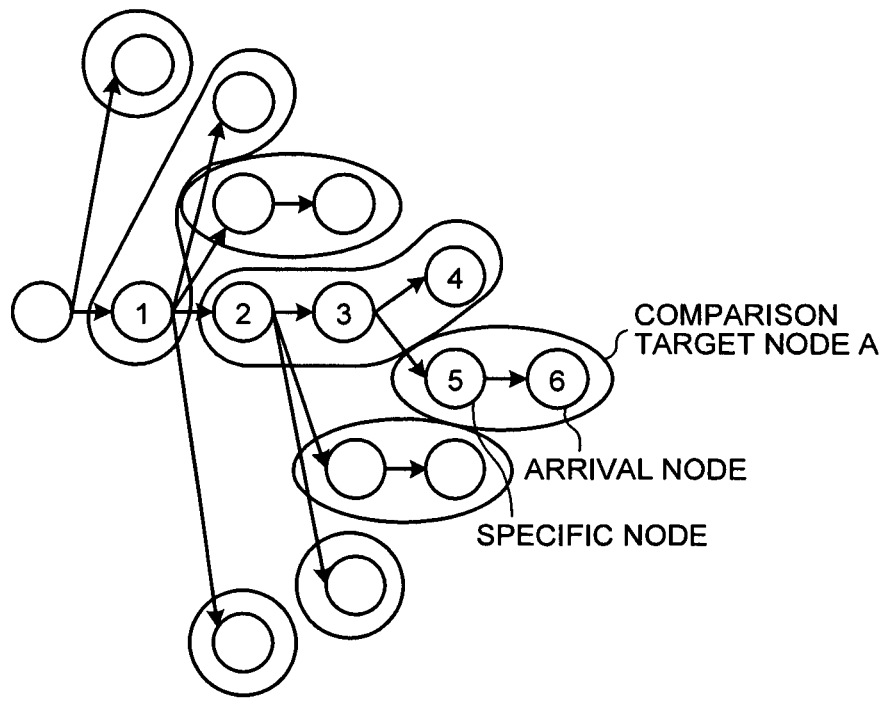
FIG. 4 is a diagram explaining a comparison target node.

FIG. 4 is a diagram explaining comparison target nodes. When it finally arrives at node "6" by reading out input keys one-by-one from the head, it is only necessary that the retrieval device compares the tag keys of the nodes "5 and 6" included in a comparison target node A with the input key.

Figure 5:
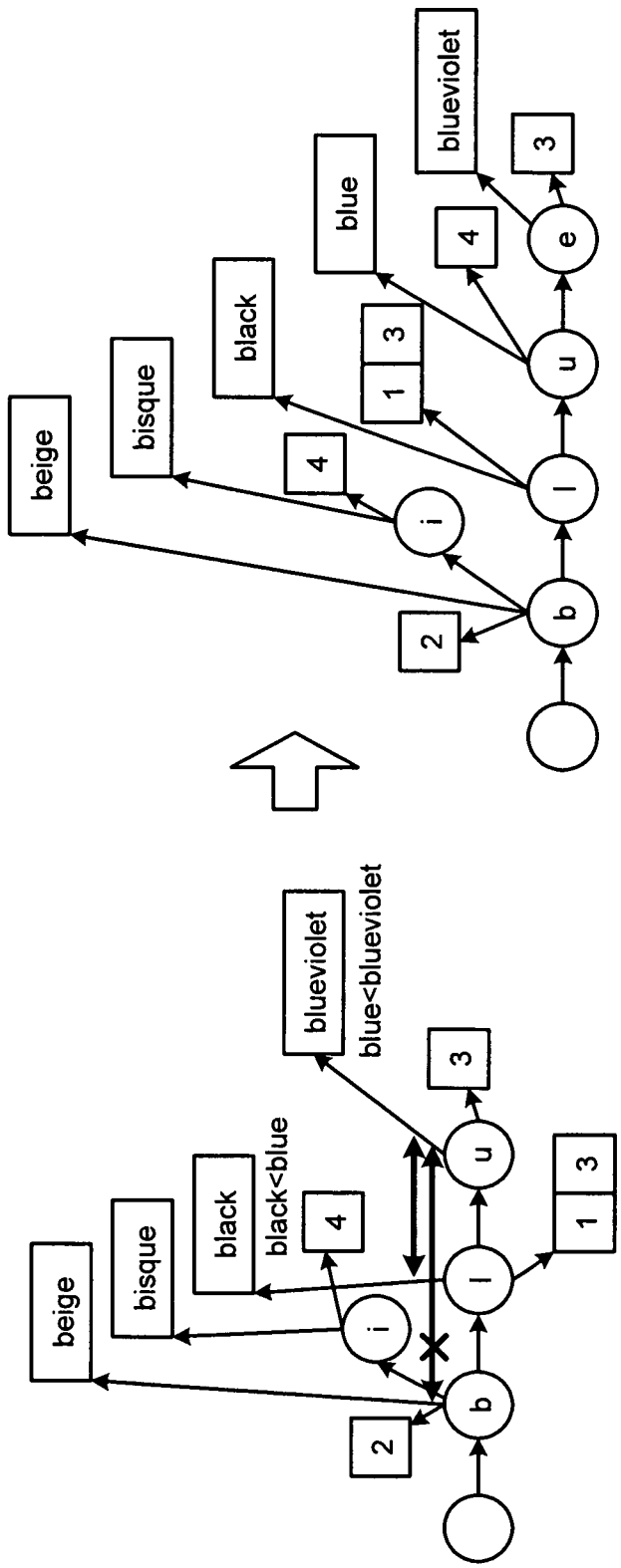
FIG. 5 is a diagram explaining a process for registering a new key in a trie tree.

Next, it will be explained about the case where the retrieval device according to the present embodiment registers a new key in a trie tree. FIG. 5 is a diagram explaining a process for registering a new key in a trie tree. When a new key is constructed in a trie tree, it is only necessary that the retrieval device performs a comparison process for comparing the new key with the tag key of a comparison target node and registers the new key in the trie tree in accordance with its priority.

It is specifically explained with reference to FIG. 5. A trie tree illustrated at the left side of FIG. 5 respectively assigns keys "beige, bisque, black, and blueviolet" to nodes "b, i, l, and u". Moreover, the trie tree respectively assigns values "2", "4", "1, 3", and "3" to the node "b, i, l, and u".

When the retrieval device adds a key "blue" and a value "4" to the trie tree illustrated at the left side of FIG. 5, an arrival node becomes "node u" and a specific node becomes "node l". Therefore, comparison target nodes become the node "l", the node "u", and (a node to be connected to below the node "u").

When the keys "blueviolet" and "black" connected to the registration target node are compared with "blue", the priority of the key "blue" is smaller than that of "blueviolet" and is larger than that of "black". Therefore, it is only necessary that "blue" is registered between the node having "blueviolet" and the node having "black". In this case, as illustrated at the right side of FIG. 5, the key "blue" and the value "4" are assigned to the node "u" and a node "e" is created below the node "u". The "blueviolet" and the value "3" are assigned to the node "e".

Figure 6:
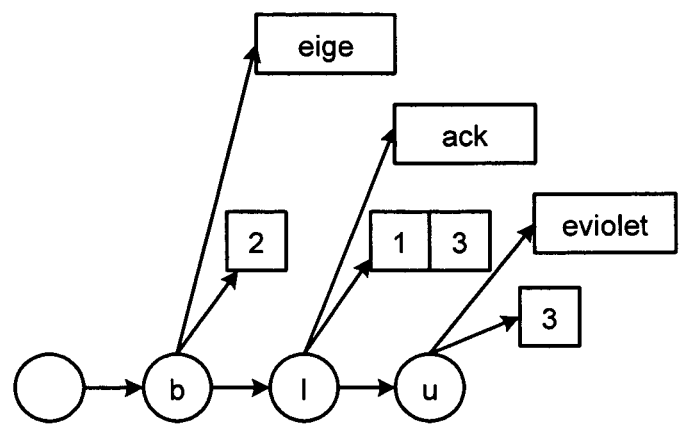
FIG. 6 is a diagram illustrating an example of a trie tree in which a tag key not having a trie-part key is saved.

Meanwhile, the retrieval device according to the present embodiment maintains a tag key that is add to a node as a tag in the format in which the key of a trie part is deleted, in order to further reduce an amount of used memory of the trie tree. FIG. 6 is a diagram illustrating an example of a trie tree that maintains tag keys in the format in which the key of a trie part is deleted.

For example, a tag key "ack" is registered in the node "l". This has the same meaning as the case where the tag key "black" is registered in the node "l". Because the keys of trie parts from the root node to the node "l" are "b, l", the sum of the trie parts and the tag key becomes "black".

Because the character string of the tag key becomes small by taking the data structure such as for example FIG. 6, the size of the tag key to be compared with the input key can be reduced. Moreover, like FIG. 6, each node may have only a pointer for a tag key without having the data of the tag key on the trie tree. Furthermore, all the tag key data are maintained and a character position at which comparison is started may be changed.

Figure 7:
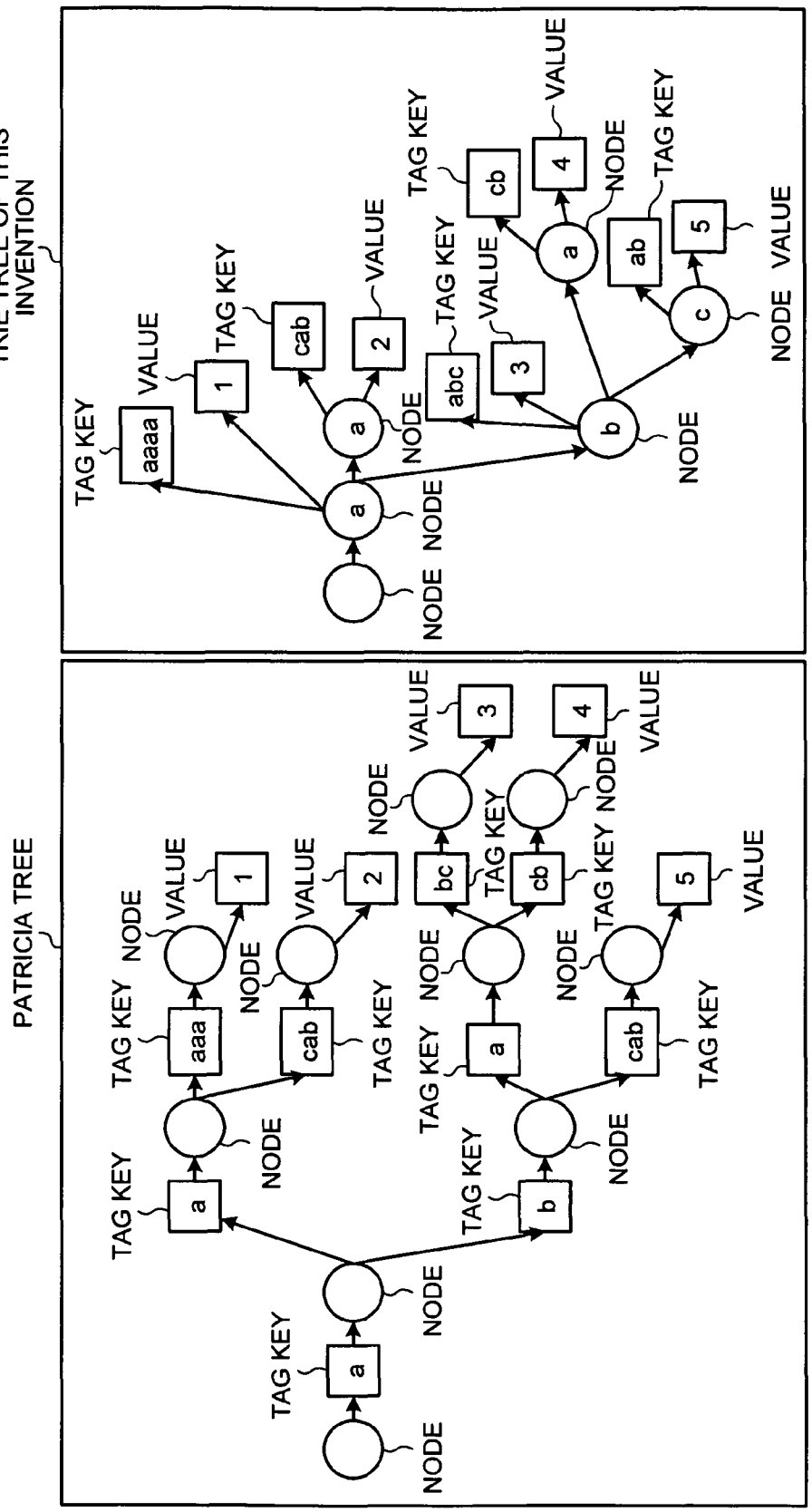
FIG. 7 is a diagram (1) illustrating an amount of used memory according to a data structure of a conventional Patricia tree and an amount of used memory according to a trie tree of the present invention.

FIG. 7 is a diagram illustrating an amount of used memory according to a data structure of a conventional Patricia tree and an amount of used memory according to the trie tree of the present invention. Both of the Patricia tree and the trie tree assign "1, 2, 3, 4, and 5" respectively to keys "aaaaa, aacab, ababc, abacb, and abcab".

Herein, assuming that a node memory is 1 kilobyte, a tag key memory is 1 byte, and a value memory is 4 bytes, the total memory is about 10 kilobytes because the Patricia tree has 10 nodes, 17 characters of the tag keys, and 5 values. On the other hand, because the trie tree according to the present invention has 6 nodes, 16 characters of the tag keys, and 4 values, the total memory is about 6 kilobytes. Therefore, the trie tree according to the present invention can reduce an amount of used memory as compared to the conventional Patricia tree.

Figure 8:
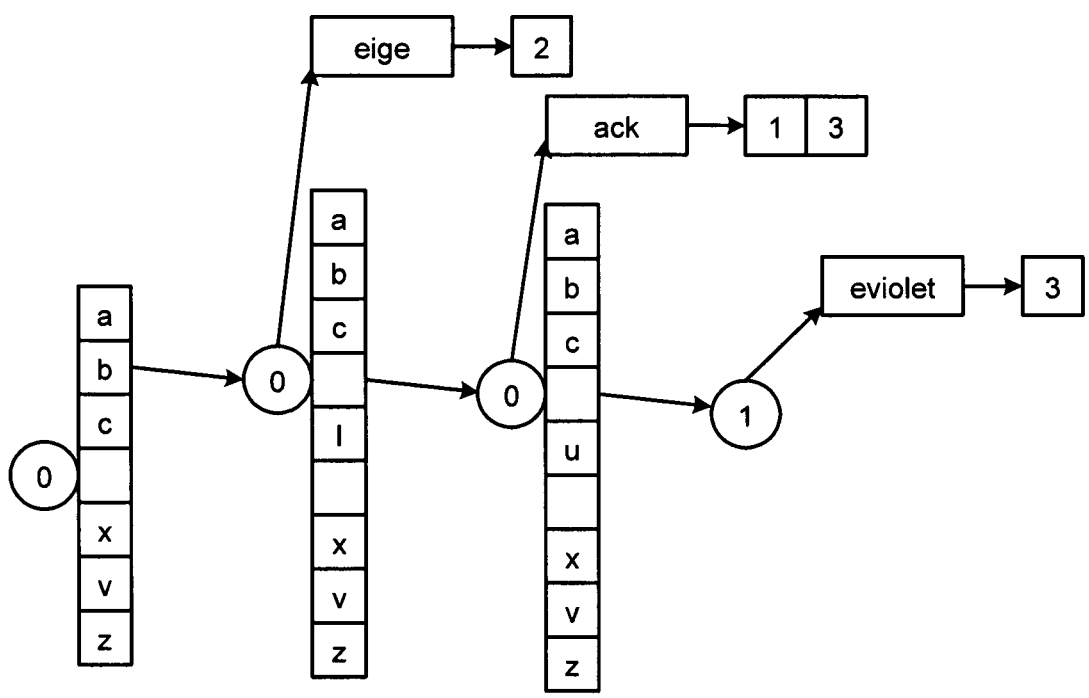
FIG. 8 is a diagram illustrating a trie tree when a pointer array is deleted from a leaf node.

The retrieval device according to the present embodiment may delete a pointer array from a leaf node corresponding to a terminal node of the trie tree. Herein, a pointer array is an array of a pointer that indicates a destination node. FIG. 8 is a diagram illustrating a trie tree when a pointer array is deleted from a leaf node. In this way, an amount of used memory of leaf nodes can be reduced by deleting a pointer array from the leaf node.

FIG. 9 is a diagram illustrating an amount of used memory according to the data structure of the conventional Patricia tree and an amount of used memory according to the trie tree of the present embodiment when an amount of memory is reduced by using the technique illustrated in FIGS. 6 and 8.

Herein, assuming that an internal node memory is 1 kilobyte, a leaf node memory is 12 bytes, a memory per one character of a key is 1 byte, and a value memory is 4 bytes, the total memory becomes about 5 kilobytes because the Patricia tree has 5 internal nodes, 5 leaf nodes, 17 characters of the key, and 5 values. On the other hand, because the trie tree of the present embodiment has 3 internal memory, 3 leaf nodes, 19 characters of a key, and 5 values, the total memory becomes about 3 kilobytes. In this way, even if an amount of used memory is reduced by using the technique of FIGS. 8 and 9, the trie tree according to the present embodiment can further reduce an amount of used memory as compared to the Patricia tree.

Next, it will be explained about the configuration of the retrieval device according to the present embodiment. FIG. 10 is a diagram illustrating the configuration of the retrieval device according to the present embodiment. As illustrated in FIG. 10, a retrieval device 100 includes an input unit 110, an output unit 120, an input-output control unit 130, a storage unit 140, and a control unit 150.

Herein, the input unit 110 is a unit that inputs information such as an input key, and corresponds to a keyboard, a mouse, a microphone, or the like. The output unit 120 is a unit that outputs information such as a retrieval result that is obtained by using the trie tree, and corresponds to a monitor, a display, a touch panel, or the like. The input-output control unit 130 is a processing unit that controls the input and output of data that is performed by the input unit 110, the output unit 120, the storage unit 140, and the control unit 150.

The storage unit 140 is a unit that stores therein data and programs used for various types of processes that are performed by the control unit 150. The storage unit 140 includes a registration data management table 140a and a trie tree 140b.

Herein, the registration data management table 140a is a table that stores a key and a value to be registered in the trie tree in association with each other. FIG. 11 is a diagram illustrating an example of the data structure of the registration data management table 140a according to the present embodiment. As illustrated in FIG. 11, the registration data management table 140a stores a key and a value in association with each other.

Figure 12:
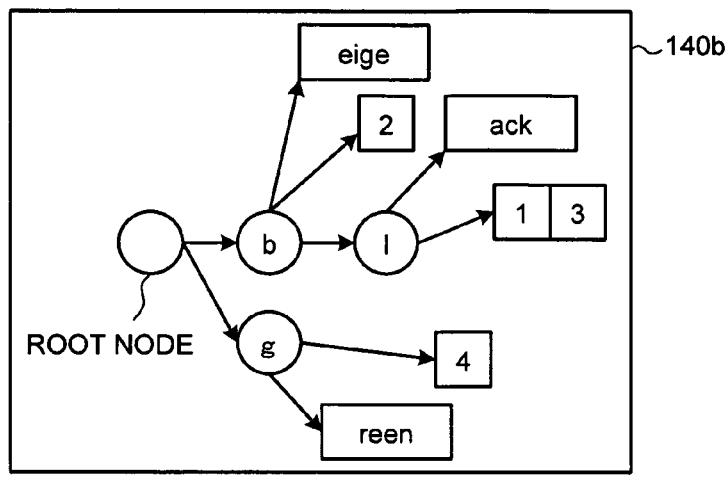
FIG. 12 is a diagram illustrating an example of a data structure of a trie tree.

The trie tree 140b is a tree that is generated on the basis of the registration data management table 140a. FIG. 12 is a diagram illustrating an example of the data structure of a trie tree. As an example, a trie tree corresponding to the registration data management table 140a of FIG. 11 is illustrated in FIG. 12. As illustrated in FIG. 12, nodes "b" and "g" are connected to the root node and a node "l" is connected to the node "b".

Moreover, a tag key "eige" and a value "2" are connected to the node "b". A tag key "ack" and values "1, 3" are connected to the node "l". A tag key "reen" and a value "4" are connected to the node "g".

Figure 13A:
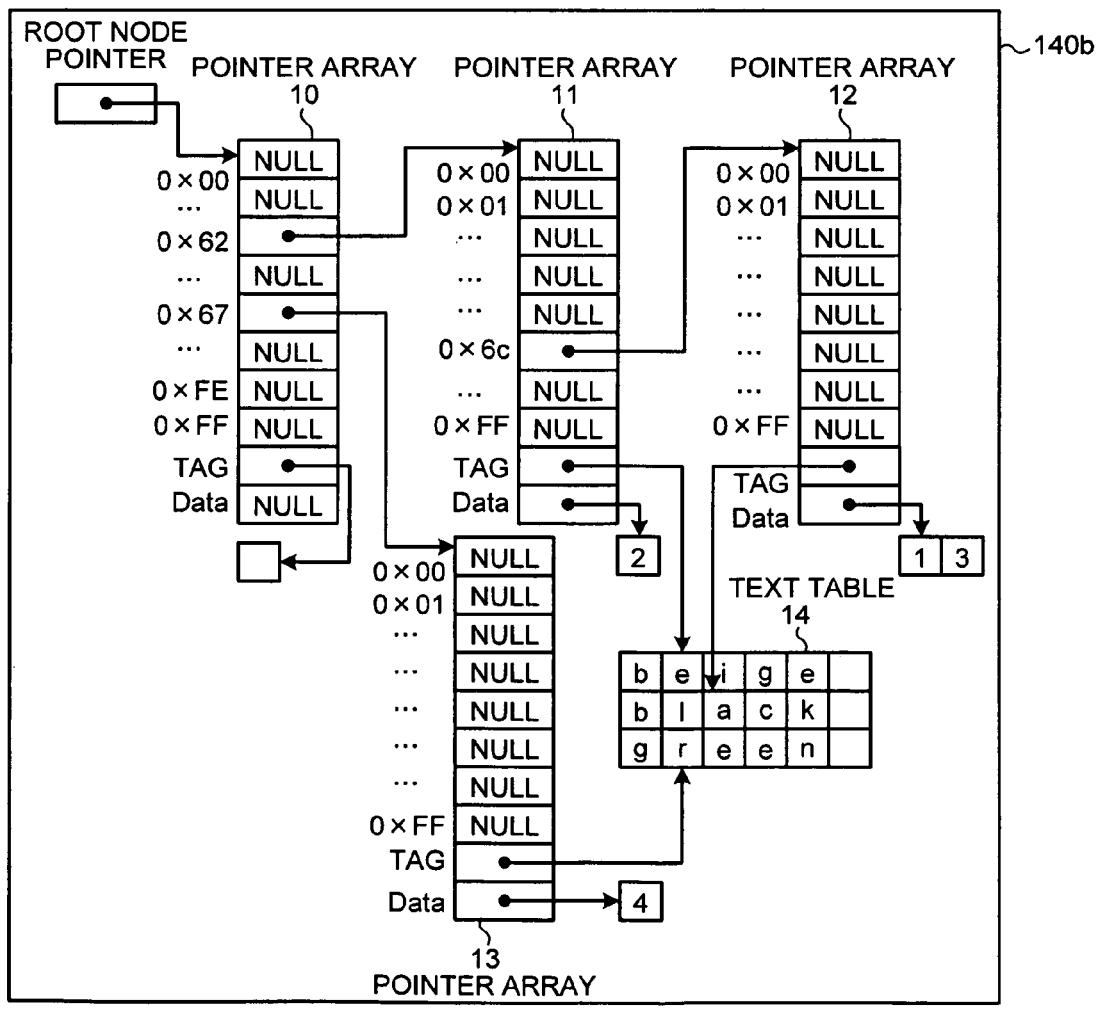
FIG. 13A is a diagram illustrating an example of a data structure when the trie tree illustrated in FIG. 12 is expressed with real data.

The real data format of the trie tree illustrated in FIG. 12 is a data structure illustrated in FIG. 13A. FIG. 13A is a diagram illustrating an example of a data structure when the trie tree illustrated in FIG. 12 is expressed with real data. As illustrated in FIG. 13A, the trie tree 140b has pointer arrays 10 to 13 and a text table 14.

Herein, the pointer array 10 connected to a root node pointer corresponds to the root node of FIG. 12, the pointer array 11 corresponds to the node "b" of FIG. 12, and the pointer array 12 corresponds to the node "l" of FIG. 12. Moreover, the pointer array 13 corresponds to the node "g" of FIG. 12.

Each of the pointer arrays 10 to 13 has "TAG" and "Data" areas. The "TAG" area is associated with the character of the text table 14 to express a tag key connected to its node. For example, because the pointer array 11 is connected to "e" of the text table 14, a character string "eige" from "e" to the front of the next null is designated as a tag key. Moreover, the "Data" is associated with a value to express a value connected to its node. For example, the pointer array 11 is connected to the value "2".

Each the pointer array has key numbers (pointers) "0x00 to 0xFF" for determining pointer arrays that are connected below the pointer array. For example, a key number "0x62" is connected to the pointer array 11 and a key number "0x67" are connected to the pointer array 13.

Figure 13B:
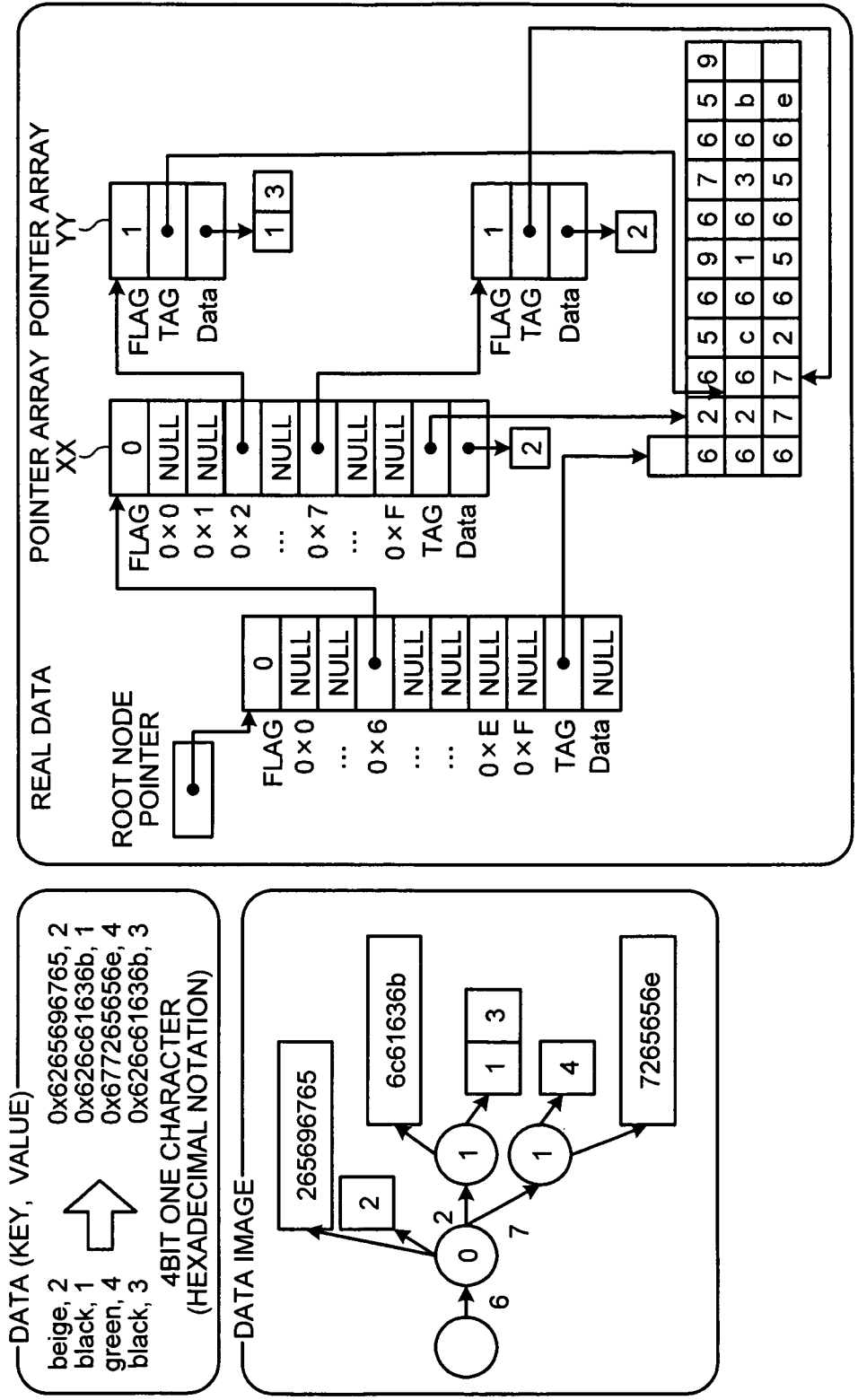
FIG. 13B is a diagram illustrating an example of the other data structure of the trie tree.

The data structure of real data of the trie tree 140b illustrated in FIG. 13A indicates that one node has eight bits corresponding to one character of an ASCII code. However, the present invention is not limited to this. For example, one node may have four bits by dividing an ASCII code of one character by two to be a four-bit unit. In that case, the number of the key numbers of the pointer array is 256 of "0x00 to 0xFF" in the case of eight bits. On the other hand, the number of the key numbers can be reduced to 16 of "0x0 to 0xF" in the case of four bits, and thus an amount of used memory can be reduced. FIG. 13B is a diagram illustrating an example of the other data structure of the trie tree 140b.

For example, in the case of "beige", the pointer array is connected to the pointer array 11 at the first key number "0x62" in the case of eight bits per one node. In the case of four bits per one node, the pointer array is connected to a pointer array XX of FIG. 13B at "0x6" of the first half part of "0x62" as the first key number. Moreover, when "black" is next added in addition to "beige", the pointer array is connected to the pointer array 12 at the second key number "0x6c" in the case of eight bits per one node. However, in the case of four bits per one node, the pointer array is connected to a pointer array YY of FIG. 13B at "0x2" of the latter half part of "0x62" as the second key number. In this case, the pointer array YY is "0x62", that is a node indicative of "b", which is obtained by adding the key number "0x6" for connection to the pointer array XX and the key number "0x2" for connection to the pointer array YY. Furthermore, when "blue" is next added, the pointer array is connected to the next pointer array at the key number "0x75" of the third character "u" in the case of eight bits per one node. However, in the case of four bits per one node, the pointer array is connected to the next pointer array at "0x6" of the first half part of the key number "0x6c" of the second character "l" as the third key number.

In the case of a multi-byte character such as a Japanese code, several bytes are treated as one character. At this time, it is not assumed that one node has 16 bits. It is assumed that one node has eight bits or four bits by dividing one character by two or more.

The present computer cannot directly designate a bit position and take out a bit stream. However, the computer can specifies a byte position including a desired bit stream from a bit position, take out a single byte, and take out a desired bit stream by using a bit processing operation. Similarly, the computer can take out a character string that indicates a tag key.

Alternatively, because all key number areas of a pointer array corresponding to a leaf node are null, a part (key number area) of the pointer array can be omitted for simplification. In this case, each the pointer array has a flag that indicates whether its own pointer array is a leaf node.

Returning to the explanation of FIG. 10, the control unit 150 has an internal memory that stores programs and control data that define various types of processing procedures, and executes various processes by using them. As illustrated in FIG. 10, the control unit 150 includes a trie tree generating unit 150a and a trie tree searching unit 150b.

The trie tree generating unit 150a is a processing unit that generates the trie tree 140b on the basis of the keys registered in the registration data management table 140a. As explained in FIGS. 2 and 3, the trie tree generating unit 150a constructs the trie tree 140b by assigning one key to one node. Moreover, when a tag key is registered in a node, the trie tree generating unit 150a generates the trie tree in such a manner that tag keys are arranged in depth first order.

Figure 14:
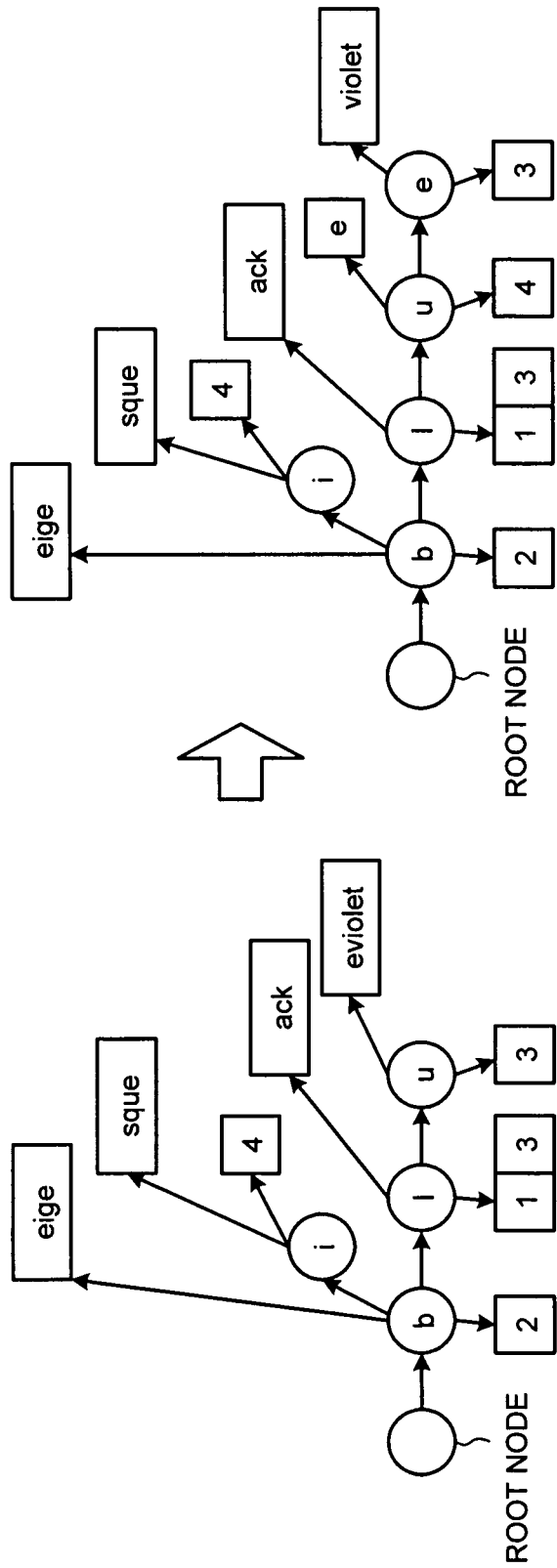
FIG. 14 is a schematic diagram explaining a trie tree generation process that is performed by a trie tree generating unit.

FIG. 14 is a schematic diagram explaining a process for generating the trie tree 140b that is performed by the trie tree generating unit 150a. Herein, for convenience of explanation, it will be explained about the case where the input key "blue" and the value "4" are registered in the trie tree illustrated at the left side of FIG. 14. In the trie tree illustrated at the left side of FIG. 14, tag keys are assigned to all nodes in the state where the keys of trie parts are deleted, similarly to the trie tree described in FIG. 6.

First, the trie tree generating unit 150a takes out characters from an input key one-by-one and traces nodes on the trie tree. In the middle of the trace, the trie tree generating unit 150a does not compare the input key and the tag keys. When the input key is "blue", the trie tree generating unit 150a takes out characters from the head of "blue" one-by-one. When the trie tree generating unit traces nodes on the trie tree, the nodes are transited in order of the root node, the nodes "b", "l", and "u".

Next, when a node to be traced does not exist or after all the nodes of the input key are traced, the trie tree generating unit 150a retrieves a key smaller than the input key while returning a node to a node having an elder node or a child node of the root node. In other words, the trie tree generating unit 150a retrieves a tag key having a smaller priority than that of the input key in the comparison target nodes. In addition, when the priorities of the input key and the tag key are compared, the remaining key obtained by excluding the key of the trie part from the input key is compared with the tag key.

When the input key is "blue", comparison is performed in order of the node "u" and the node "l" because comparison target nodes are the nodes "u" and "l". The input key "blue" has a priority smaller than that of the tag key "violet" of the node "l" and has a priority larger than that of "ack". In addition, when the priorities of the input key "blue" and the tag key "violet" are compared, the comparison is performed after the key "blue" of the trie part from the root node to the node "u" is removed from the input key "blue". Moreover, when the priorities of the input key "blue" and the tag key "ack" are compared, the comparison is performed after the key "bl" of the trie part from the root node to the node "l" is removed from the input key "blue".

The trie tree generating unit 150a registers the input key and the value corresponding to the input key in a node having a tag key having the minimum priority among tag keys having a larger priority than that of the input key, and shifts the tag key that is already registered.

When the input key is "blue", the trie tree generating unit 150a registers the input key "blue" and the value "4" in the node "u". Because the key of the trie part from the root node to the node "u" is "blu", the tag key "e" is actually registered in the node "u". Moreover, in order to shift the tag key "blueviolet" registered in the node "u", the trie tree generating unit 150a creates a new node "e" below the node "u" and registers the tag key "blueviolet" in it. Because the key of the trie part reaching the node "e" is "blue", the tag key "violet" is actually registered in the node "e". The trie tree illustrated at the right side of FIG. 14 is generated by executing the registration process as described above. Furthermore, the trie tree generating unit 150a may register identification information to identify a node having an elder node. For example, because the node "l" has an elder node "i" at the right side of FIG. 14, the trie tree generating unit 150a registers identification information in the node "l".

Now, it will be specifically explained about a process for generating a trie tree that is performed by the trie tree generating unit 150a. FIGS. 15 to 24 are diagrams explaining a process for generating a trie tree. Herein, for convenience of explanation, it will be explained about the case where a trie tree is generated in the order of a key "http://aaa.aaa/e/", a value "1", a key "http://aaa.aaa/e/c/", a value "2", a key "http://aaa.aaa/e/c/", a value "3", and a key "http://aaa.aaa/e/", a value "4".

Figure 15:
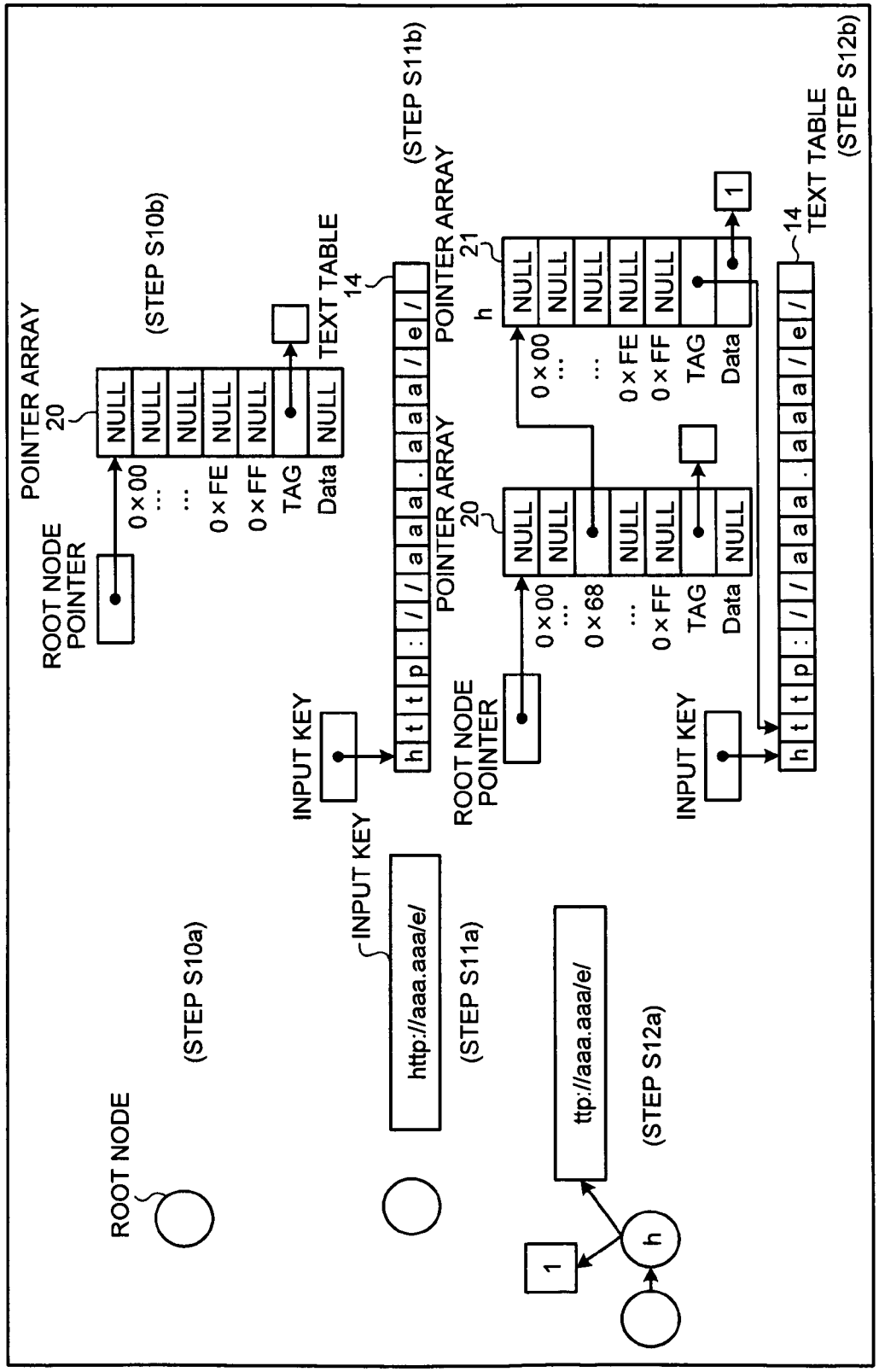
FIG. 15 is a diagram (1) explaining the trie tree generation process.

As illustrated in FIG. 15, it will be first explained about the case where the key "http://aaa.aaa/e/" and the value "1" are added in the state where a node does not exist. The trie tree generating unit 150a generates a root node (Step S10a). The trie tree generating unit 150a generates a pointer array 20 corresponding to the root node on real data, and connects a root node pointer to the pointer array 20. Moreover, because the pointer array 20 corresponds to the root node, "TAG" is connected to null (Step S10b).

The trie tree generating unit 150a prepares an input key "http://aaa.aaa/e/" (Step S11a). The trie tree generating unit 150a stores the input key "http://aaa.aaa/e/" in the text table 14 on real data, and connects the pointer of the input key to the first column "h" of the text table 14 (Step S11b).

Because a child node of which the key is the initial character "h" of the input key "http://aaa.aaa/e/" does not exist, the trie tree generating unit 150a refers to the root node. Herein, because the root node does not a tag key, the priority of the input key "http://aaa.aaa/e/" becomes larger than that of the tag key of the root node.

The trie tree generating unit 150a creates a node of which the key is "h" below the root node, and connects a remaining key obtained by excluding the character "h" from the input key "http://aaa.aaa/e/" to the node "h" as a tag key. The trie tree generating unit 150a further connects the value "1" of the input key "http://aaa.aaa/e/" to the node "h" (Step S12a).

The trie tree generating unit 150a generates a pointer array 21 corresponding to the node "h" on real data, and connects the pointer array 20 and the pointer array 21 through the key number "0x68" of the pointer array 20. Moreover, the trie tree generating unit 150a connects "TAG" of the pointer array 21 to the second column "t" of the text table 14, and connects "Data" of the pointer array 21 to the value "1" (Step S12b).

Figure 16:
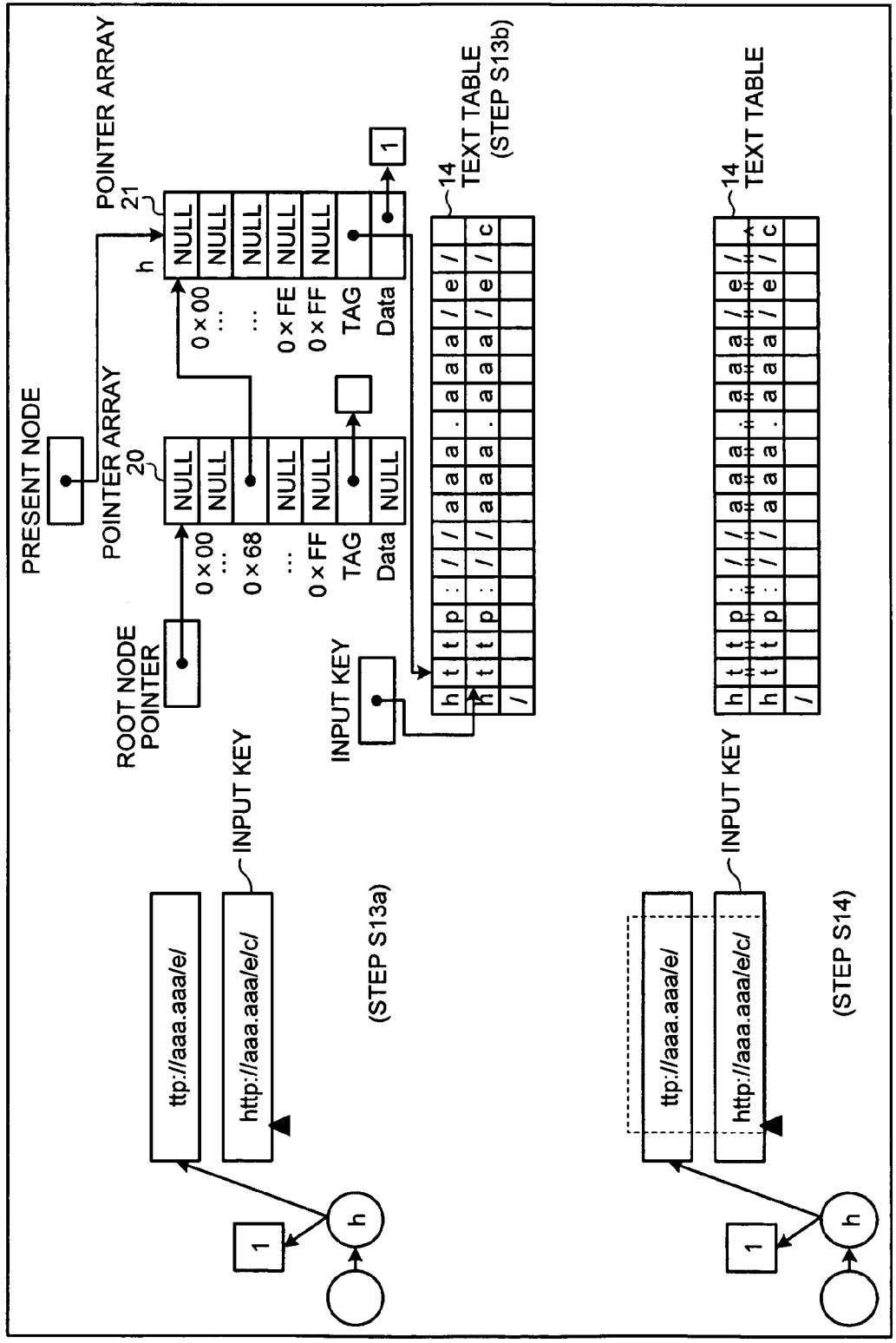
FIG. 16 is a diagram (2) explaining the trie tree generation process.

Next, referring to FIG. 16, it will be explained about the case where the key "http://aaa.aaa/e/c/" and the value "2" are added to the trie tree created at Steps S12a and S12b. The trie tree generating unit 150a traces nodes from the root node to the node "h" at the initial character "h" of the input key "http://aaa.aaa/e/c/". Then, the trie tree generating unit 150a advances the input key "http://aaa.aaa/e/c/" by one pointer and sets the pointer to the second character "t" (Step S13a).

The trie tree generating unit 150a registers the key "http://aaa.aaa/e/c/" in the text table 14 on real data after one space of the key "http://aaa.aaa/e/" finally registered in the text table 14. Then, the trie tree generating unit 150a connects the pointer of the input key to the second row and second column character "t" of the text table 14 (Step S13b).

Because the node "h" does not have a child node that uses "t" as a key, the trie tree generating unit 150a compares the priority of the tag key "ttp://aaa.aaa/e/" of the node "h" and the priority of the input key "ttp://aaa.aaa/e/c/" obtained by removing the trie part "h". Then, because the 17th character of the input key is "c" and the 17th character of the tag key is null, the priority of the input key is larger than that of the tag key (Step S14). Therefore, the input key "ttp://aaa.aaa/e/c/" is registered in a node after the node "h".

Figure 17:
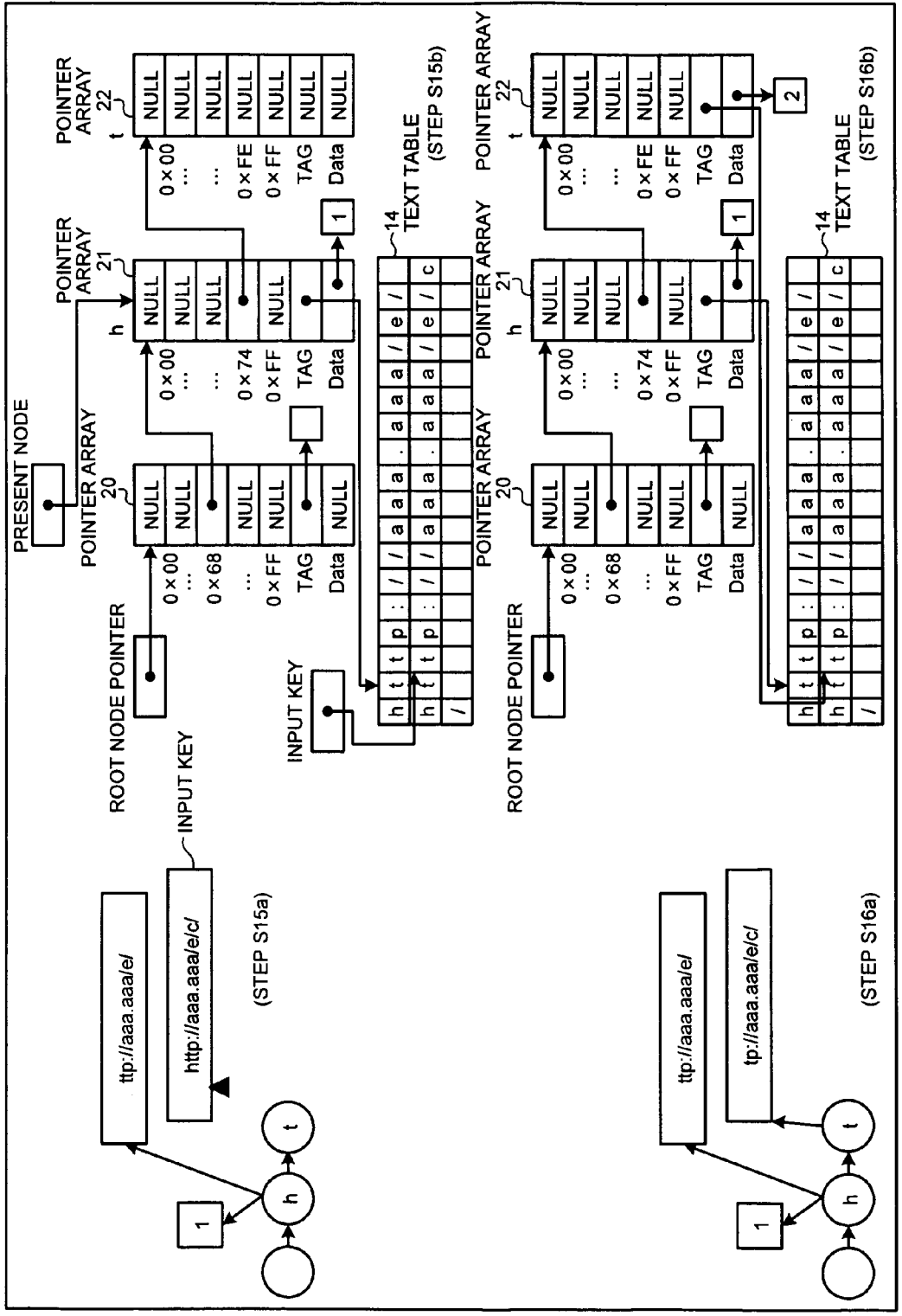
FIG. 17 is a diagram (3) explaining the trie tree generation process.

Next, referring to FIG. 17, the trie tree generating unit 150a generates a new node "t" by using the second character "t" of the input key "http://aaa.aaa/e/c" as a key, and advances the pointer of the input key to the third character "t" (Step S15a).

The trie tree generating unit 150a generates a pointer array 22 corresponding to the node "t" on real data, and connects the pointer array 21 and the pointer array 22 through the key number "0x74" of the pointer array 21. Moreover, the trie tree generating unit 150a advances the input key by one pointer, and connects the pointer of the input key to the second row and third column character "t" of the text table 14 (Step S15b).

The trie tree generating unit 150a registers, as a tag key, a remaining key "tp://aaa.aaa/e/c" obtained by excluding the trie part "ht" from the input key "http://aaa.aaa/e/c" in the node "t" created at Step S15a (Step S16a).

The trie tree generating unit 150a connects "TAG" of the pointer array 22 to the second row and third column character "t" of the text table 14 on real data, and connects "Data" of the pointer array 22 to the value "2" (Step S16b).

Figure 18:
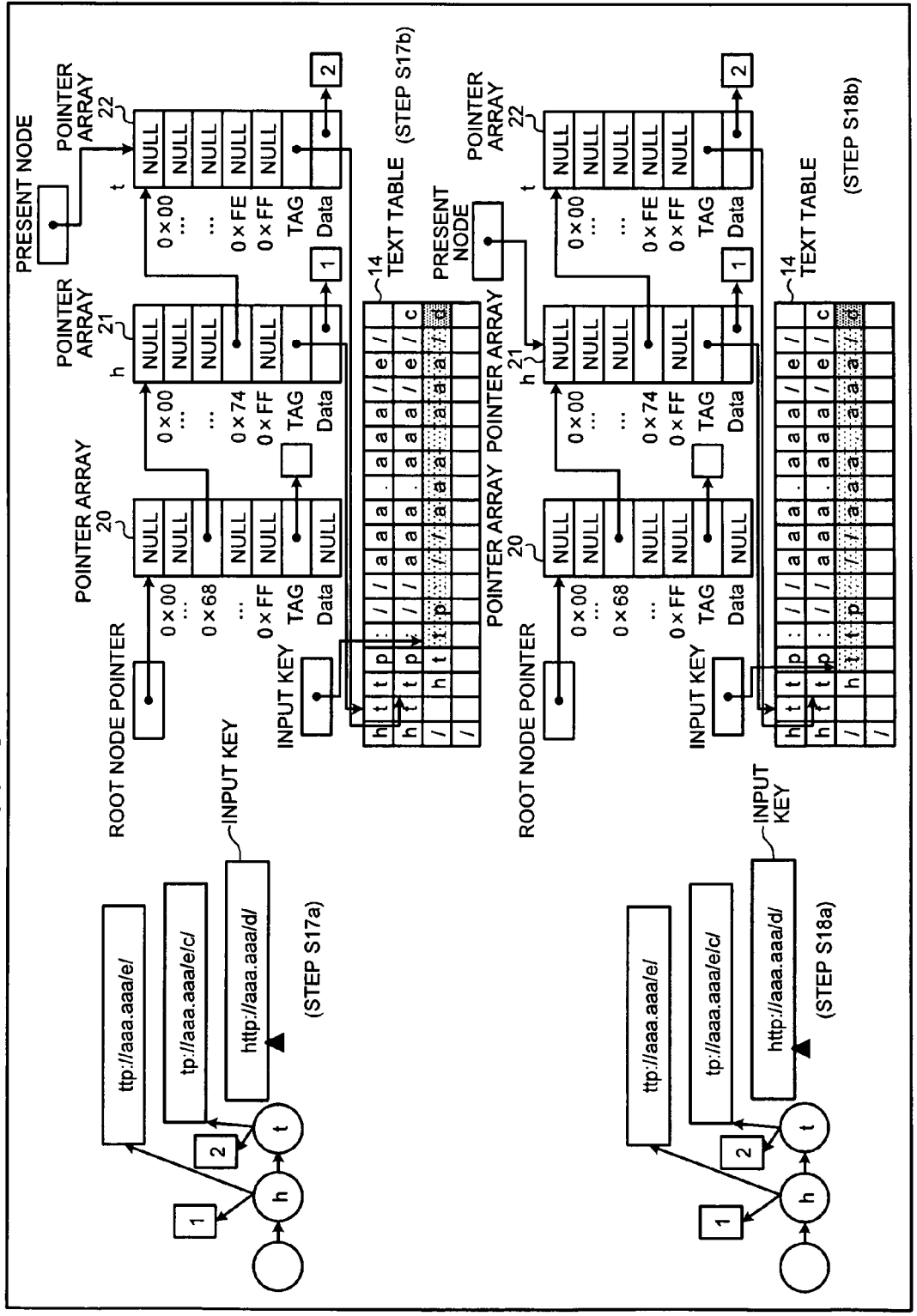
FIG. 18 is a diagram (4) explaining the trie tree generation process.

Next, referring to FIG. 18, it will be explained about the case where the input key "http://aaa.aaa/d/" and the value "3" are added to the trie tree created at Steps S16a and S16b. The trie tree generating unit 150a takes out characters from the initial character of the input key "http://aaa.aaa/d/" one-by-one, and traces nodes in order of the nodes "h" and "t" over the trie tree. Then, the trie tree generating unit 150a advances the input key "http://aaa.aaa/d/" by two pointers in accordance with the number of the traced nodes, and sets the pointer to the second character "t".

Then, because the node "t" does not have a child node that uses "t" as a key, the trie tree generating unit 150a compares the priority of the tag key "tp://aaa.aaa/e/c" of the node "t" and the priority of the input key "tp://aaa.aaa/d/" obtained by removing the trie part "ht". Then, because the 14th character of the tag key is "e" and the 14th character of the input key is "d", the priority of the tag key becomes larger than that of the input key (Step S17a).

The trie tree generating unit 150a registers the key "http://aaa.aaa/d/" on real data after one space of the key "http://aaa.aaa/e/c" finally registered in the text table. Then, the trie tree generating unit 150a connects the pointer of the input key to the third row and fifth column character "t" of the text table 14. Moreover, when a character string of which the head is a character connected to "TAG" of the pointer array 22 is sequentially compared with a character string of which the head is a character connected to the pointer of the input key, the priority of the tag key becomes larger than that of the input key because the 14th character of the tag key is "e" and the 14th character of the input key is "d" (Step S17b).

The trie tree generating unit 150a returns the pointer of the input key "http://aaa.aaa/d/" by one pointer to set the pointer to the second character "t", and moves to the node "h" that is the parent node of the node "t". Then, the trie tree generating unit 150a compares the priority of the tag key "ttp://aaa.aaa/e/c" of the node "h" and the priority of the input key "ttp://aaa.aaa/d/" obtained by removing the trie part "h". Then, because the 15th character of the tag key is "e" and the 15th character of the input key is "d", the priority of the tag key becomes larger than that of the input key (Step S18a).

The trie tree generating unit 150a connects the pointer of the input key to the third row and fourth column character "t" of the text table 14 on real data. Moreover, when a character string of which the head is a character connected to "TAG" of the pointer array 22 is sequentially compared with a character string of which the head is a character connected to the pointer of the input key, the priority of the tag key becomes larger than that of the input key because the 15th character of the tag key is "e" and the 15th character of the input key is "d" (Step S18b).

Figure 19:
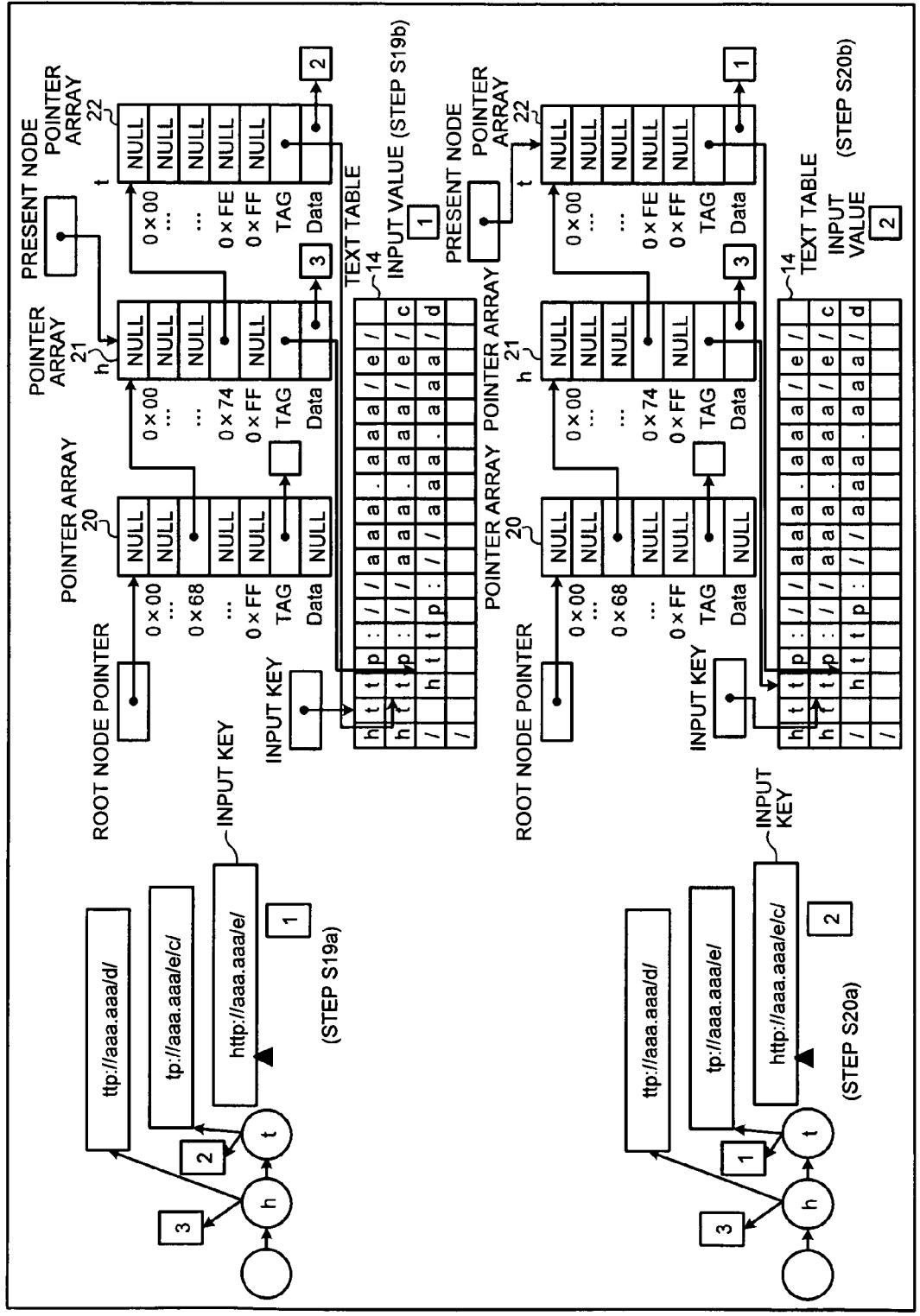
FIG. 19 is a diagram (5) explaining the trie tree generation process.

Next, referring to FIG. 19, because the parent node of the node "h" is the root node, the trie tree generating unit 150a exchanges the data (tag key, value) of the node "h" for input data (input key, value). In other words, the trie tree generating unit 150a registers the remaining key "ttp://aaa.aaa/d/" obtained by removing the trie part "h" from the input key "http://aaa.aaa/d/" in the tag key of the node "h". The trie tree generating unit 150a further registers the value "3" corresponding to the input key "http://aaa.aaa/d/" in the node "h". Moreover, the trie tree generating unit 150a adds the trie part "h" to the head of the tag key "ttp://aaa.aaa/e/" registered in the node "h" and takes out the result as the input key. Moreover, the trie tree generating unit 150a also takes out the value "1" associated with the tag key "ttp://aaa.aaa/e/" (Step S19a).

The trie tree generating unit 150a exchanges the data (tag key, value) of the node "h" for the input data (input key, value) on real data. In other words, the trie tree generating unit 150a connects "TAG" of the pointer array 21 corresponding to the node "h" to the third row and fourth column character "t" of the text table 14. The trie tree generating unit 150a further connects "Data" of the pointer array 21 to the value "3". Then, the trie tree generating unit 150a connects the pointer of the input key to the first row and second column character "t" of the text table 14. Moreover, the trie tree generating unit 150a saves the value "1" connected to "Data" of the pointer array 21 in an input value (Step S19b).

The trie tree generating unit 150a moves from the node "h" to the node "t" at the second character "t" of the input key "http://aaa.aaa/e/", and exchanges the data (tag key, value) of the node "t" for the input data (input key, value). In other words, the trie tree generating unit 150a registers the remaining key "tp://aaa.aaa/e/" obtained by removing the trie part "ht" from the input key "http://aaa.aaa/e/" in the tag key of the node "t". The trie tree generating unit 150a further registers the value "1" corresponding to the input key "http://aaa.aaa/e/" in the node "t". Moreover, the trie tree generating unit 150a adds the trie part "h" to the head of the tag key "tp://aaa.aaa/e/c/" registered in the node "t", and takes out the result as the input key. Moreover, the trie tree generating unit 150a takes out the value "2" associated with the tag key "ttp://aaa.aaa/e/c/" (Step S20a).

The trie tree generating unit 150a exchanges the data (tag key, value) of the node "t" for the input data (input key, value) on real data. In other words, the trie tree generating unit 150a connects "TAG" of the pointer array 22 corresponding to the node "t" to the first row and third column character "t" of the text table 14. Moreover, the trie tree generating unit 150a connects "Data" of the pointer array 22 to the value "1". Then, the trie tree generating unit 150a connects the pointer of the input key to the second row and third column character "t" of the text table 14. Moreover, the trie tree generating unit 150a saves the value "2" connected to "Data" of the pointer array 21 in the input value (Step S20b).

Figure 20:
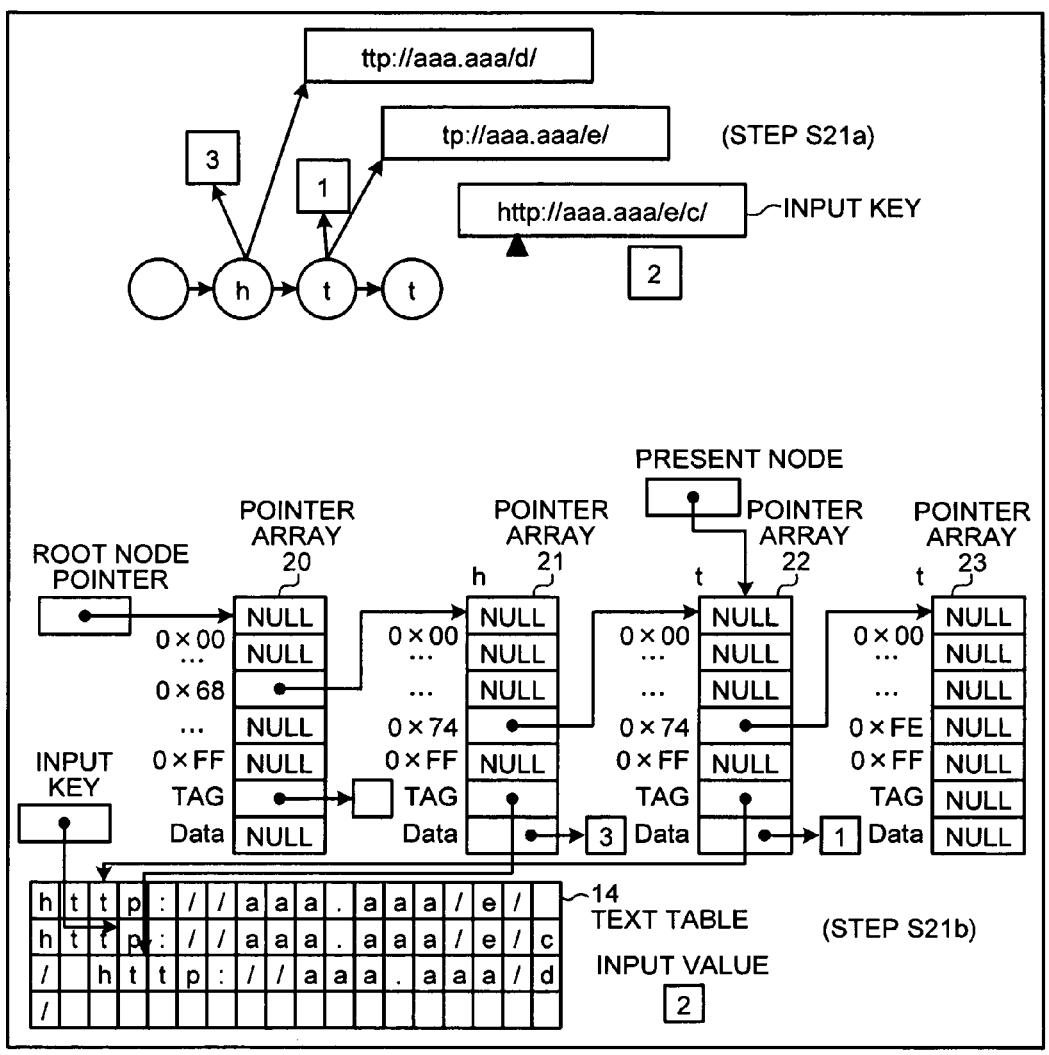
FIG. 20 is a diagram (6) explaining the trie tree generation process.

Next, referring to FIG. 20, because the node "t" corresponding to the third character of the input key "http://aaa.aaa/e/c/" does not exist below the node "t", the trie tree generating unit 150a generates a new node "t" below the node "t". Herein, in the following explanation in order to distinguish the nodes "t", the parent-side node "t" is referred to as the node "t" (parent) and the child-side node "t" is referred to as the node "t" (child). Then, the trie tree generating unit 150a sets the pointer of the input key to the third character "p" (Step S21a).

The trie tree generating unit 150a generates a pointer array 23 corresponding to the node "t" (child) on real data, and connects the pointer array 22 and the pointer array 23 through the key number "0x74" of the pointer array 22. The trie tree generating unit 150a further connects the pointer of the input key to the second row and fourth column character "p" of the text table 14 (Step S21b).

Figure 21:
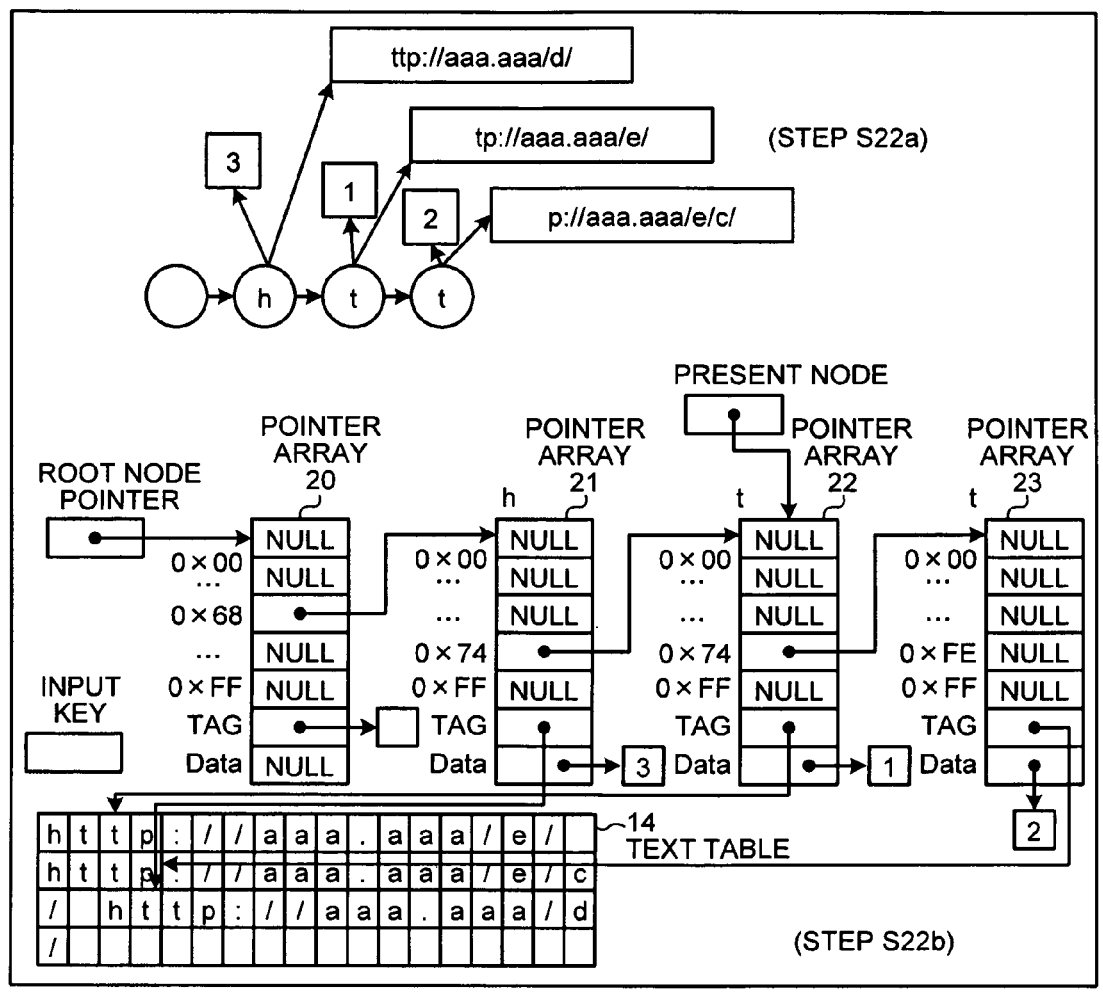
FIG. 21 is a diagram (7) explaining the trie tree generation process.

Next, referring to FIG. 21, the trie tree generating unit 150a connects the remaining key "p://aaa.aaa/e/c/" obtained by removing the trie part "htt" from the input key "http://aaa.aaa/e/c/" to the node "t" (child). The trie tree generating unit 150a further connects the value "2" corresponding to the input key "http://aaa.aaa/e/c/" to the node "t" (child) (Step S22a).

The trie tree generating unit 150a connects "TAG" of the pointer array 23 to the second row and fourth column character "p" of the text table 14 on real data, and opens the pointer of the input key. The trie tree generating unit 150a further connects the value "2" to "Data" of the pointer array 23 (Step S22b).

Figure 22:
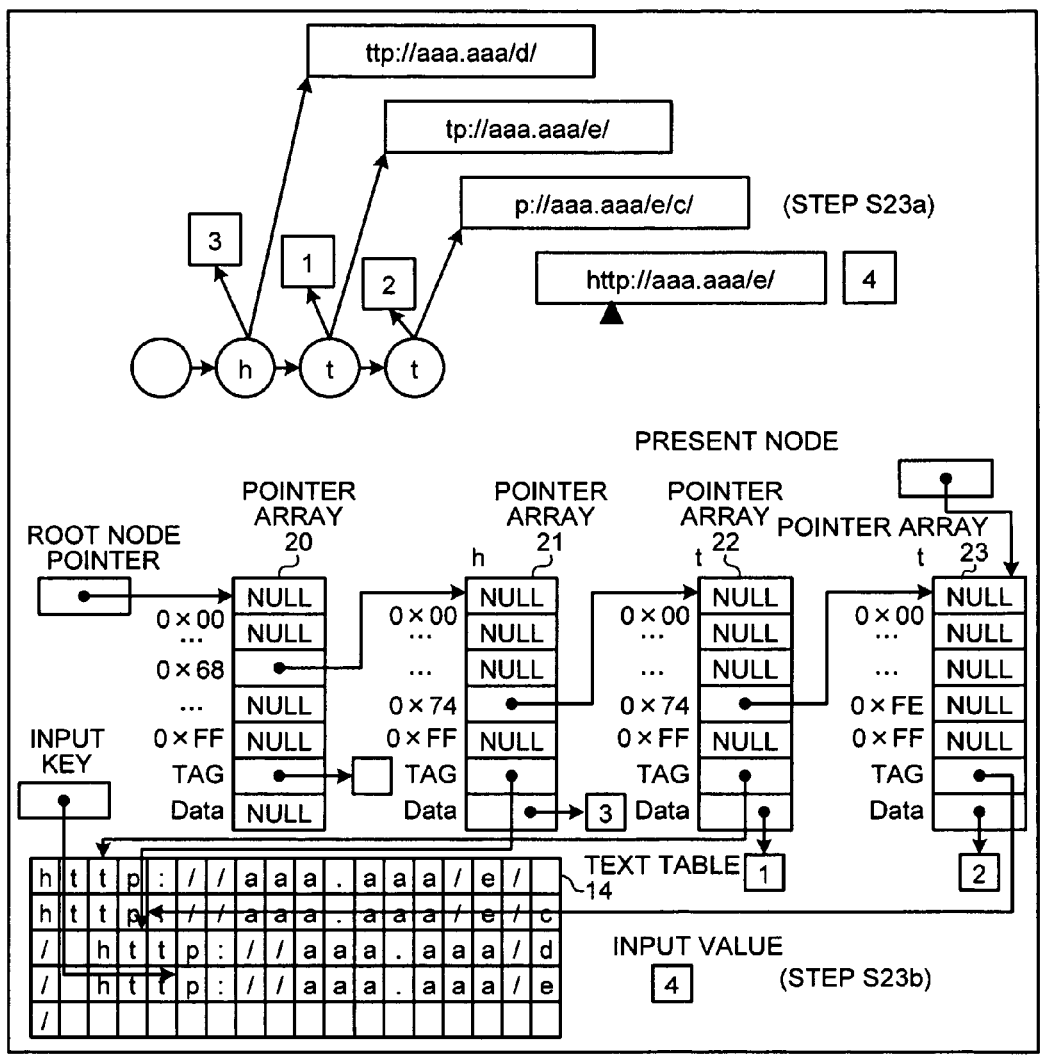
FIG. 22 is a diagram (8) explaining the trie tree generation process.

Next, referring to FIG. 22, it will be explained about the case where the key "http://aaa.aaa/e/" and the value "4" are added to the trie tree created at Steps S22a and S22b. The trie tree generating unit 150a sequentially reads characters from the head of the input key "http://aaa.aaa/e/" and moves to the nodes "h", "t" (parent), and "t" (child). Then, the trie tree generating unit 150a sets the pointer of the input key "http://aaa.aaa/e/" to the fourth character "p" (Step S23a).

The trie tree generating unit 150a registers the key "http://aaa.aaa/e/" on real data after one space of the key "http://aaa.aaa/e/d/" finally registered in the text table 14. Then, the trie tree generating unit 150a connects the pointer of the input key to the fourth row and sixth column character "p" of the text table 14 (Step S23b).

Figure 23:
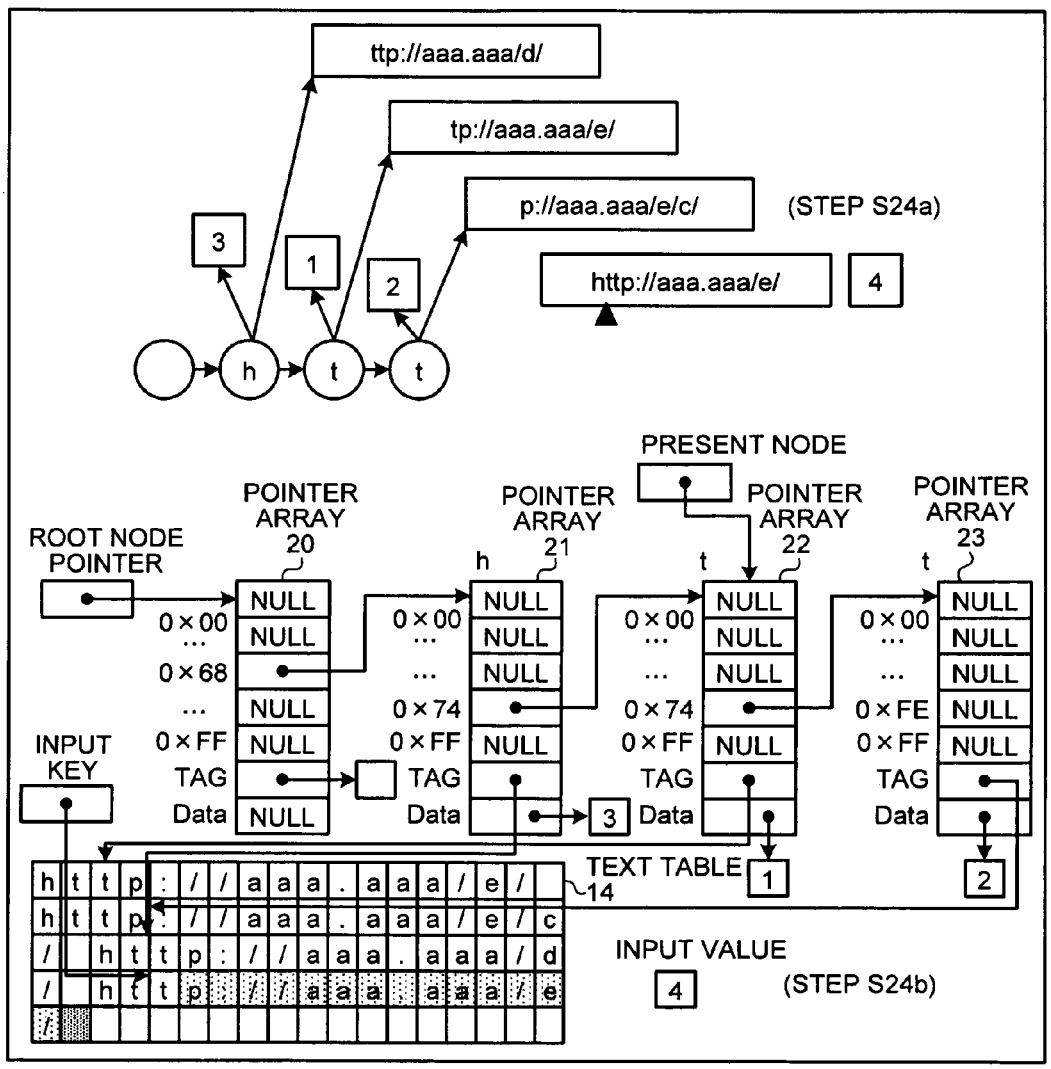
FIG. 23 is a diagram (9) explaining the trie tree generation process.

Next, referring to FIG. 23, because the node "t" (child) does not have a child node that uses "p" as a key, the trie tree generating unit 150a compares the priority of the tag key "p://aaa.aaa/e/c/" of the node "t" (child) and the priority of the input key "p://aaa.aaa/e/" obtained by removing the trie part "htt". Then, because the 15th character of the input key is "null" and the 15th character of the tag key is "c", the priority of the tag key is larger than that of the input key.

Therefore, the trie tree generating unit 150a returns from the node "t" (child) to the node "t" (parent) without exchanging the data of the node "t" (child) for the input data, and sets the pointer of the input key "http://aaa.aaa/e/" to the third character "t" (Step S24a).

The trie tree generating unit 150a connects the pointer of the input key to the fourth row and sixth column character "p" of the text table 14 on real data. Moreover, when a character string of which the head is a character connected to "TAG" of the pointer array 23 is sequentially compared with a character string of which the head is a character connected to the pointer of the input key, the trie tree generating unit 150a determines that the priority of the tag key is larger than that of the input key because the 15th character of the input key is "null" and the 15th character of the tag key is "c". Then, the trie tree generating unit 150a sets the pointer of the input key to the fourth row and fifth column character "t" (Step S24b).

Figure 24:
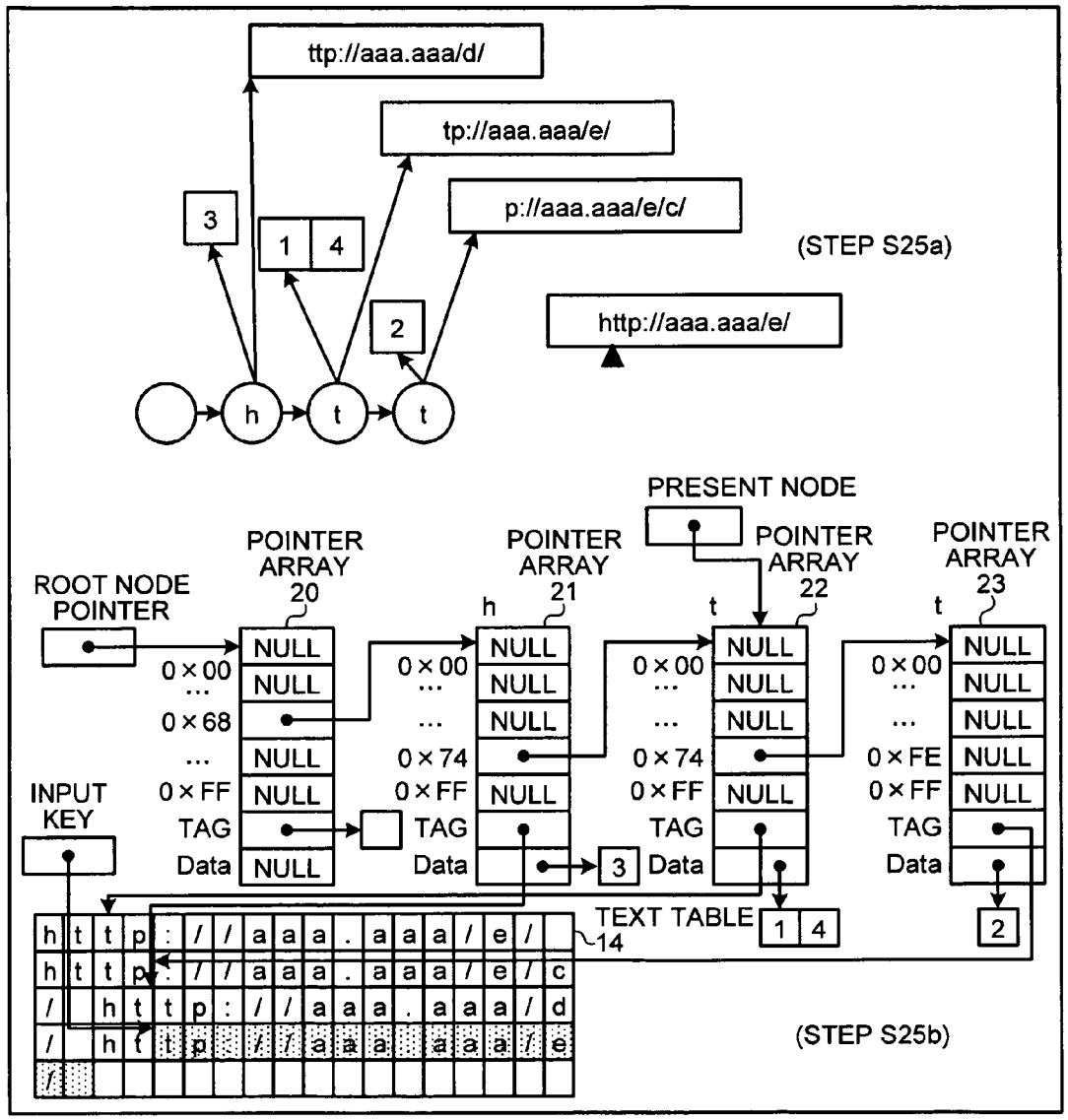
FIG. 24 is a diagram (10) explaining the trie tree generation process.

Next, referring to FIG. 24, the trie tree generating unit 150a compares the priority of the tag key "tp://aaa.aaa/e/" of the node "t" (parent) and the priority of the input key "tp://aaa.aaa/e/" obtained by removing the trie part "ht". Then, the priorities of the input key and the tag key are the same (the input key and the tag key are the same). In this case, the trie tree generating unit 150a adds the value "4" corresponding to the input key "http://aaa.aaa/e/" to the node "t" (Step S25a).

The trie tree generating unit 150a connects the pointer of the input key to the fourth row and fifth column character "t" of the text table 14 on real data. Moreover, when a character string of which the head is a character connected to "TAG" of the pointer array 22 is sequentially compared with a character string of which the head is a character connected to the pointer of the input key, the trie tree generating unit 150a determines that the priorities of the tag key and the input key are the same (the tag key and the input key are the same) because the character strings up to null are the same. Then, the trie tree generating unit 150a adds the value "4" to "Data" of the pointer array 22 (Step S25b).

As illustrated in FIGS. 15 to 24, because one key is assigned to one node when the trie tree generating unit 150a generates the trie tree 140b, an amount of used memory of the trie tree 140b can be reduced. Moreover, when a new input key is assigned to the trie tree 140b, the trie tree generating unit 150a compares only the tag key of a comparison target node with the input key and newly registers the tag key without comparing all the tag keys and the input key. Therefore, the trie tree generating unit 150a can generate the trie tree 140b in such a manner that tag keys are arranged in depth first order while reducing a processing load.

It is assumed that various data (pointer array, text table, and the like) corresponding to real data illustrated in FIGS. 15 to 24 are stored in the storage unit 140.

Returning to the explanation of FIG. 10, the trie tree searching unit 150b is a processing unit that executes a process for extracting a summary value of the values registered in the trie tree 140b and a process for retrieving a value corresponding to a predetermined key from the trie tree 140b.

First, it will be explained about the case where the trie tree searching unit 150b extracts a summary value of the values registered in the trie tree 140b. The trie tree searching unit 150b reads out the characters of the designated input key from the head one-by-one, traces nodes, and sequentially outputs the tag keys and values registered in the nodes in association with each other, in order to extract a summary value. When a node has the registered several values, the trie tree searching unit 150b may add the values or may separately output the values. The trie tree searching unit 150b according to the present embodiment adds the values and outputs the result as an example.

Figure 25:
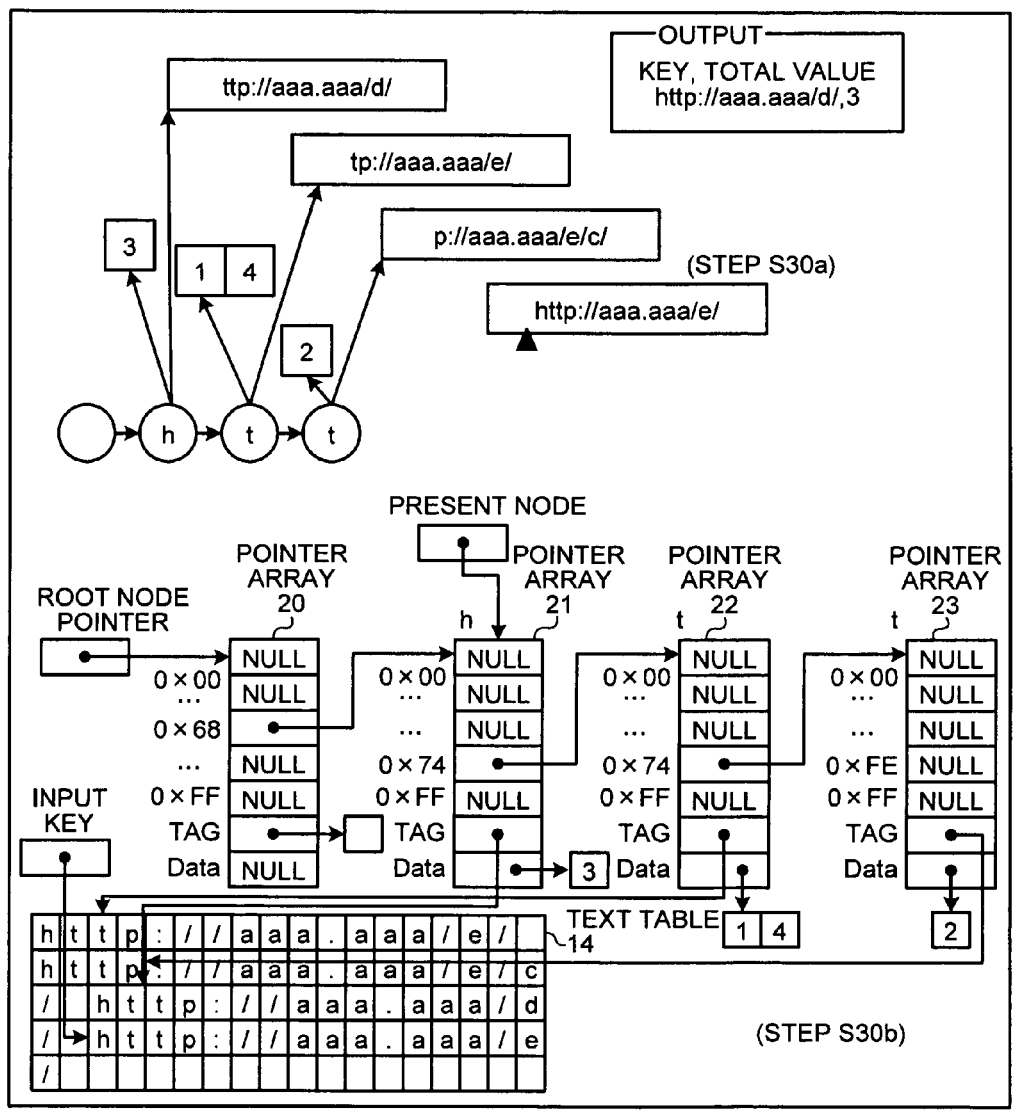
FIG. 25 is a diagram (1) explaining a summary value extraction process.
Figure 26:
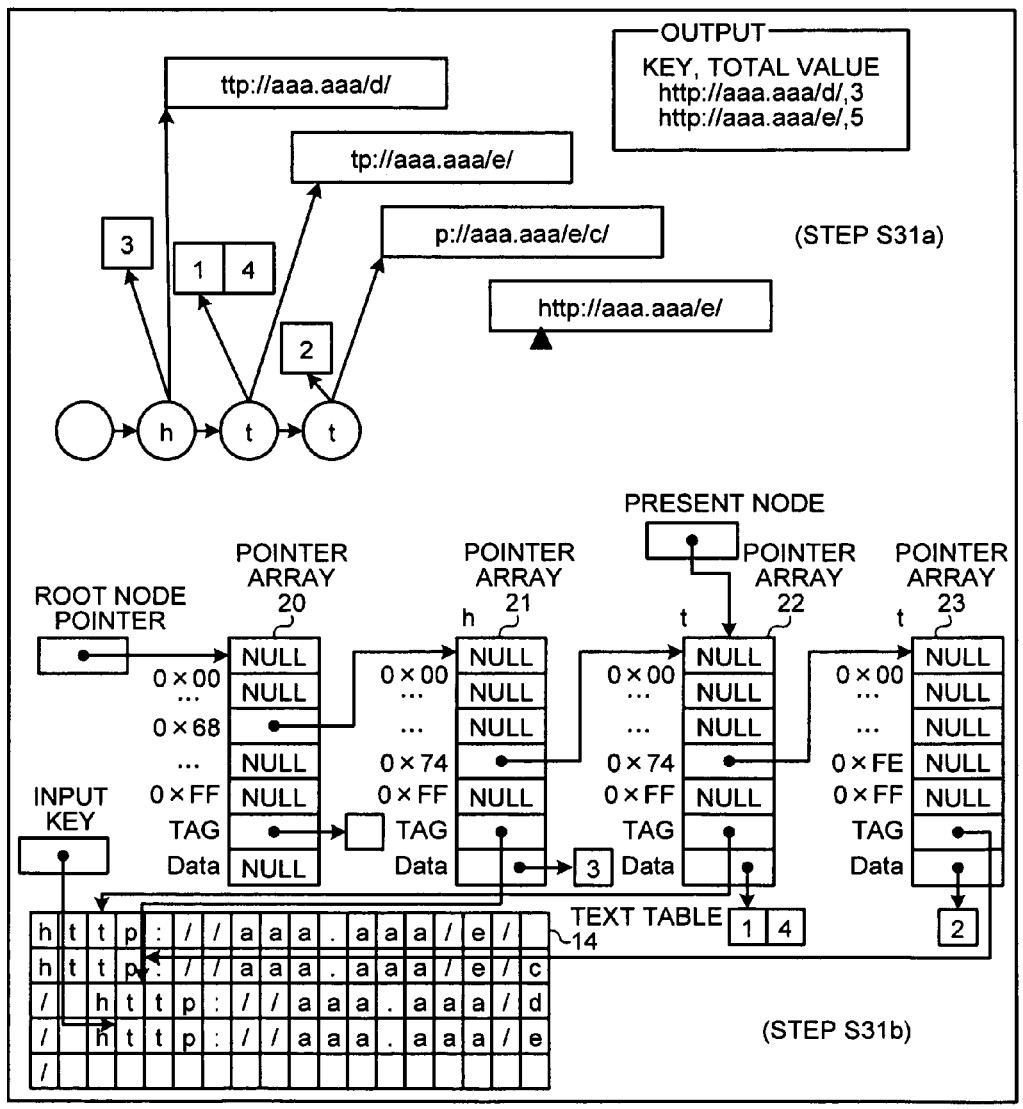
FIG. 26 is a diagram (2) explaining a summary value extraction process.
Figure 27:
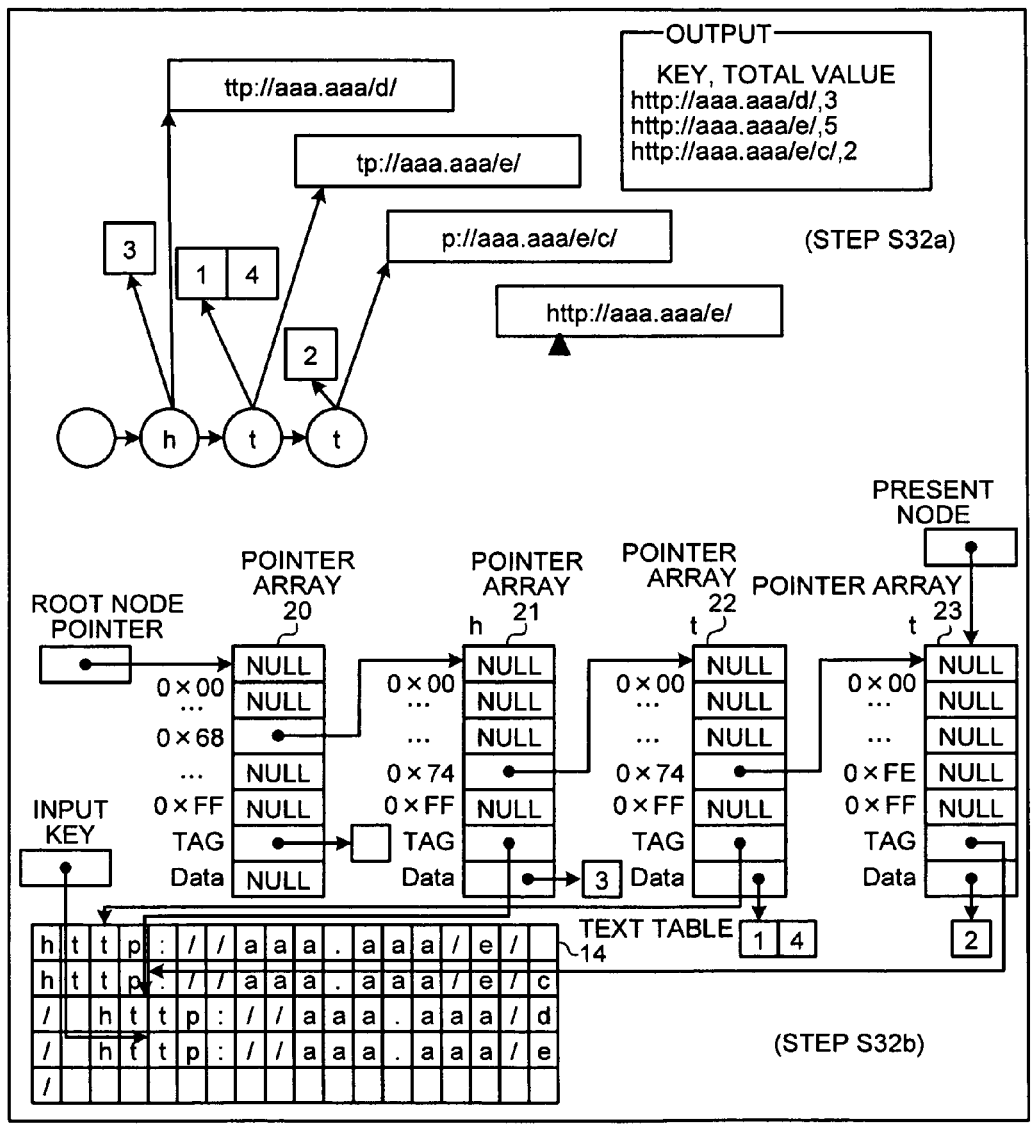
FIG. 27 is a diagram (3) explaining a summary value extraction process.

FIGS. 25 to 27 are diagrams explaining a summary value extraction process. As illustrated in FIG. 25, the trie tree 140b has the node "h", the node "t" (parent), and the node "t" (child) that are sequentially connected below the root node. It is assumed that the node "h" registers the tag key "ttp://aaa.aaa/d/" and the value "3", the node "t" (parent) registers the tag key "tp://aaa.aaa/e" and the values "1, 4", and the node "t" (child) registers the tag key "p://aaa.aaa/e/c" and the value "2".

In FIGS. 25 to 27, it will be explained about a summary value extraction process when the input key "http://aaa.aaa/e/" is designated. In FIG. 25, the trie tree searching unit 150b sets the first character of the input key "http://aaa.aaa/e/" to the pointer, and moves to the node "h" in accordance with the character of the pointer.

Because the node "h" registers the tag key "ttp://aaa.aaa/d/" and the value "3", the trie tree searching unit 150b outputs the key "http://aaa.aaa/d/" obtained by adding the trie part "h" to the head of the tag key "ttp://aaa.aaa/d/" and the value (total value) "3" (Step S30a).

The trie tree searching unit 150b registers the input key "http://aaa.aaa/d/" in the fourth row and third column of the text table 14 on real data, and connects the pointer of the input key to the fourth row and third column. The trie tree searching unit 150b further connects the pointer of the present node to the pointer array 21. Moreover, the trie tree searching unit 150b outputs the character string "http://aaa.aaa/d/" between anteroposterior nulls of the character connected to "TAG" of the pointer array 21 corresponding to the node "h" and the value "3" connected to "Data" (Step S30b).

Referring to FIG. 26, the trie tree searching unit 150b sets the second character of the input key "http://aaa.aaa/e/" to the pointer, and moves from the node "h" to the node "t" (parent) in accordance with the character of the pointer. Because the node "t" (parent) registers the tag key "tp://aaa.aaa/e/" and the values "1, 4", the trie tree searching unit 150b outputs the key obtained by adding the trie part "ht" to the head of the tag key "tp://aaa.aaa/e/" and the value "5" obtained by adding the values "1, 4" (Step S31a).

The trie tree searching unit 150b shifts the destination of the pointer of the input key by one character on real data, and connects the pointer of the input key to the fourth row and fourth column character "t" of the text table 14. The trie tree searching unit 150*b* further connects the pointer of the present node to the pointer array 22. Moreover, the trie tree searching unit 150*b* outputs the character string "http://aaa.aaa/e/" between anteroposterior nulls of the character connected to "TAG" of the pointer array 22 corresponding to the node "t" (parent) and the total value "5" of the values "1, 4" connected to "Data" (Step S31*b*).

Referring to FIG. 27, the trie tree searching unit 150*b* sets the third character of the input key "http://aaa.aaa/e/" to the pointer, and moves from the node "t" (parent) to the node "t" (child) in accordance with the character of the pointer. Because the node "t" (child) registers the tag key "p://aaa.aaa/e/c/" and the value "2", the trie tree searching unit 150*b* outputs the key obtained by adding the trie part "htt" to the head of the tag key "tp://aaa.aaa/e/c/" and the value (total value) "2" (Step S32*a*).

The trie tree searching unit 150*b* shifts the destination of the pointer of the input key by one character on real data, and connects the pointer to the fourth row and fifth column character "t" of the text table 14. The trie tree searching unit 150*b* further connects the pointer of the present node to the pointer array 23. Moreover, the trie tree searching unit 150*b* outputs the character string "http://aaa.aaa/e/c/" between anteroposterior nulls of the character connected to "TAG" of the pointer array 23 corresponding to the node "t" (child) and the value (total value) "2" connected to "Data" (Step S32*b*).

As illustrated in FIGS. 25 to 27, the trie tree searching unit 150*b* can sequentially reads input keys and trace the trie tree 140*b* to output a summary value corresponding to the input keys.

Next, it will be explained about the case where the trie tree searching unit 150*b* retrieves a value corresponding to the designated input key from the trie tree 140*b*. Because the trie tree 140*b* is created in such a manner that tag keys are arranged in depth first order, it is only necessary that the trie tree searching unit 150*b* compares the input keys and the tag keys registered in comparison target nodes. Moreover, when the input keys and nodes included in the comparison target nodes are compared, a processing load can be further reduced by using a binary search.

Figure 28:
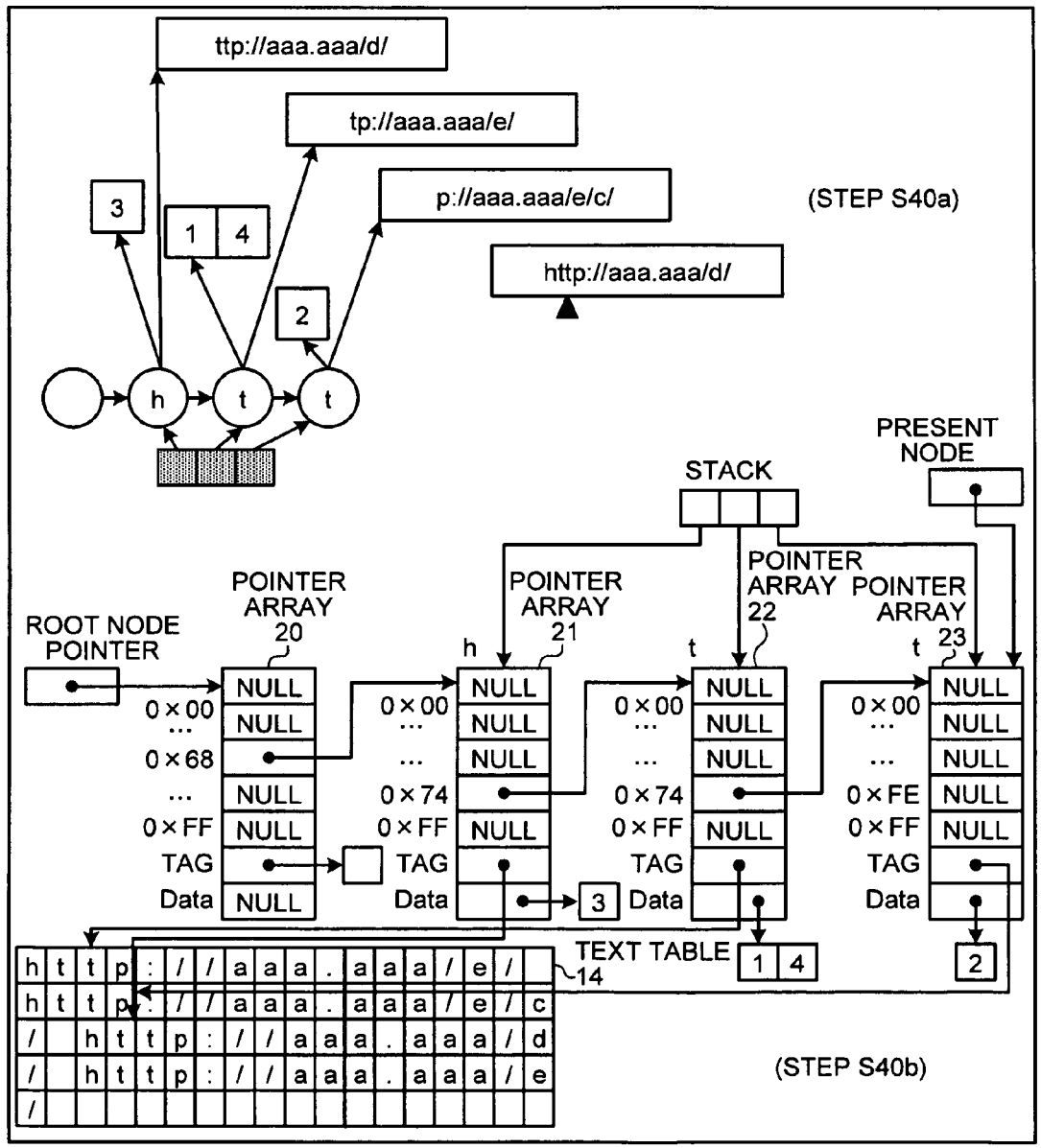
FIG. 28 is a diagram (1) explaining a retrieval process when a binary search is used.

Now, it will be explained about a retrieval process when a binary search is used. FIGS. 28 to 31 are diagrams explaining a retrieval process when a binary search is used. As illustrated in FIG. 28, the trie tree 140*b* has the node "h", the node "t" (parent), and the node "t" (child) that are sequentially connected below the root node. It is assumed that the node "h" registers the tag key "ttp://aaa.aaa/d/" and the value "3", the node "t" (parent) registers the tag key "tp://aaa.aaa/e" and the values "1, 4", and the node "t" (child) registers the tag key "p://aaa.aaa/e/c" and the value "2".

It will be explained about a retrieval process when the input key "http://aaa.aaa/d/" is designated with reference to FIGS. 28 to 31. In FIG. 28, the trie tree searching unit 150*b* reads out characters in sequence from the initial character of the input key "http://aaa.aaa/d/", and moves from the root node in order of the node "h", the node "t" (parent), and the node "t" (child). Then, the trie tree searching unit 150*b* sets the pointer of the input key "http://aaa.aaa/d/" to "p" obtained by shifting the pointer from the initial position "h" by three characters. The trie tree searching unit 150*b* adds a stack to the transited nodes (Step S40*a*).

The trie tree searching unit 150*b* adds the stack to the pointer arrays 21, 22, and 23 respectively corresponding to the node "h", the node "t" (parent), and the node "t" (child) on real data. Moreover, the trie tree searching unit 150*b* connects the pointer of the present node to the pointer array 23 (Step S40*b*). Herein, for convenience of explanation, the input key "http://aaa.aaa/d/" is not described. However, it is assumed that the information on the input key "http://aaa.aaa/d/" is stored in the text table 14.

Figure 29:
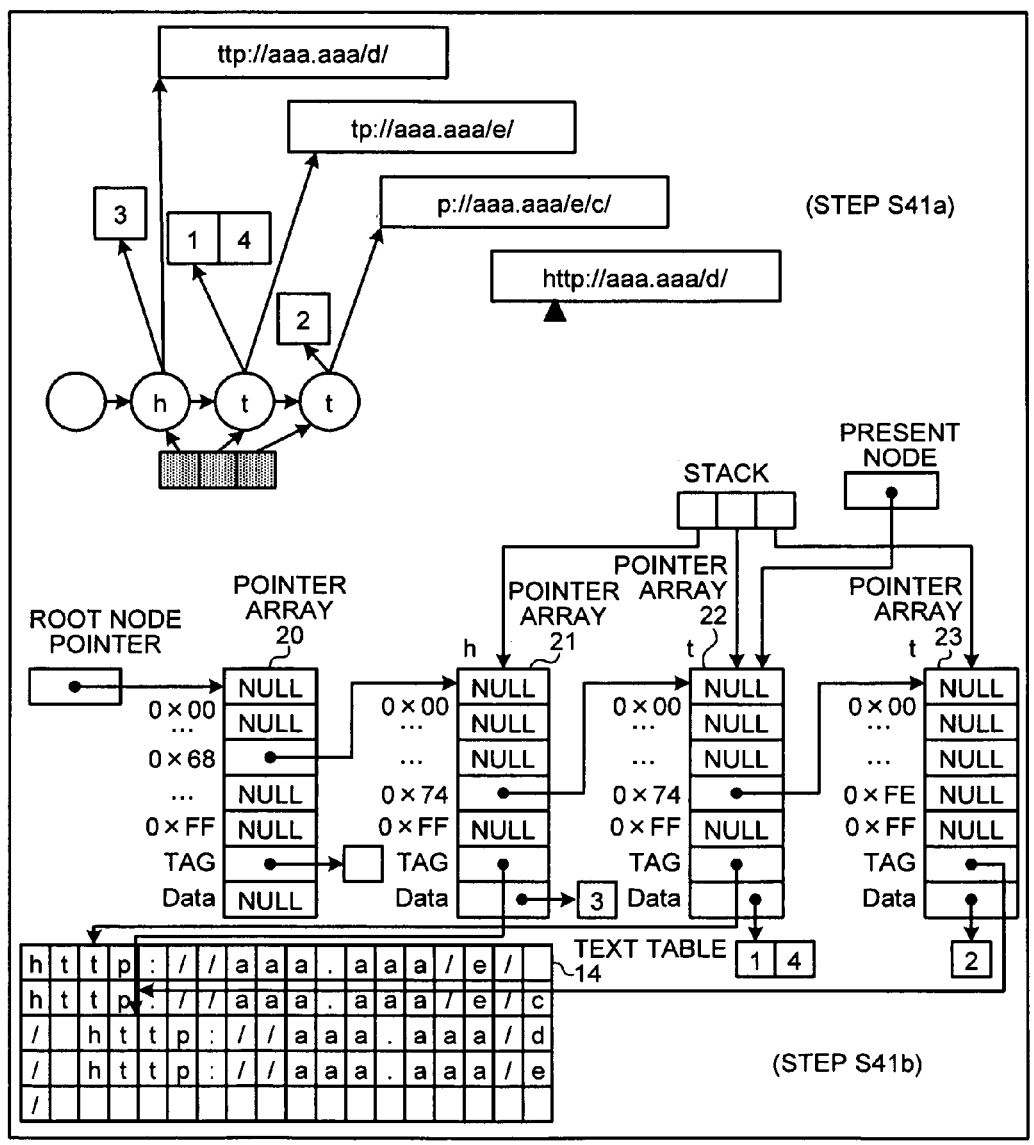
FIG. 29 is a diagram (2) explaining a retrieval process when a binary search is used.

Next, referring to FIG. 29, the trie tree searching unit 150*b* moves to the node "t" (parent) of the middle of the stack and returns the pointer of the input key by which the transition of the node is performed. Herein, because the node is returned from the node "t" (child) to the node "t" (parent), the trie tree searching unit 150*b* sets the pointer of the input key "http://aaa.aaa/d/" to "t" (third character) obtained by returning the pointer from "p" by one character.

Then, the trie tree searching unit 150*b* compares the priority of the tag key "tp://aaa.aaa/e/" of the node "t" and the priority of the input key "tp://aaa.aaa/d/" obtained by removing the trie part "ht". Then, because the 14th character of the input key is "d" and the 14th character of the tag key is "e", the trie tree searching unit 150*b* determines that the priority of the tag key is larger than that of the input key (Step S41*a*). When the priority of the tag key of the node "t" (parent) is larger than the priority of the input key, nodes after the node "t" (parent) do not have tag keys to be retrieved.

The trie tree searching unit 150*b* moves the pointer of the present node to the pointer array 22 connected to the middle of the stack on real data. Then, the trie tree searching unit 150*b* compares the character string "tp://aaa.aaa/e/" after the character connected to "TAG" of the pointer array 22 and the remaining input key "tp://aaa.aaa/d/" obtained by excluding the trie part "ht". Then, because the 14th character of the input key is "d" and the 14th character of the tag key is "e", the trie tree searching unit 150*b* determines that the priority of the tag key is larger than that of the input key (Step S41*b*).

Figure 30:
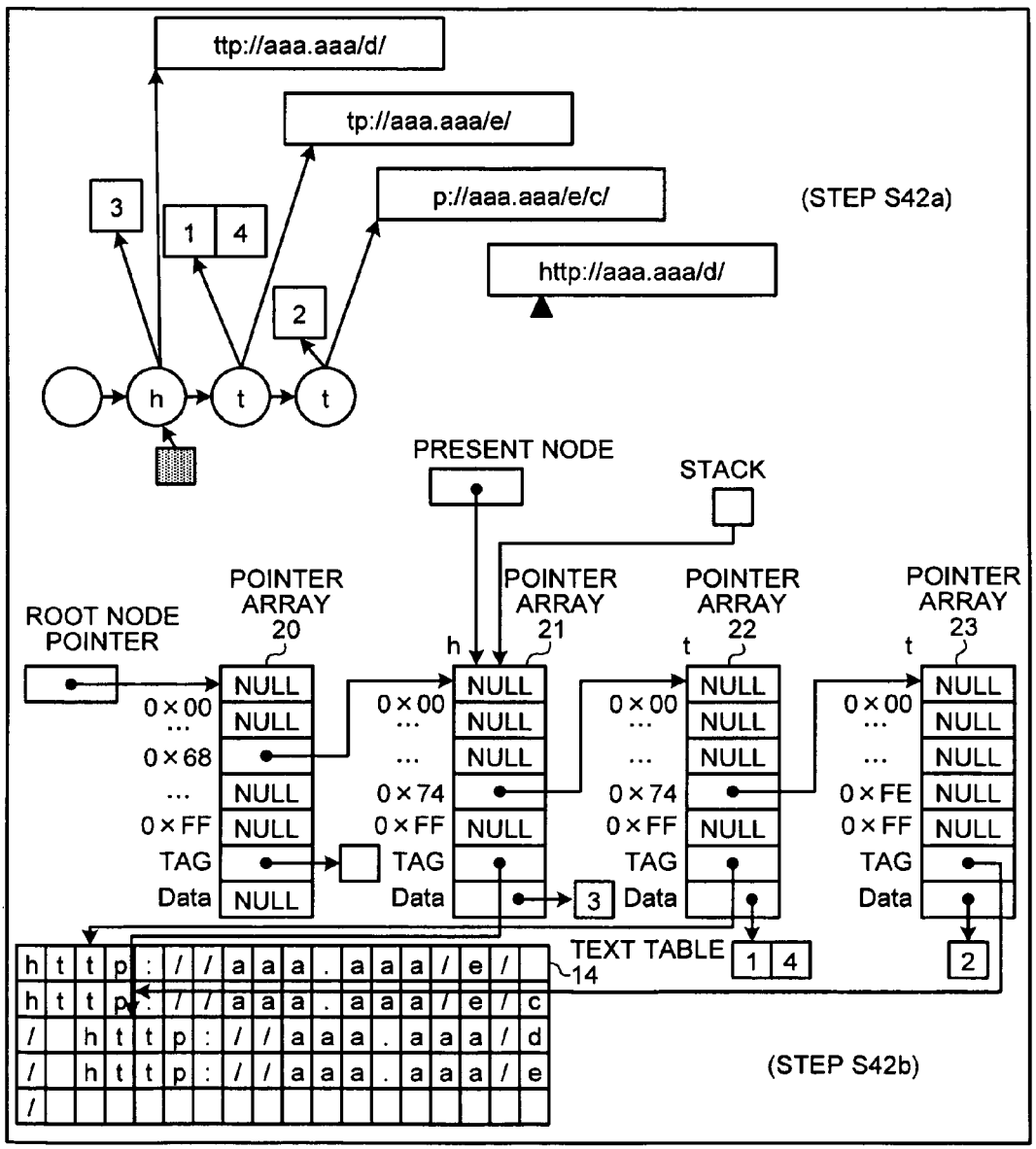
FIG. 30 is a diagram (3) explaining a retrieval process when a binary search is used.

Next, it will be explained with reference to FIG. 30. As explained in FIG. 29, when the priority of the tag key of the node "t" (parent) is larger than the priority of the input key, nodes after the node "t" (parent) do not have tag keys to be retrieved. Therefore, the trie tree searching unit 150*b* deletes the components of the stack added to the node "t" (parent) and the node "t" (child) that correspond to the latter half of the stack.

The trie tree searching unit 150*b* moves to the node "h" of the middle of the stack, and returns the pointer of the input key by which the transition of the pointer is performed. Herein, because the node is returned from the node "t" (parent) to the node "h", the trie tree searching unit 150*b* sets the pointer of the input key "http://aaa.aaa/d/" to "t" (second character) obtained by returning the pointer from "t" (third character) by one character (Step S42*a*).

The trie tree generating unit 150*a* moves the pointer of the present node to the pointer array 21 connected to the middle of the stack on real data (Step S42*b*).

Figure 31:
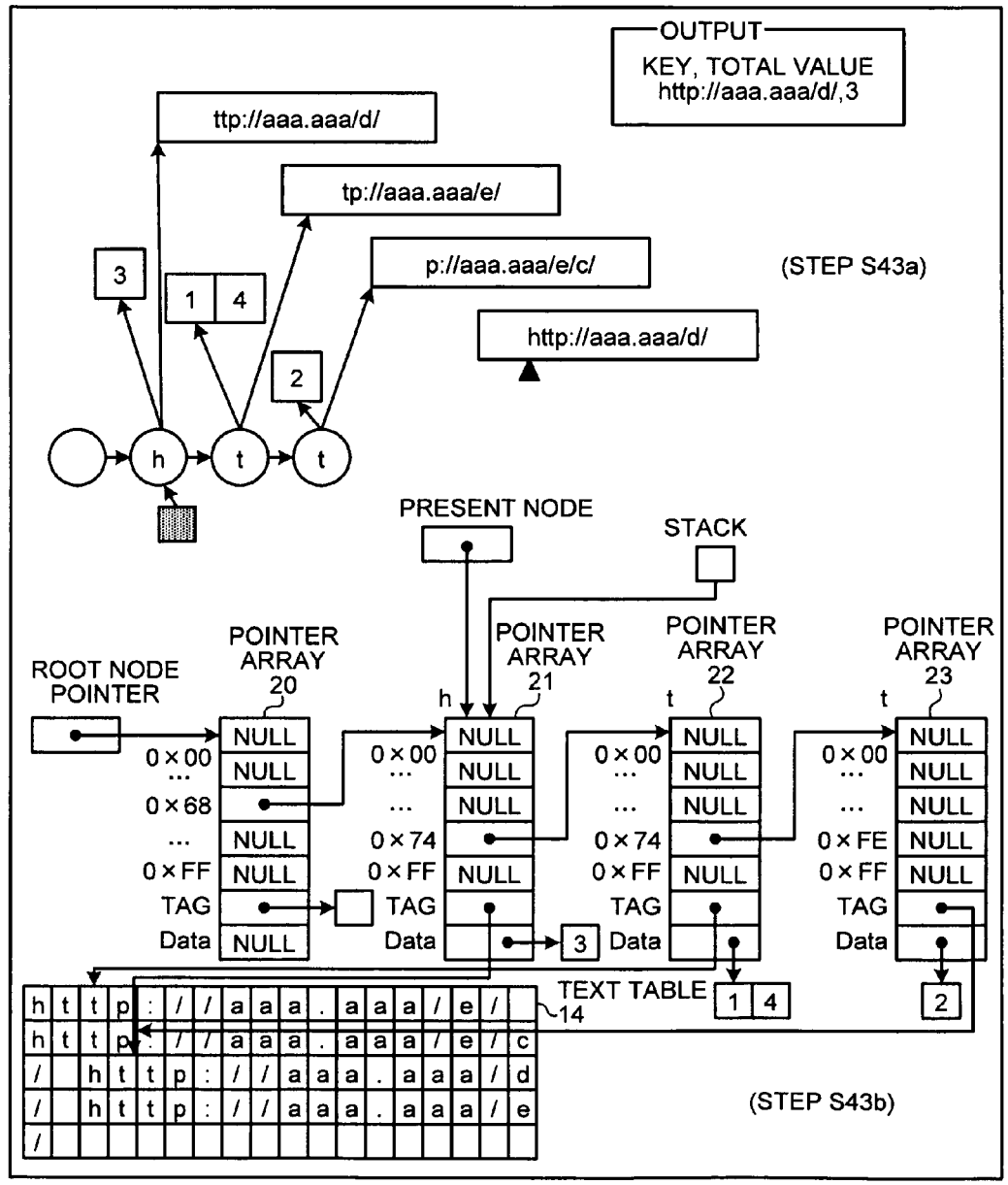
FIG. 31 is a diagram (4) explaining a retrieval process when a binary search is used.

It will be explained with reference to FIG. 31. The trie tree searching unit 150*b* compares the priority of the tag key "ttp://aaa.aaa/d/" of the node "h" and the priority of the input key "ttp://aaa.aaa/d/" obtained by removing the trie part "h". Then, because the priorities of the tag key and the input key are the same (the tag key and the input key are the same), the trie tree searching unit 150*b* outputs the value "3" and the key "http://aaa.aaa/d/" obtained by adding the trie part "h" to the head of the tag key "ttp://aaa.aaa/d/" connected to the node "h" as the retrieval result (Step S43*a*).

The trie tree searching unit 150*b* compares, on real data, the priority of the character string "ttp://aaa.aaa/d/" after the character connected to "TAG" of the pointer array 21 and the priority of the remaining input key "tp://aaa.aaa/d/" obtained by removing the trie part "h". Then, because the priorities of the tag key and the input key are the same (the tag key and the input key are the same), the trie tree searching unit 150b outputs the character string "http://aaa.aaa/d/" between anteroposterior nulls of the character connected to "TAG" of the pointer array 21 and the value "3" connected to "Data" (Step S43b).

Figure 32:
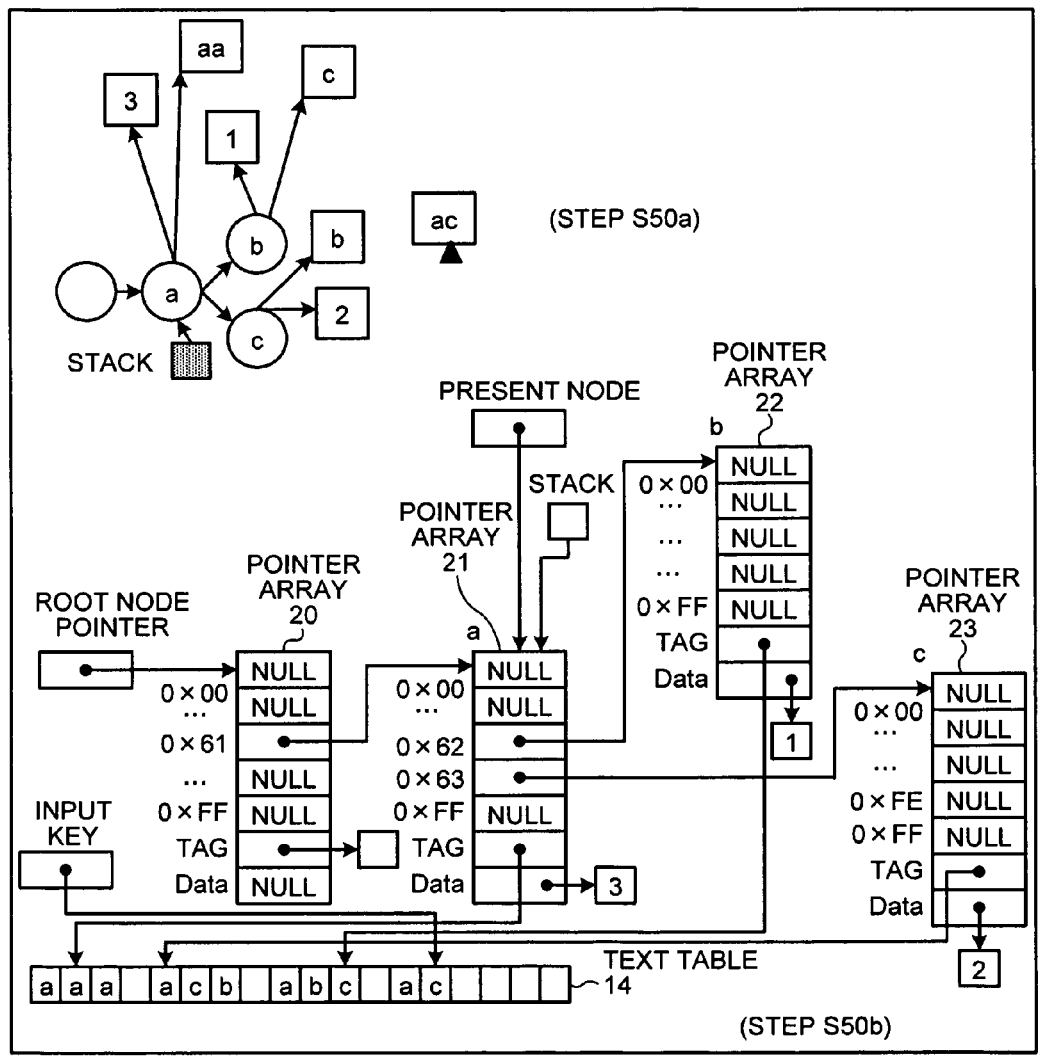
FIG. 32 is a diagram (5) explaining a retrieval process when a binary search is used.

Next, it will be explained about a retrieval process when the binary search is used by using the other example with reference to FIGS. 32 to 35. As illustrated in FIG. 32, the trie tree 140b has nodes "a", "b", and "c" that are connected below the root node. It is assumed that the node "a" registers a tag key "aa" and a value "3", the node "b" registers a tag key "c" and a value "1", and the node "c" registers a tag key "b" and a value "2". In this case, the relationship between the node "b" and the node "c" is like that the node "b" is an elder node and the node "c" is a younger node.

It will be explained about a retrieval process when an input key "ac" is designated with reference to FIGS. 32 to 35. In FIG. 32, the trie tree searching unit 150b reads out "a" from the input key "ac" and shifts the pointer of the input key from "a" to "c". The trie tree searching unit 150b further adds a stack to the node "a" (Step S50a).

The trie tree searching unit 150b adds the stack to the pointer array 21 corresponding to the node "a" on real data. Moreover, the trie tree searching unit 150b connects the pointer of the present node to the pointer array 21. The trie tree searching unit 150b sets the pointer of the input key to the first row and 14th column character "c" of the text table 14 (Step S50b).

Figure 33:
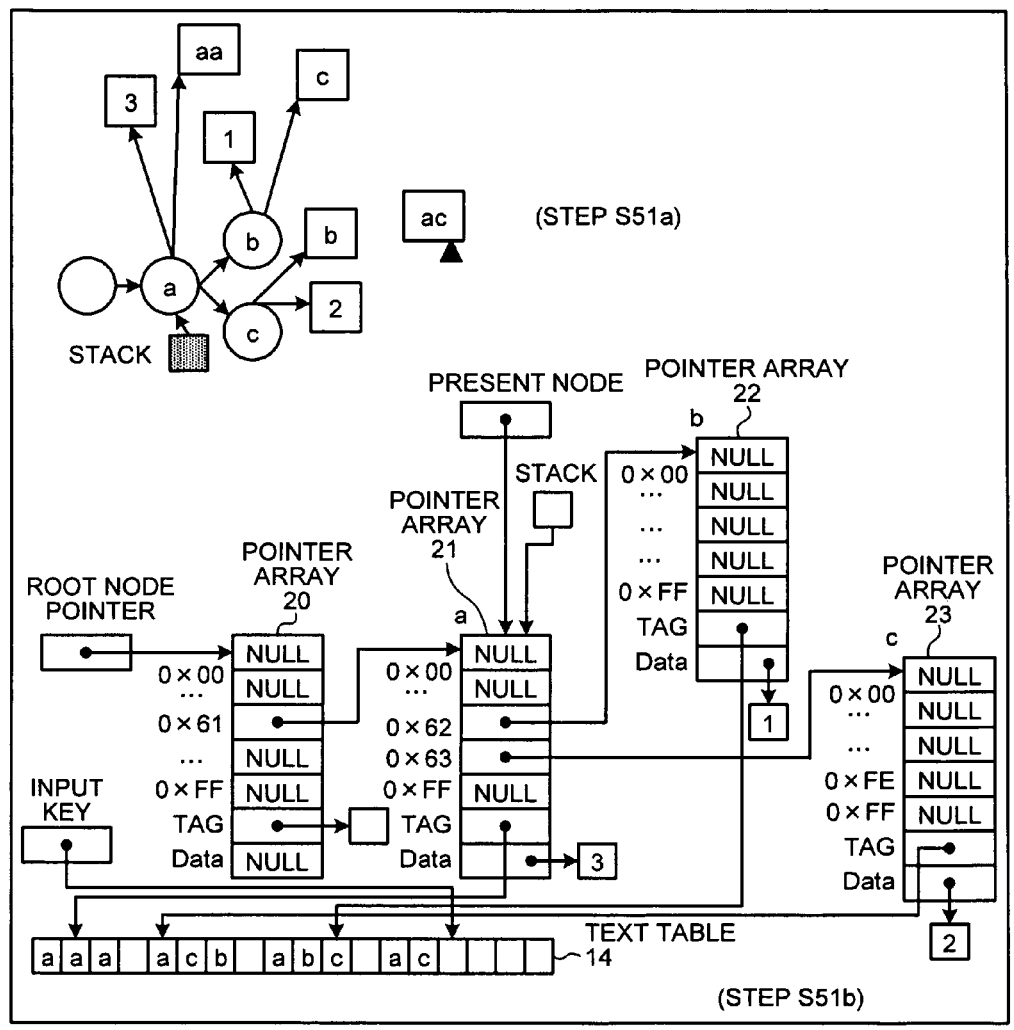
FIG. 33 is a diagram (6) explaining a retrieval process when a binary search is used.

Next, it will be explained with reference to FIG. 33. The trie tree searching unit 150b reads out "c" designated by the pointer from the input key "ac", and moves to the node "c". At the time point at which it moves to the node "c", because the priority of the tag key registered in the ancestral node of the node "a" is smaller than all the priorities of the input key "ac", the priority of the tag key should be excluded from a retrieval object. Therefore, the trie tree searching unit 150b once empties the stack and newly adds the node "c" to the stack. Moreover, the trie tree searching unit 150b shifts the pointer of the input key from "c" by one character and sets the pointer to "null" (Step S51a).

The trie tree searching unit 150b designates the pointer array 23 as the present node on real data. The trie tree searching unit 150b deletes the stack connected to the pointer array 21 and adds a stack to the pointer array 23. Moreover, the trie tree searching unit 150b sets the pointer of the input key to the first row and the 15th column character "null" of the text table 14 (Step S51b).

Figure 34:
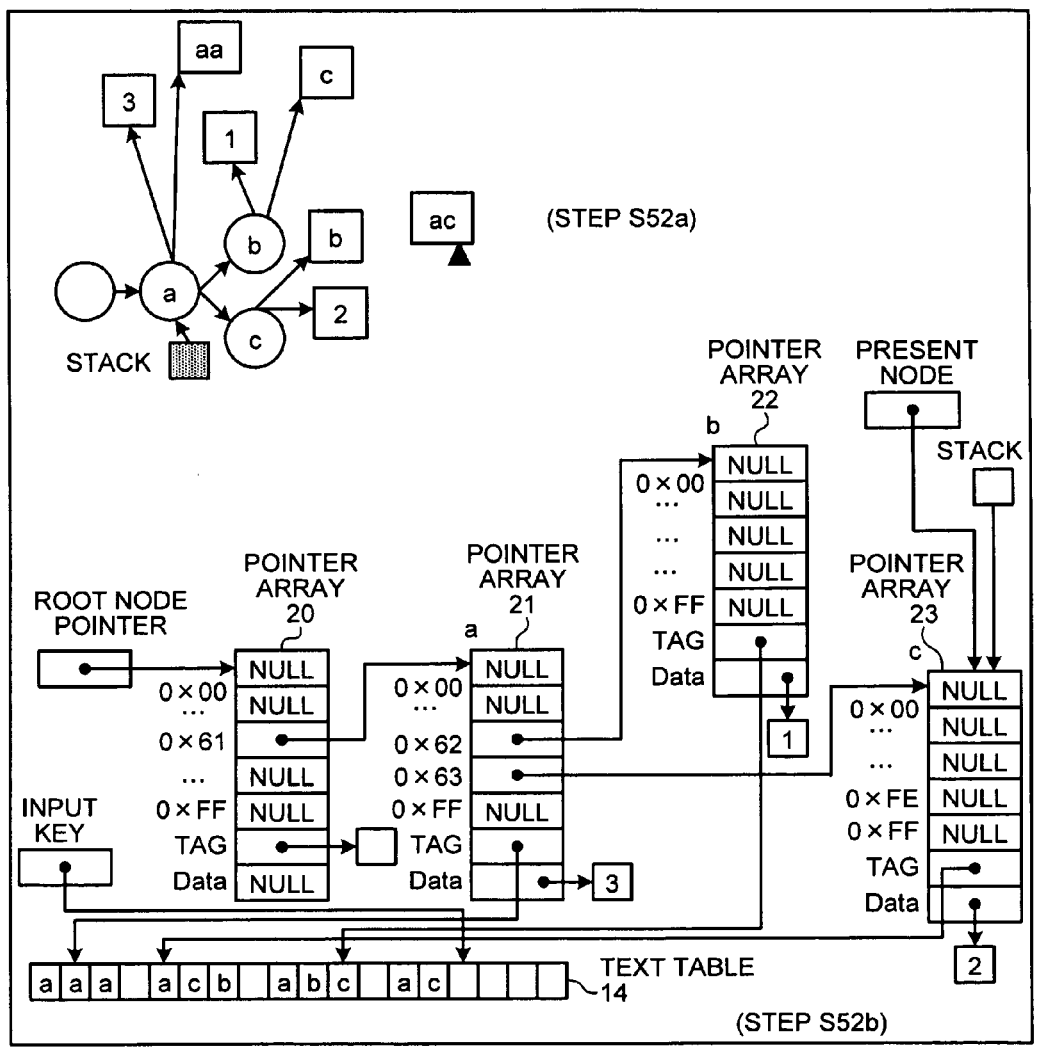
FIG. 34 is a diagram (7) explaining a retrieval process when a binary search is used.

Next, it will be explained with reference to FIG. 34. Because the character designated by the pointer is "null", the trie tree searching unit 150b sets the node "c" of the middle of the stack as the present node, and compares the priority of the tag key "b" of the node "c" and the priority of "null" obtained by excluding the trie part "ac". As the comparison result, the trie tree searching unit 150b determines that the priority of the tag key is larger than the priority of the input key (Step S52a).

The trie tree searching unit 150b sets the pointer array 23 corresponding to the middle of the stack as the present node on real data, and compares the character string of which the head is the character connected to "TAG" of the pointer array 23 and "null" connected to the pointer of the input key. As the comparison result, the trie tree searching unit 150b determines that the priority of the tag key is larger than the priority of the input key (Step S52b).

Figure 35:
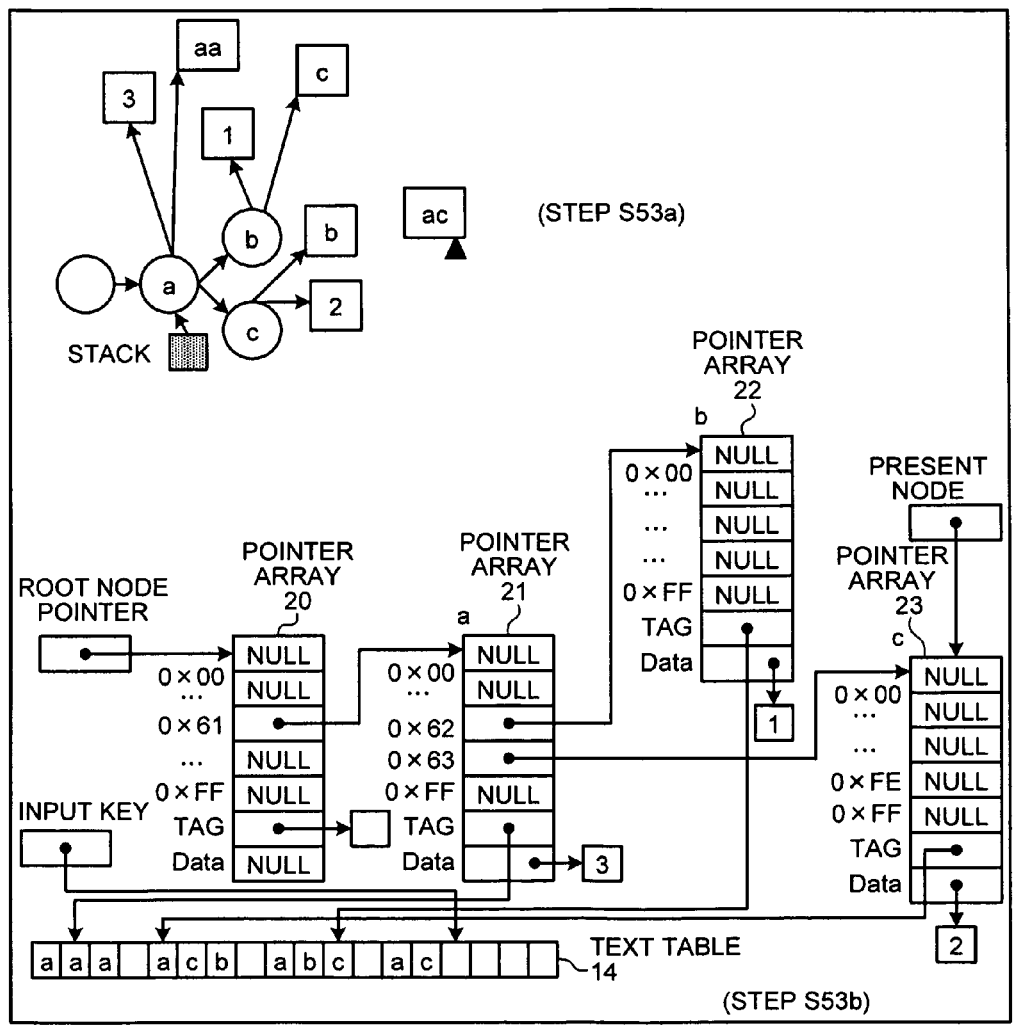
FIG. 35 is a diagram (8) explaining a retrieval process when a binary search is used.

Next, it will be explained with reference to FIG. 35. Because the priority of the tag key is larger than the priority of the input key, the trie tree searching unit 150b deletes the stack of the node "c" that registers the tag key. Because all the stacks disappear and the tag key identical with the input key "ac" does not exist, the trie tree searching unit 150b outputs the effect that matching data does not exist (Step S53a).

Because the priority of the tag key is larger than the priority of the input key, the trie tree searching unit 150b deletes the stack connected to the pointer array corresponding to the node "c" on real data. Because all the stacks disappear and the tag key identical with the input key "ac" does not exist, the trie tree searching unit 150b outputs the effect that matching data does not exist (Step S53b).

Figure 36:
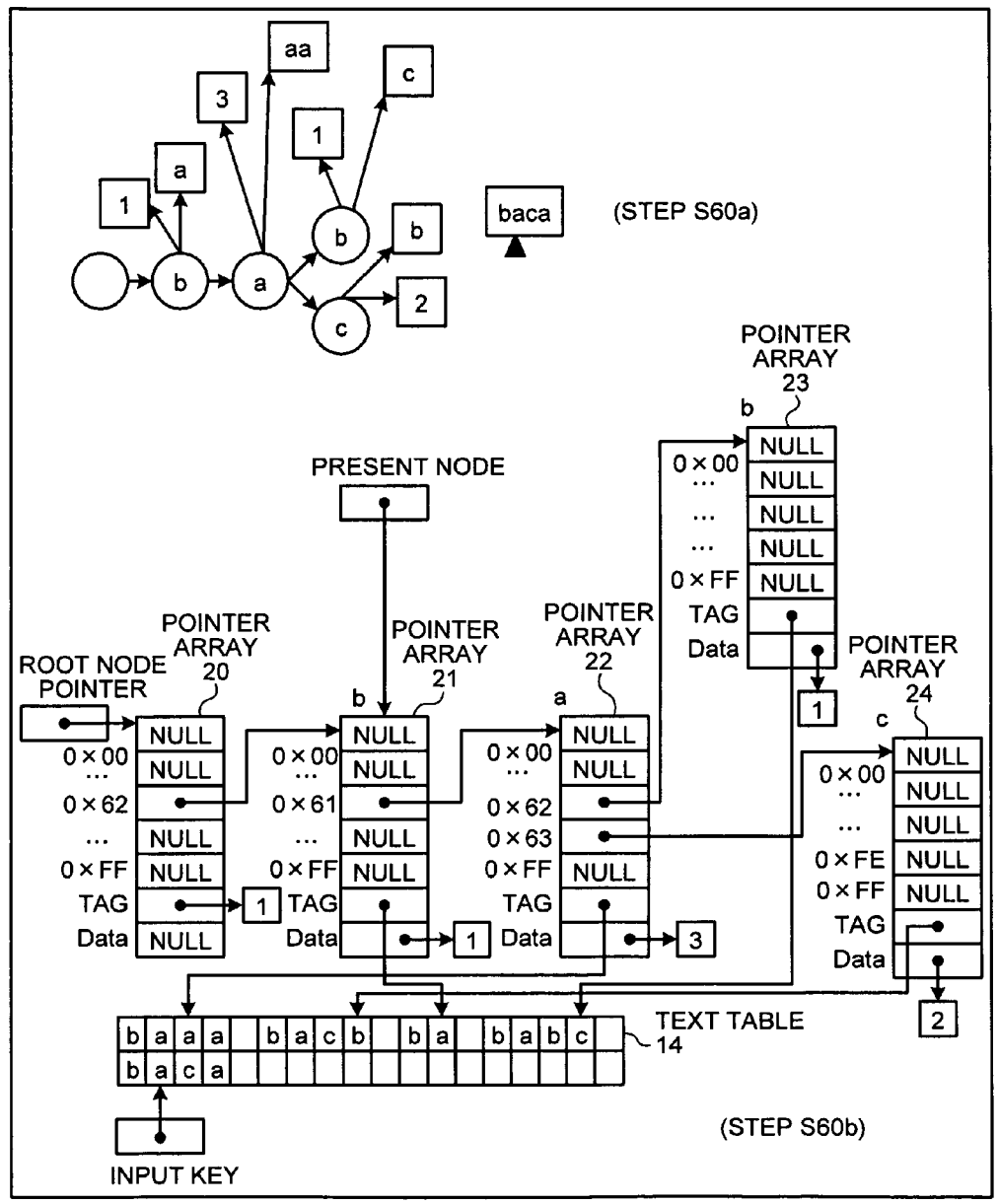
FIG. 36 is a diagram (1) explaining a retrieval process when the binary search is not used.

As described above, it has been explained about the case where the trie tree searching unit 150b executes the retrieval process by using the binary search with reference to FIGS. 28 to 35. However, the trie tree searching unit 150b may not necessarily use the binary search. FIGS. 36 to 40 are diagrams explaining a retrieval process when a binary search is not used. As illustrated in FIG. 36, the trie tree 140b has nodes "b", "a", "b", and "c" that are connected below the root node. Herein, in order to distinguish the two nodes "b", the node "b" corresponding to the child node of the root node is referred to as a node "b(1)" and the other node "b" is referred to as a node "b(2)".

It is assumed that the node "b(1)" registers a tag key "a" and a value "1", the node "a" registers a tag key "aa" and a value "3", the node "b(2)" registers a tag key "c" and a value "1", and the node "c" registers a tag key "b" and a value "2".

Moreover, it will be explained about a retrieval process when an input key "baca" is designated with reference to FIGS. 36 to 40. In FIG. 36, the trie tree searching unit 150b sets the pointer of the input key to the initial character "b", and moves from the root node to the node "b(1)" in accordance with "b" designated by the pointer. Then, the trie tree searching unit 150b sets the pointer of the input key to "a" obtained by shifting the pointer from "b" by one character (Step S60a).

The trie tree searching unit 150b registers the input key "baca" in the text table 14 on real data, and connects the pointer of the input key to the second row and first column "b" of the text table 14. The trie tree searching unit 150b moves the pointer of the present node from the pointer array 20 to the pointer array 21 in accordance with "b" connected to the pointer of the input key, and sets the pointer of the input key to "a" obtained by shifting one character (Step S60b).

Figure 37:
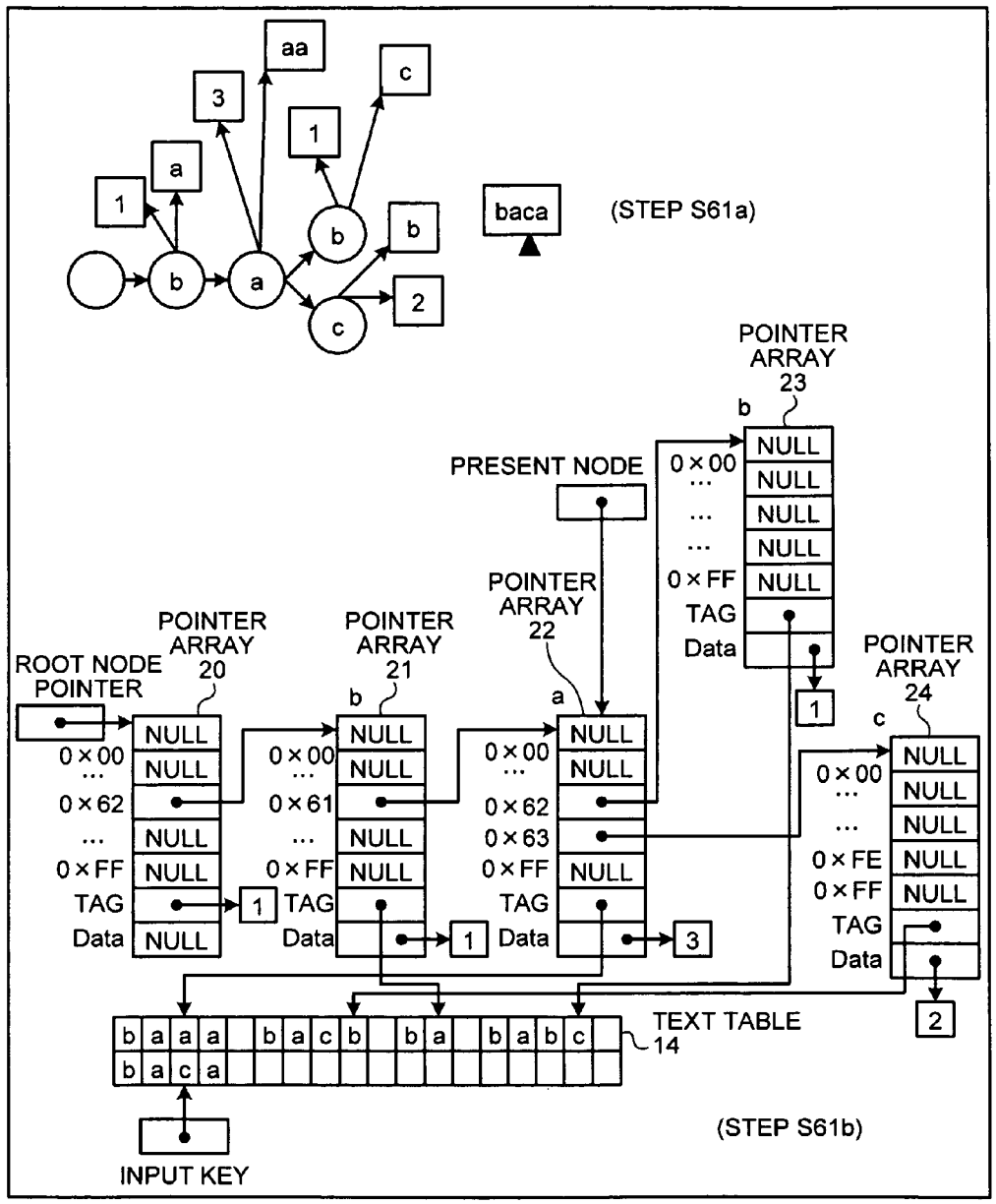
FIG. 37 is a diagram (2) explaining a retrieval process when the binary search is not used.

Next, it will be explained with reference to FIG. 37. The trie tree searching unit 150b moves from the node "b(1)" to the node "a" in accordance with "a" designated by the pointer, and sets the pointer of the input key to "c" obtained by shifting one character from "a" (Step S61a).

The trie tree searching unit 150b moves, on real data, the pointer of the present node from the pointer array 21 to the pointer array 22 in accordance with "a" connected to the pointer of the input key, and sets the pointer of the input key to "c" obtained by shifting one character (Step S61b).

Figure 38:
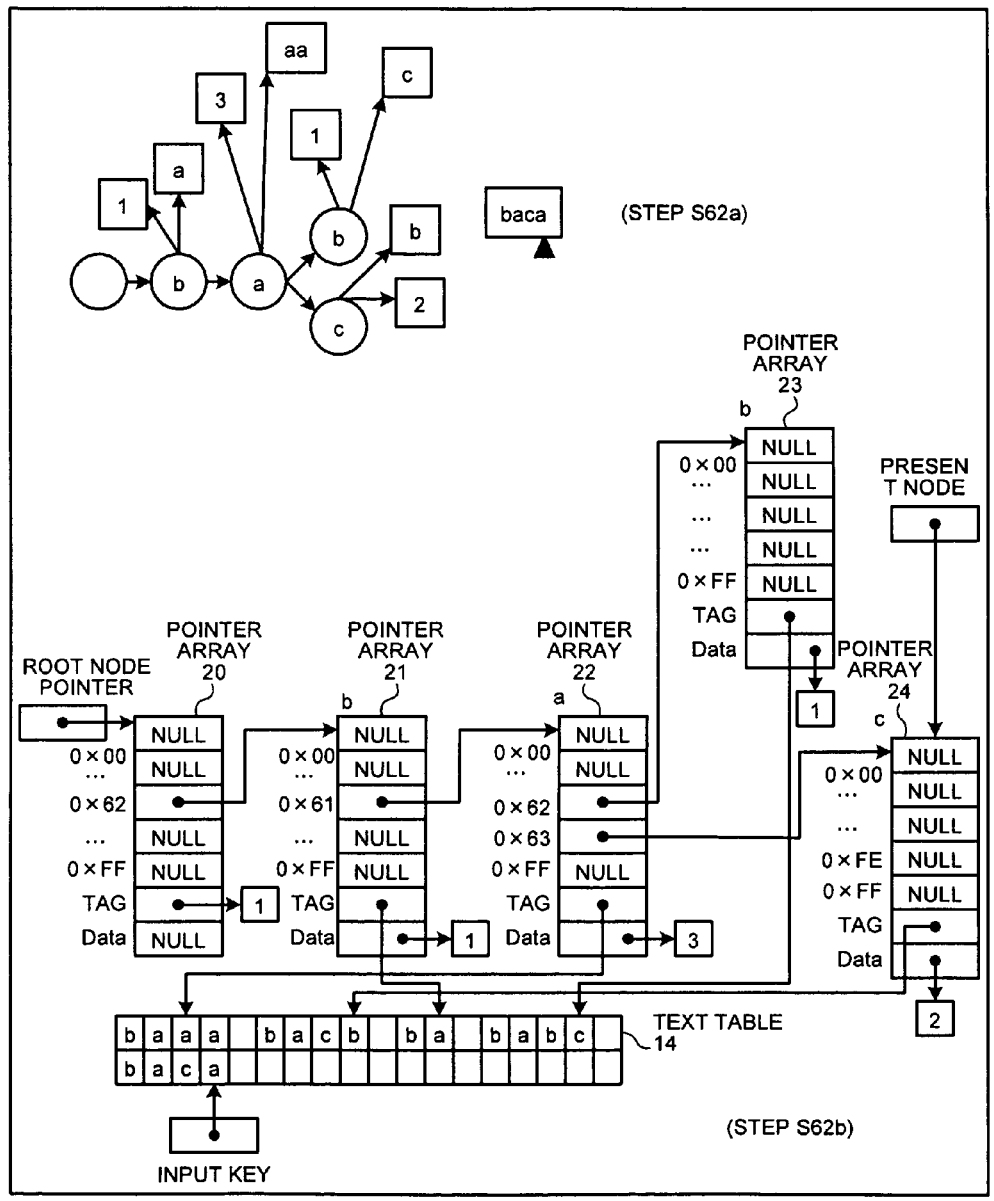
FIG. 38 is a diagram (3) explaining a retrieval process when the binary search is not used.

Next, it will be explained with reference to FIG. 38. The trie tree searching unit 150b moves from the node "a" to the node "c" in accordance with "c" designated by the pointer, and sets the pointer of the input key to "a" obtained by shifting one character from "c" (Step S62a).

The trie tree searching unit 150b moves, on real data, the pointer of the present node from the pointer array 22 to a pointer array 24 in accordance with "c" connected to the pointer of the input key, and sets the pointer of the input key to "a" obtained by shifting one character (Step S62b).

Figure 39:
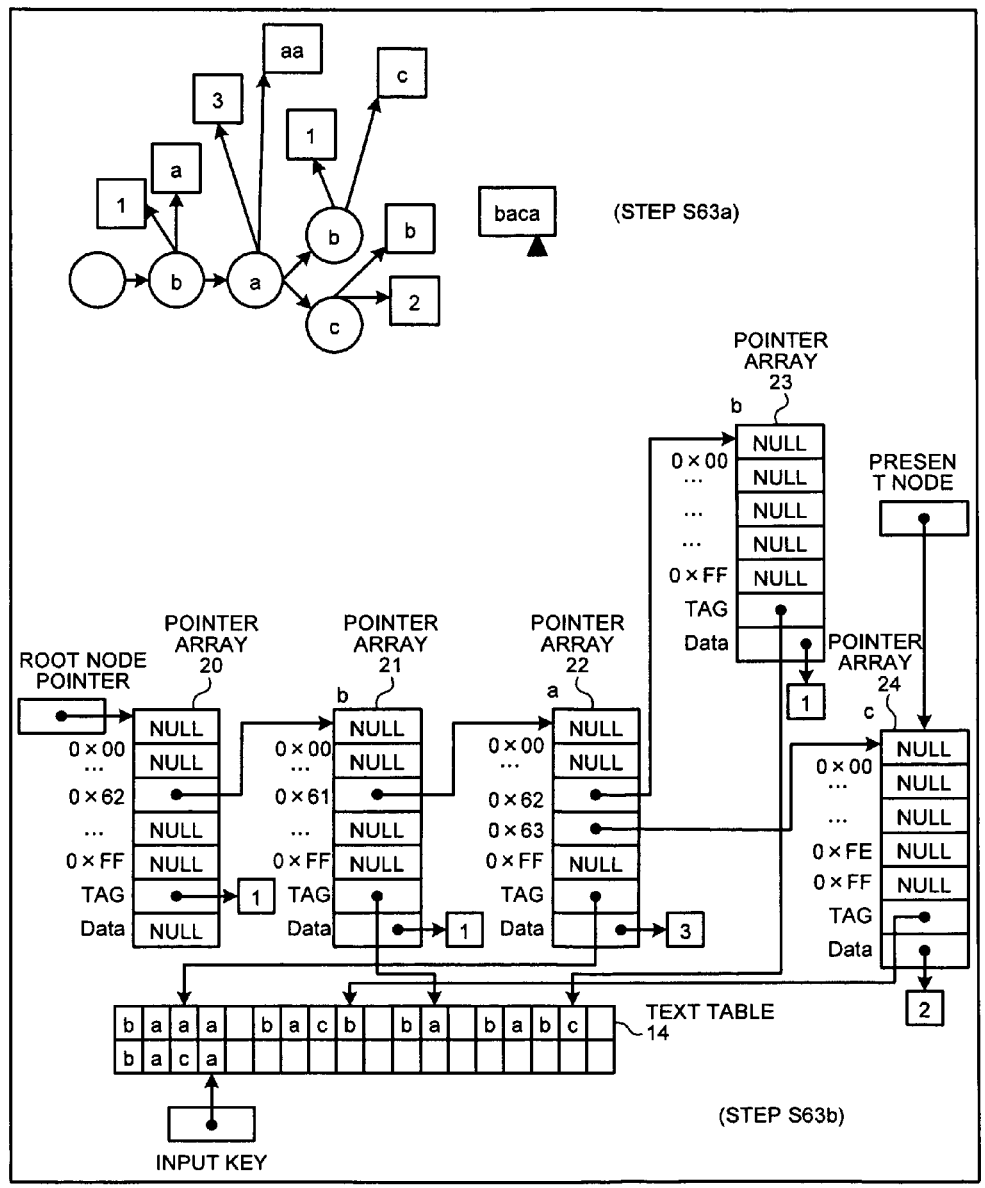
FIG. 39 is a diagram (4) explaining a retrieval process when the binary search is not used.

It will be explained with reference to FIG. 39. Because a child node corresponding to "a" designated by the pointer does not exist in the node "c", the trie tree searching unit 150b compares the priority of the tag key "b" registered in the node "c" and the priority of the input key "a" obtained by removing the trie part "bac". As the comparison result, the trie tree searching unit 150b determines that the priority of the tag key is larger than the priority of the input key (Step S63a).

The trie tree searching unit 150b compares, on real data, the priority of the character "b" connected to "TAG" of the pointer array 24 and the priority of the character "a" connected to the pointer of the input key. As the comparison result, the trie tree searching unit 150b determines that the priority of the tag key is larger than the priority of the input key (Step S63b).

Figure 40:
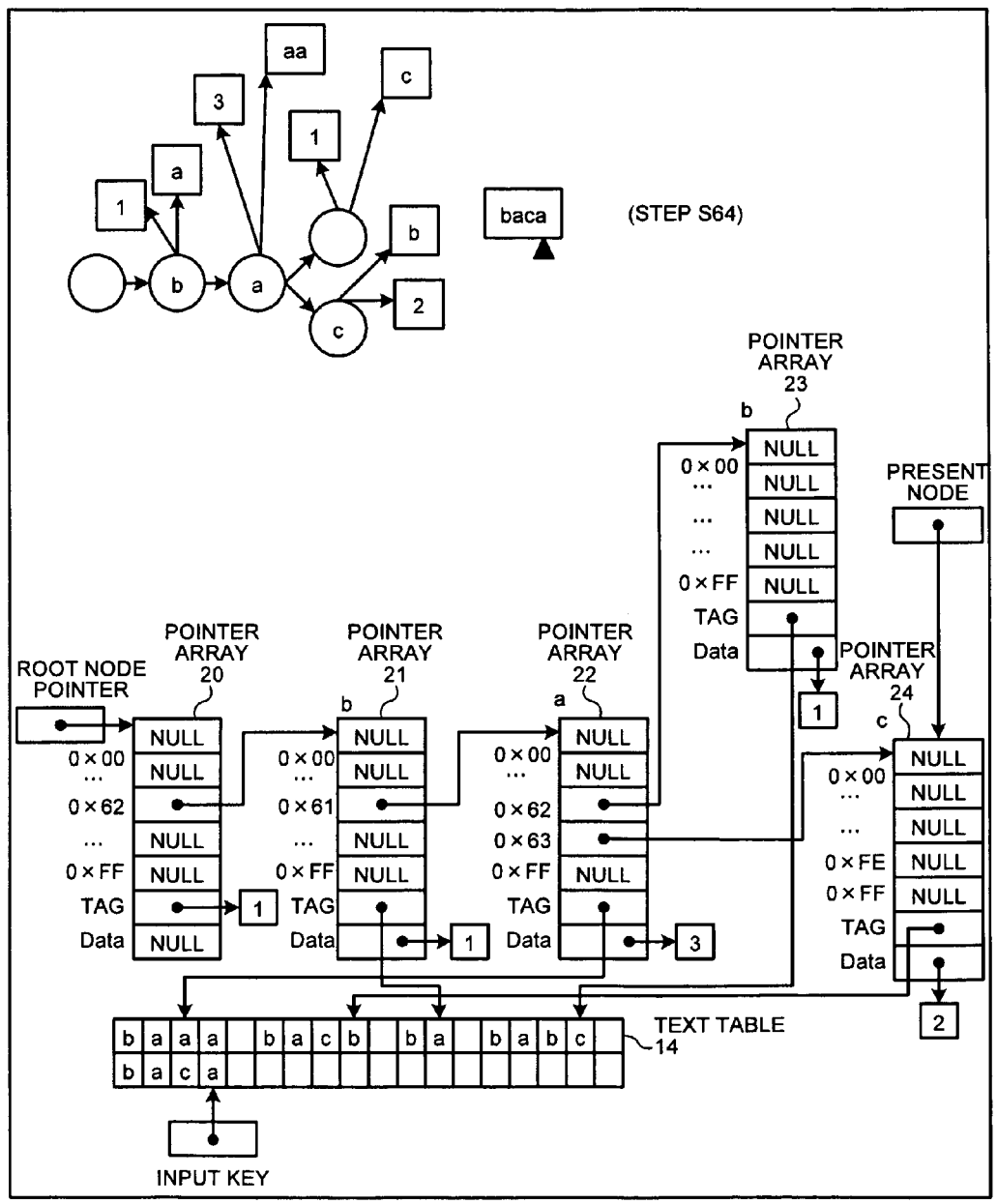
FIG. 40 is a diagram (5) explaining a retrieval process when the binary search is not used.

It will be explained with reference to FIG. 40. Because the node "c" has an elder node (node "b(2)"), nodes (node "a", node "b(1)") before the node "c" do not have a tag key identical with the input key and thus the trie tree searching unit 150b outputs the effect that there is not corresponding data (Step S64).

Figure 41:
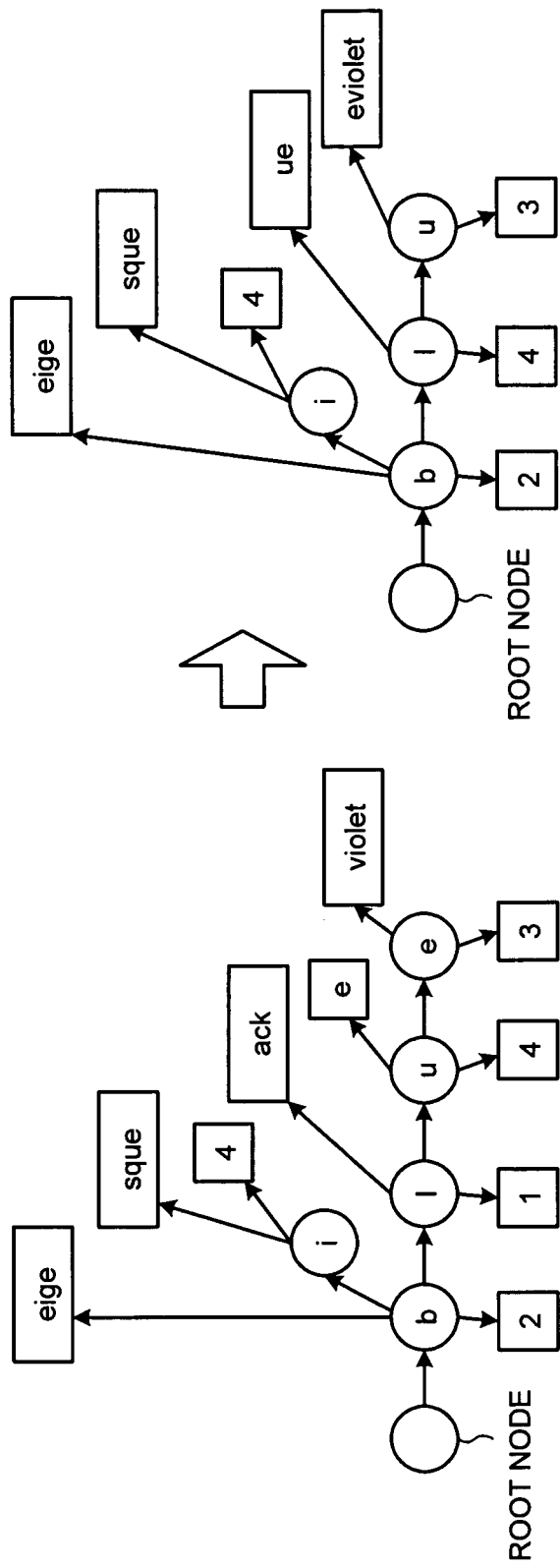
FIG. 41 is a diagram explaining a deletion process.

Meanwhile, when a key to be deleted from the trie tree 140b is designated, the trie tree searching unit 150b deletes the designated input key from the trie tree 140b. FIG. 41 is a diagram explaining a deletion process. Herein, it will be explained about the case where a tag key "black" and a value "1" are deleted from a trie tree illustrated at the left side of FIG. 41.

Similarly to the retrieval process described above, the trie tree searching unit 150b first searches a node "l" having the same tag key as that of the input key "black", and deletes the tag key "ack" and the value "1" registered in the node "l".

Then, the trie tree searching unit 150b registers, in the node "l", the tag key "e(blue)" and the value "4" of the node "u" that is the eldest node of the node "l". Moreover, the trie tree searching unit 150b registers, in the node "u", the tag key "blueviolet" and the value "3" of the node "e" that is the eldest node of the node "u", and deletes the node "e" from the trie tree. The trie tree searching unit 150b deletes the key "black" and the value "1" from the trie tree illustrated at the left side of FIG. 41 to generate a trie tree illustrated at the right side of FIG. 41.

Figure 42:
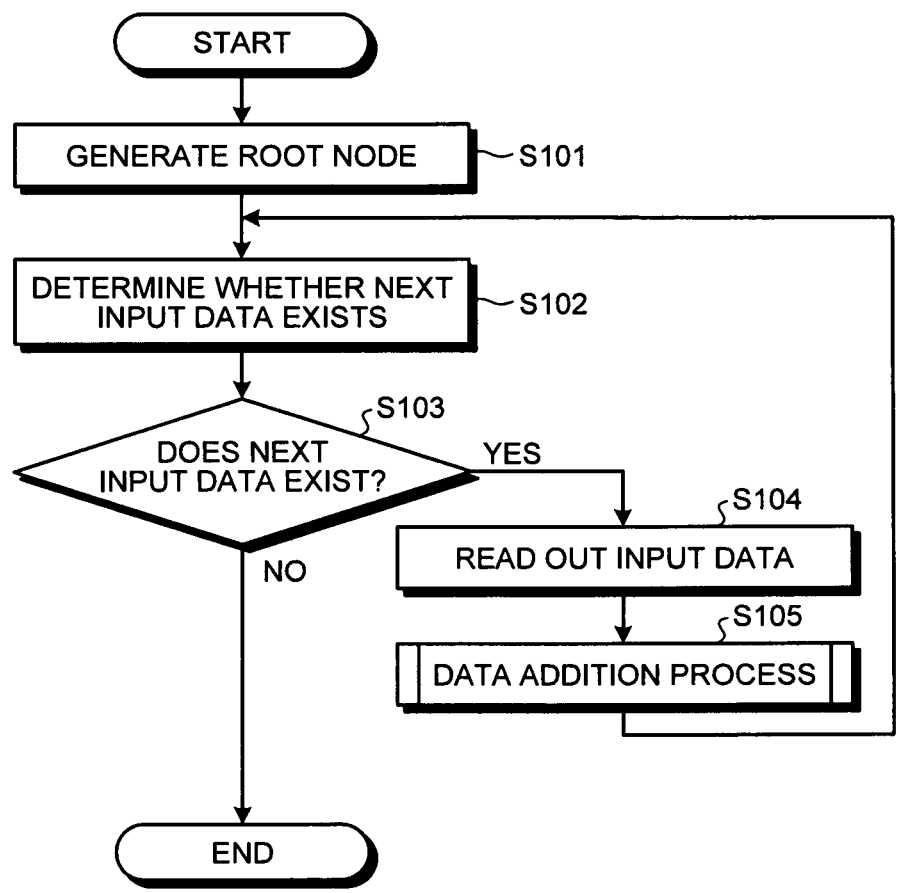
FIG. 42 is a flowchart illustrating processing procedures of a trie tree generation process.

Next, it will be explained about various types of processing procedures of the retrieval device 100 according to the present embodiment. First, it will be explained about the case where the retrieval device 100 according to the present embodiment generates the trie tree 140b. FIG. 42 is a flowchart illustrating processing procedures of a trie tree generation process.

As illustrated in FIG. 42, the trie tree generating unit 150a generates a root node (Step S101), and determines whether the next input data (key, value) exists in the registration data management table 140a (Step S102).

When it is determined that the next input data does not exist in the registration data management table 140a (Step S103: No), the trie tree generating unit 150a terminates the process. On the other hand, when the next input data is registered in the registration data management table (Step S103: Yes), the trie tree generating unit 150a reads out unread input data (Step S104) and executes a data addition process (Step S105).

Next, it will be explained about processing procedures of the data addition process illustrated at Step S105 of FIG. 42. Herein, two examples are explained about the case where the data addition process is performed without using a binary search and the case where the data addition process is performed by using the binary search.

Figure 43:
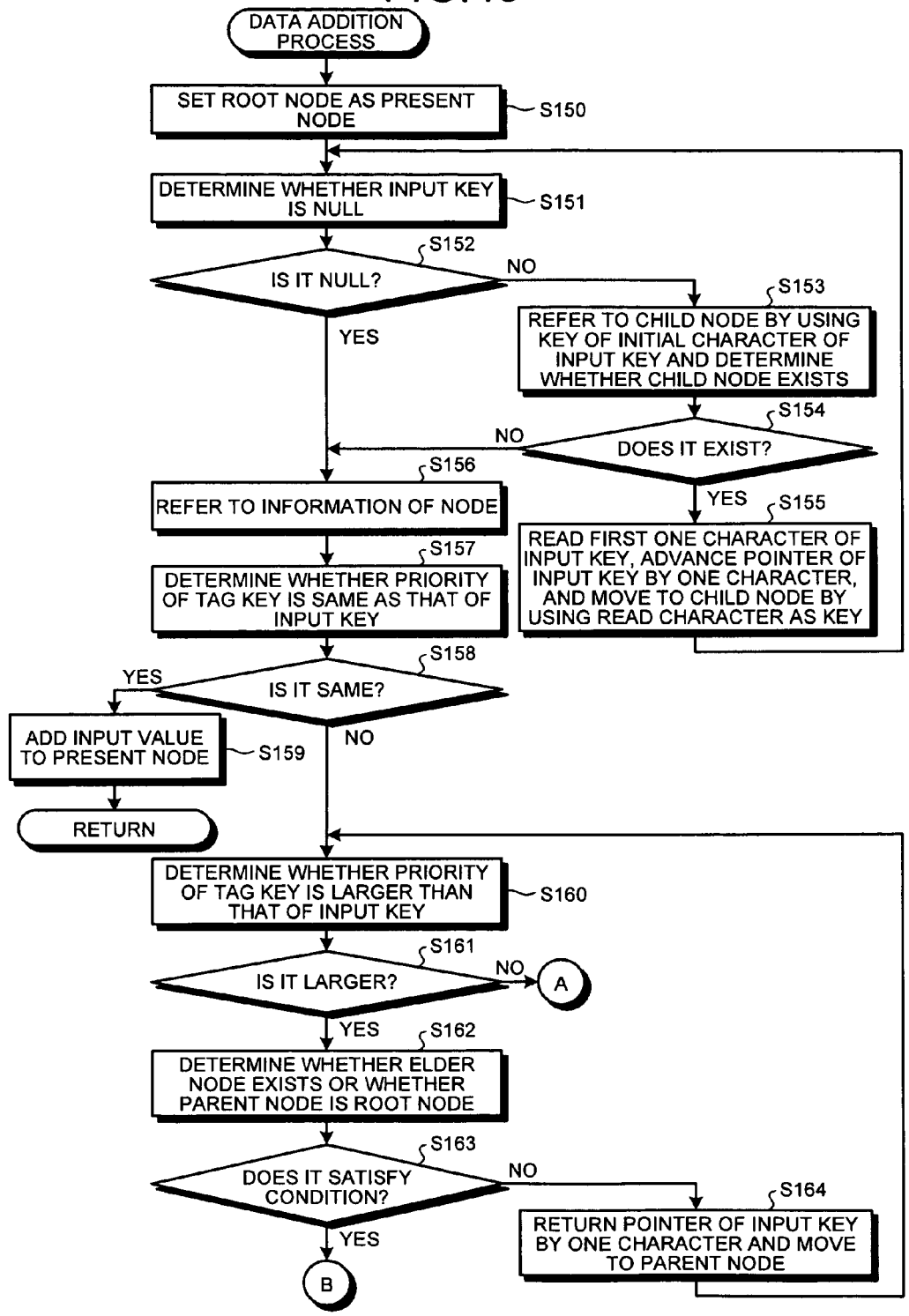
FIG. 43 is a flowchart (1) illustrating processing procedures of a data addition process in which the binary search is not used.
Figure 44:
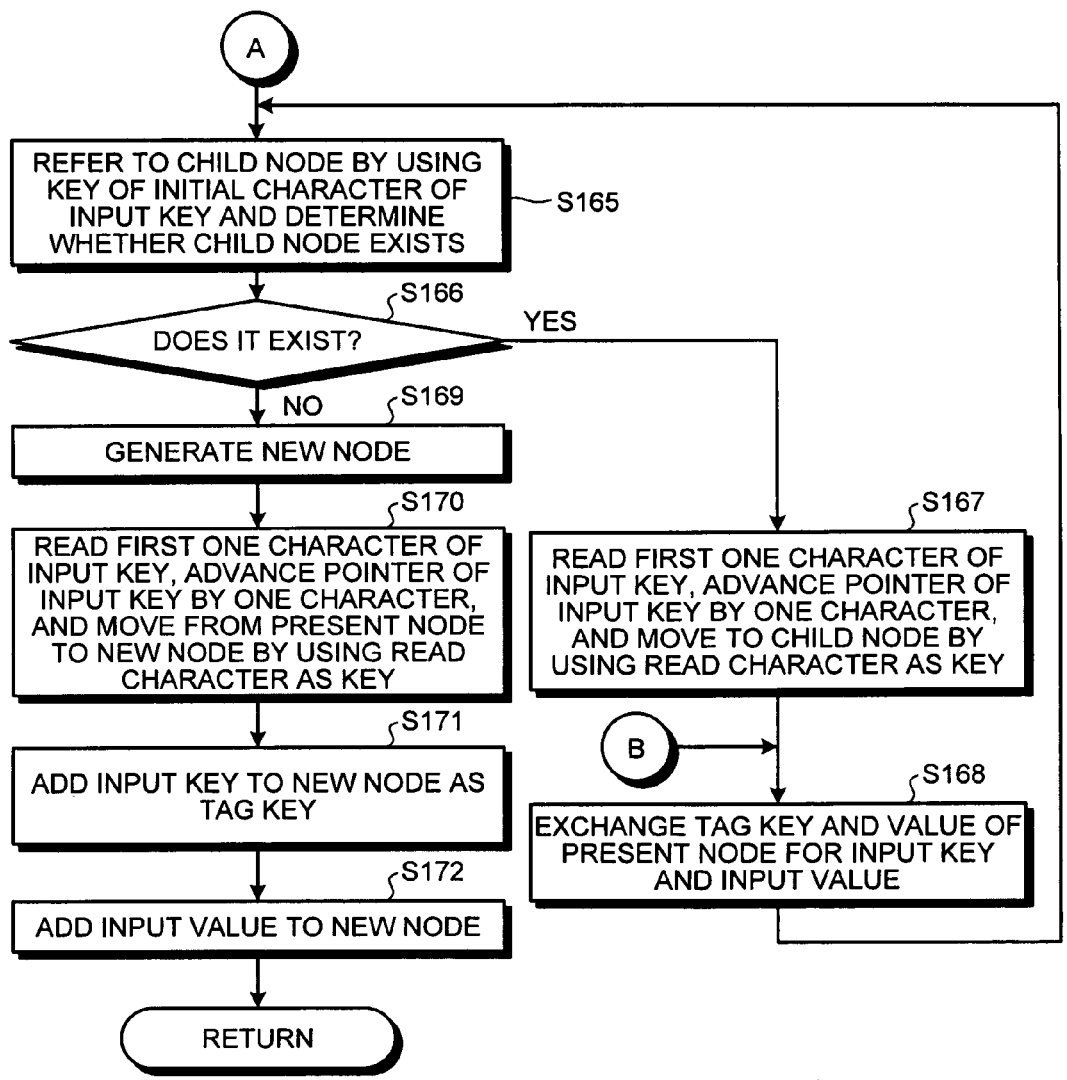
FIG. 44 is a flowchart (2) illustrating processing procedures of a data addition process in which the binary search is not used.

FIGS. 43 and 44 are flowcharts illustrating processing procedures of the data addition process in which the binary search is not used. As illustrated in FIG. 43, the trie tree generating unit 150a sets the root node as the present node (Step S150) and determines whether the input key is null (Step S151).

When the input key is not null (Step S152: No), the trie tree generating unit 150a refers to a child node by using the key of the initial character of the input key and determines whether a child node exists (Step S153). When a child node exists (Step S154: Yes), the trie tree generating unit 150a reads the first one character of the input key, advances the pointer of the input key by one character, moves to the child node by using the read character as a key (Step S155), and moves the process control to Step S151.

On the other hand, when a child node does not exist (Step S154: No), the trie tree generating unit 150a moves the process control to Step S156.

Meanwhile, when the input key is null at Step S152 (Step S152: Yes), the trie tree generating unit 150a refers to the information on the node (Step S156), and determines whether the priority of the tag key is the same as that of the input key (the tag key is the same as the input key) (Step S157). When the priority of the tag key and the priority of the input key are the same (Step S158: Yes), the trie tree generating unit 150a adds an input value (value corresponding to input key) to the present node (Step S159), and terminates the data addition process.

On the other hand, when the priority of the input key is different from that of the tag key (Step S158: No), the trie tree generating unit 150a determines whether the priority of the tag key is larger than that of the input key (Step S160). When the priority of the tag key is smaller than that of the input key (Step S161: No), the trie tree generating unit 150a moves the process control to Step S164.

When the priority of the tag key is larger than that of the input key (Step S161: Yes), the trie tree generating unit 150a determines whether an elder node exists or whether a parent node is the root node (Step S162). When an elder node does not exist and a parent node is not the root node (when it does not satisfy a condition) (Step S163: No), the trie tree generating unit 150a returns the pointer of the input key by one character, moves to the parent node (Step S164), and moves the process control to Step S160.

On the other hand, when an elder node exists or a parent node is the root node (when it satisfies the condition) (Step S163: Yes), the trie tree generating unit 150a exchanges the tag key and the value of the present node for the input key and the input value (Step S168), and moves the process control to Step S165.

Meanwhile, when the priority of the tag key is smaller than that of the input key at Step S161 (Step S161: No), the trie tree generating unit 150a refers to a child node by using the key of the initial character of the input key and determines whether a child node exists (Step S165).

When a child node exists (Step S166: Yes), the trie tree generating unit 150a reads the first one character of the input key, advances the pointer of the input key by one character, moves to the child node by using the read character as a key (Step S167), and moves the process control to Step S168.

On the other hand, when a child node does not exist (Step S166: No), the trie tree generating unit 150a generates a new node (Step S169), reads the first one character of the input key, advances the pointer of the input key by one character, and moves from the present node to the new node by using the read character as a key (Step S170).

The trie tree generating unit 150a adds the input key to the new node as a tag key (Step S171), adds the input value to the new node (Step S172), and terminates the data addition process.

Figure 45:
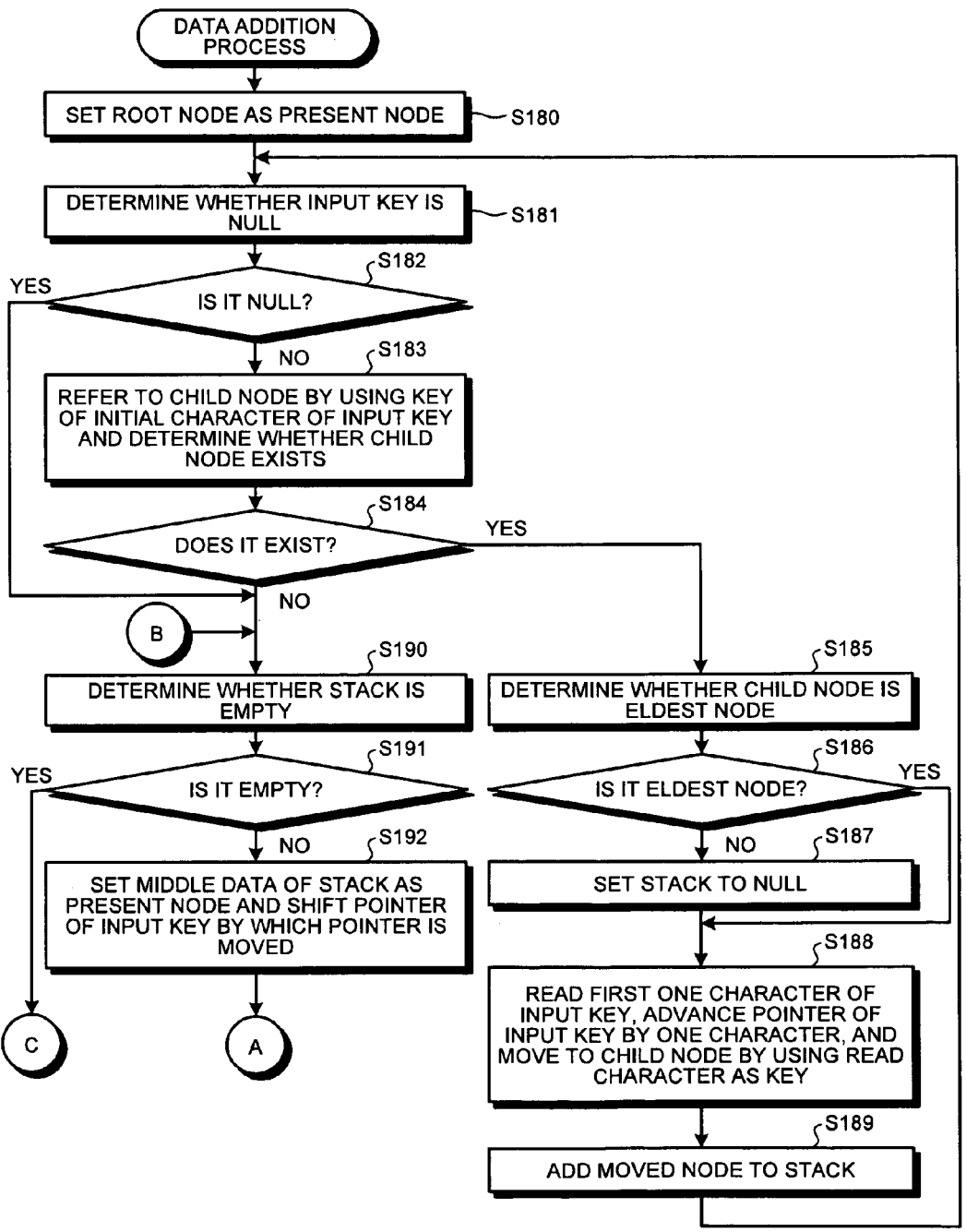
FIG. 45 is a flowchart (1) illustrating processing procedures of a data addition process in which the binary search is used.
Figure 46:
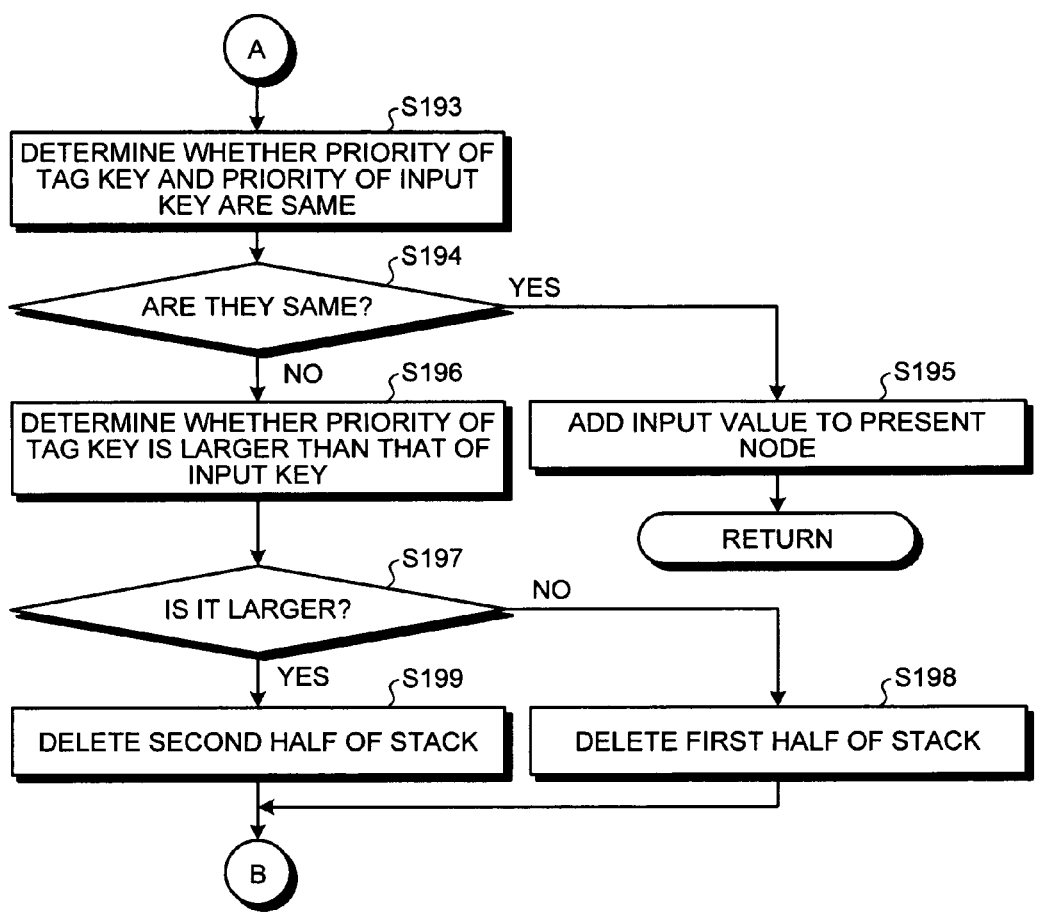
FIG. 46 is a flowchart (2) illustrating processing procedures of a data addition process in which the binary search is used.
Figure 47:
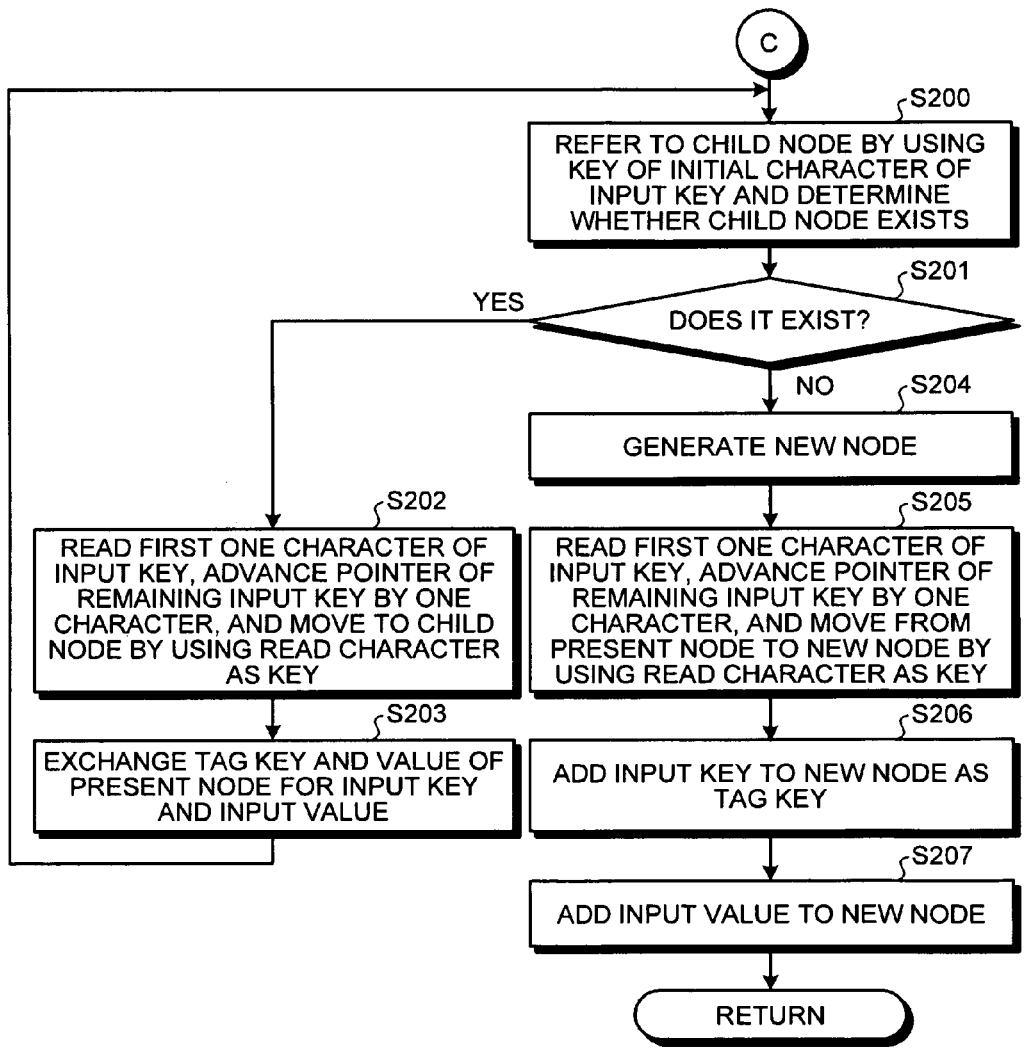
FIG. 47 is a flowchart (3) illustrating processing procedures of a data addition process in which the binary search is used.

FIGS. 45 to 47 are flowcharts illustrating processing procedures of a data addition process in which the binary search is used. The trie tree generating unit 150a sets the root node as the present node (Step S180), and determines whether the input key is null (Step S181).

When the input key is null (Step S182: Yes), the trie tree generating unit 150a moves the process control to Step S190. On the other hand, when the input key is not null (Step S182: No), the trie tree generating unit 150a refers to a child node by using the key of the initial character of the input key and determines whether a child node exists (Step S183).

When a child node exists (Step S184: Yes), the trie tree generating unit 150a determines whether the child node is an eldest node (Step S185), and moves the process control to Step S188 when the child node is an eldest node (Step S186: Yes).

On the other hand, when the child node is not an eldest node (Step S186: No), the trie tree generating unit 150a sets a stack to null (Step S187), reads the first one character of the input key, advances the pointer of the input key by one character, and moves to the child node by using the read character as a key (Step S188). The trie tree generating unit 150a adds the moved node to the stack (Step S189), and moves the process control to Step S181.

Meanwhile, when a child node does not exist at Step S184 (Step S184: No), the trie tree generating unit 150a determines whether the stack is empty (Step S190). When the stack is not empty (Step S191: No), the trie tree generating unit 150a sets the middle data of the stack as the present node and shifts the pointer of the input key by which the pointer is moved (Step S192).

Referring to FIG. 46, the trie tree generating unit 150a determines whether the priority of the tag key and the priority of the input key are the same (Step S193). When the priority of the tag key and the priority of the input key are the same (Step S194: Yes), the trie tree generating unit 150a adds the input value to the present node (Step S195).

On the other hand, when the priority of the input key is different from that of the tag key (Step S194: No), the trie tree generating unit 150a determines whether the priority of the tag key is larger than that of the input key (Step S196).

When the priority of the tag key is larger than that of the input key (Step S197: Yes), the trie tree generating unit 150a deletes the second half of the stack that includes the middle of the stack (Step S199), and moves the process control to Step S190 of FIG. 45.

On the other hand, when the priority of the tag key is smaller than that of the input key (Step S197: No), the trie tree generating unit 150a deletes the first half of the stack that includes the middle of the stack (Step S198), and moves the process control to Step S190 of FIG. 45.

Meanwhile, when the stack is empty at Step S191 of FIG. 45 (Step S191: Yes), the trie tree generating unit 150a refers to a child node by using the key of the initial character of the input key and determines whether a child node exists referring to FIG. 47 (Step S200).

When a child node exists (Step S201: Yes), the trie tree generating unit 150a reads the first one character of the input key, advances the pointer of the remaining input key by one character, and moves to the child node by using the read character as a key (Step S202). Then, the trie tree generating unit 150a exchanges the tag key and the value of the present node for the input key and the input value (Step S203), and moves the process control to Step S200.

On the other hand, when a child node does not exist (Step S201: No), the trie tree generating unit 150a generates a new node (Step S204), reads the first one character of the input key, advances the pointer of the remaining input key by one character, and moves from the present node to the new node by using the read character as a key (Step S205). The trie tree generating unit 150a adds the input key to the new node as a tag key (Step S206) and adds the input value to the new node (Step S207).

Next, it will be explained about the case where the retrieval device according to the present embodiment performs a retrieval process by using the trie tree 140b. Herein, it will be explained about the case where a retrieval process is executed without using a binary search and the case where the retrieval process is executed by using the binary search.

Figure 48:
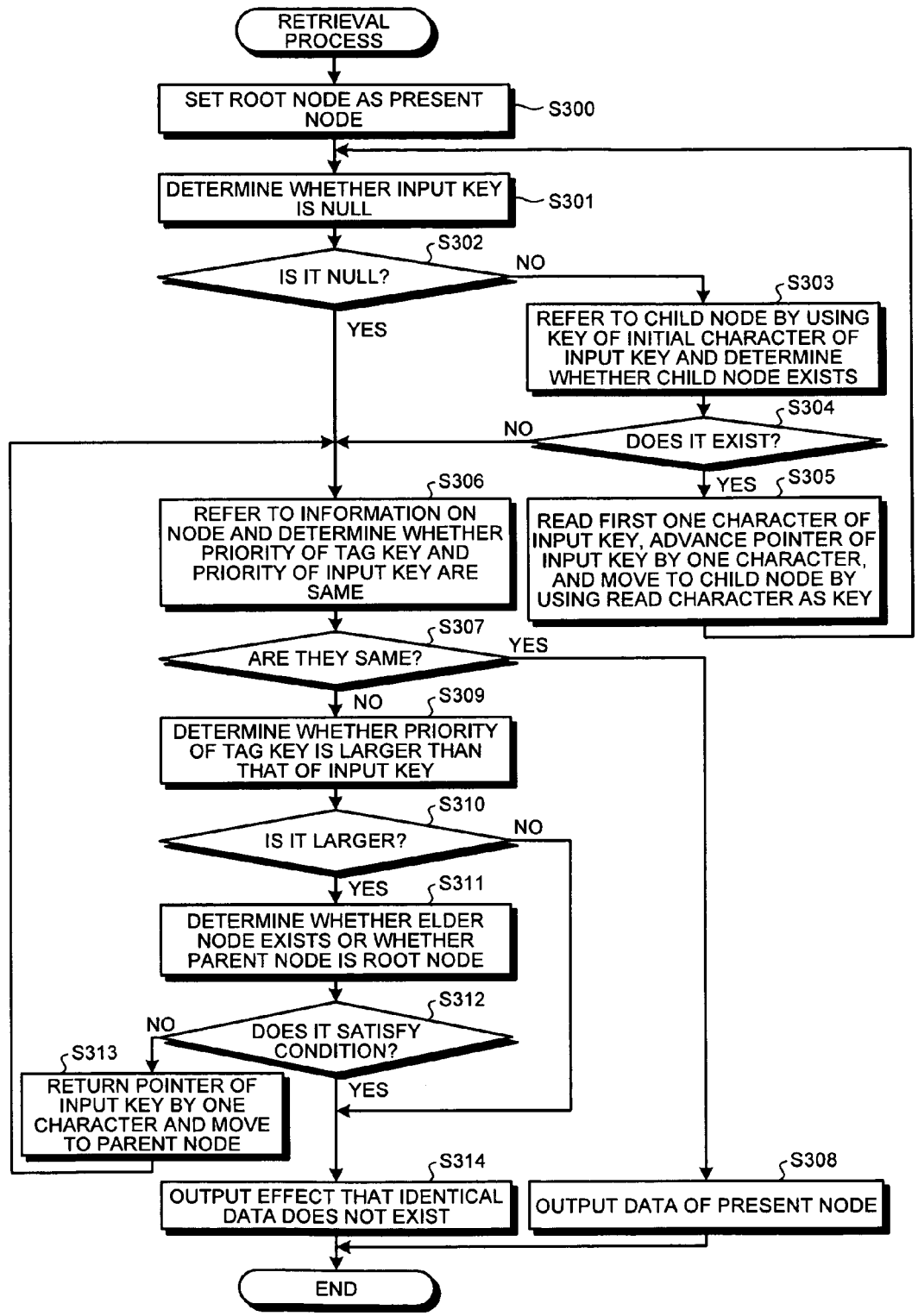
FIG. 48 is a flowchart illustrating processing procedures of a retrieval process in which the binary search is not used.

First, it will be explained about processing procedures of a retrieval process in which the binary search is not used. FIG. 48 is a flowchart illustrating processing procedures of a retrieval process in which the binary search is not used. As illustrated in FIG. 48, the trie tree searching unit 150b sets the root node as the present node (Step S300) and determines whether an input key is null (Step S301).

When the input key is not null (Step S302: No), the trie tree searching unit 150b refers to a child node by using the key of the initial character of the input key and determines whether a child node exists (Step S303). When a child node does not exist (Step S304: No), the trie tree searching unit 150b moves the process control to Step S306.

On the other hand, when a child node exists (Step S304: Yes), the trie tree searching unit 150b reads the first one character of the input key, advances the pointer of the input key by one character, moves to the child node by using the read character as a key (Step S305), and moves the process control to Step S301.

Meanwhile, when the input key is null at Step S302 (Step S302: Yes), the trie tree searching unit 150b refers to information on the node and determines whether the priority of the tag key and the priority of the input key are the same (Step S306). When the priority of the tag key and the priority of the input key are the same (Step S307: Yes), the trie tree searching unit 150b outputs the data (value) of the present node (Step S308).

On the other hand, when the priority of the input key is different from that of the tag key (Step S307: No), the trie tree searching unit 150b determines whether the priority of the tag key is larger than that of the input key (Step S309). When the priority of the tag key is smaller than that of the input key (Step S310: No), the trie tree searching unit 150b moves the process control to Step S314.

On the other hand, when the priority of the tag key is larger than that of the input key (Step S310: Yes), the trie tree searching unit 150b determines whether an elder node exists or whether a parent node is the root node (Step S311).

When an elder node does not exist and a parent node is not the root node (when it does not satisfy a condition) (Step S312: No), the trie tree searching unit 150b returns the pointer of the input key by one character and moves to the parent node (Step S313).

On the other hand, when an elder node exist or when a parent node is the root node (it satisfies the condition) (Step S312: Yes), the trie tree searching unit 150b outputs the effect that matching data does not exist (Step S314).

Next, it will be explained about processing procedures of the retrieval process in which the binary search is used.

Figure 49:
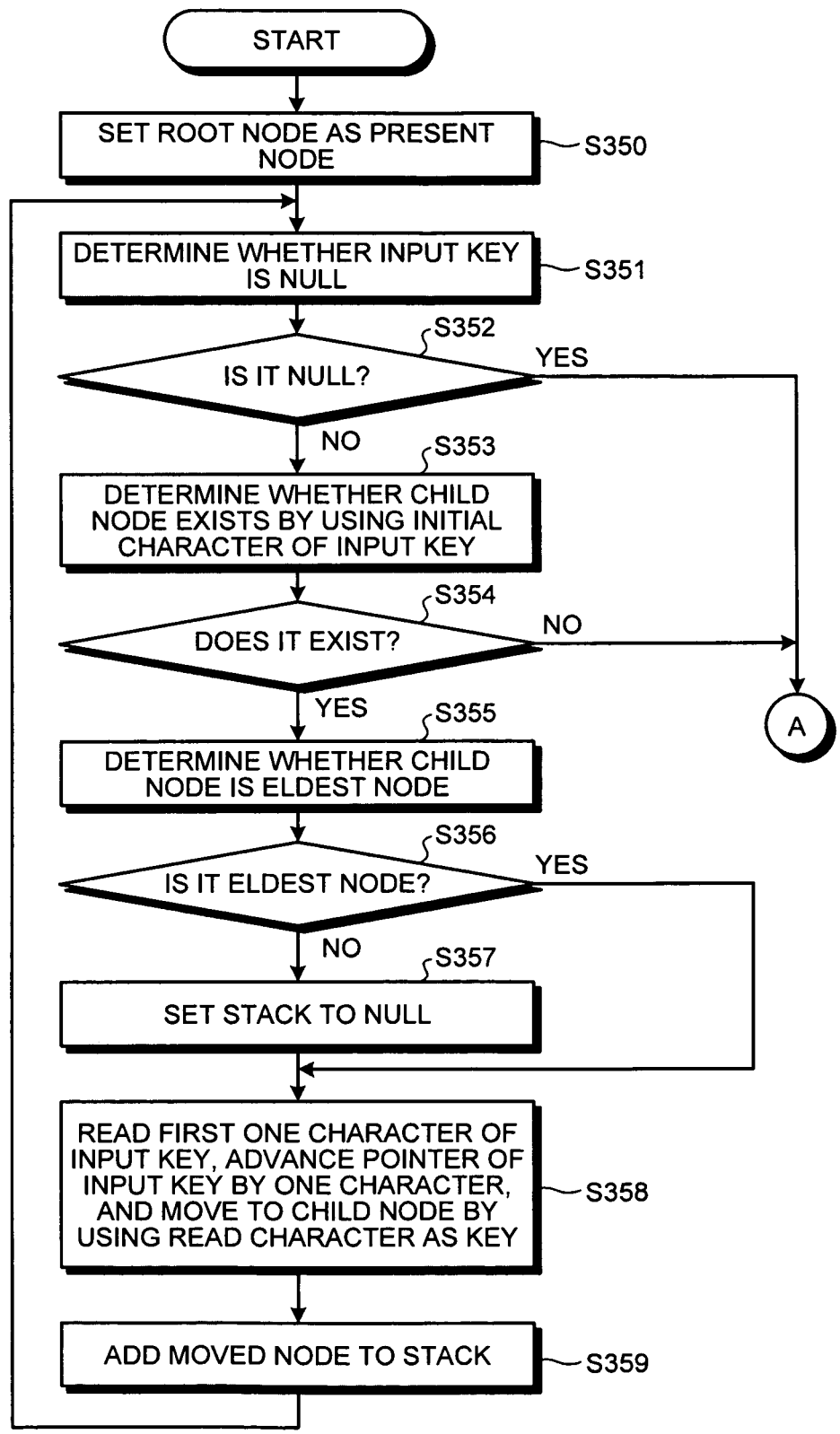
FIG. 49 is a flowchart (1) illustrating processing procedures of a retrieval process in which the binary search is used.
Figure 50:
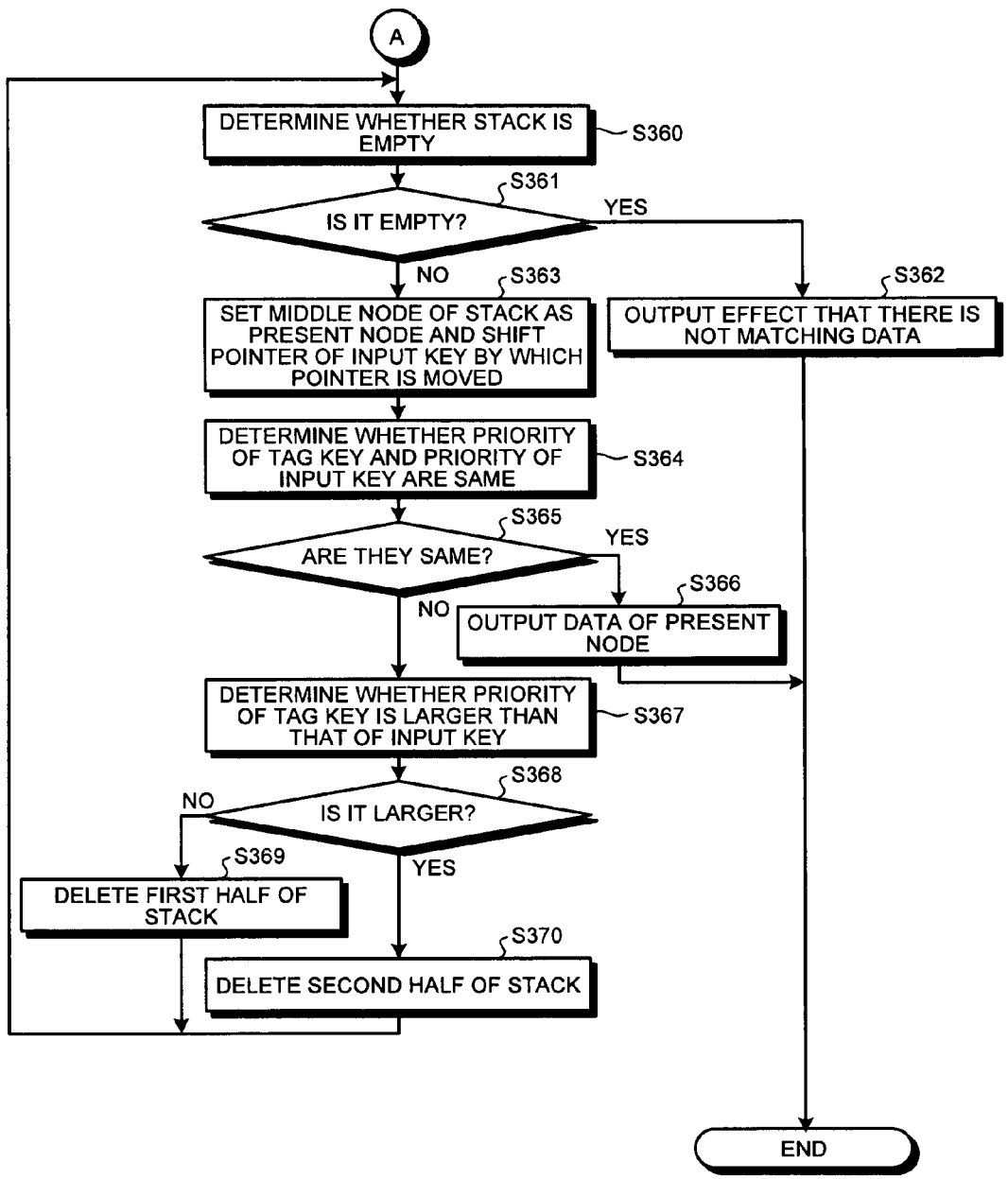
FIG. 50 is a flowchart (2) illustrating processing procedures of a retrieval process in which the binary search is used.

FIGS. 49 and 50 are flowcharts illustrating processing procedures of the retrieval process in which the binary search is used. As illustrated in FIG. 49, the trie tree searching unit 150b sets the root node as the present node (Step S350) and determines whether an input key is null (Step S351).

When the input key is null (Step S352: Yes), the trie tree searching unit 150b moves the process control to Step S360 of FIG. 50. On the other hand, when the input key is not null (Step S352: No), the trie tree searching unit 150b determines whether a child node exists by using the key of the initial character of the input key (Step S353).

When a child node does not exist (Step S354: No), the trie tree searching unit 150b moves the process control to Step S360 of FIG. 50. On the other hand, when a child node exists (Step S354: Yes), the trie tree searching unit 150b determines whether the child node is an eldest node (Step S355).

When the child node is an eldest node (Step S356: Yes), the trie tree searching unit 150b moves the process control to Step S358. On the other hand, when the child node is not an eldest node (Step S356: No), the trie tree searching unit 150b sets the stack to null (Step S357).

The trie tree searching unit 150b reads the first one character of the input key, advances the pointer of the input key by one character, and moves to the child node by using the read character as a key (Step S358). Then, the trie tree searching unit 150b adds the moved node to the stack (Step S359) and moves the process control to Step S351.

Meanwhile, when the input key is null at Step S352 (Step S352: Yes) or when a child node does not exist at Step S354 (Step S354: No), the trie tree searching unit 150b moves the process control to Step S360 of FIG. 50.

In FIG. 50, the trie tree searching unit 150b determines whether the stack is empty (Step S360). When the stack is empty (Step S361: Yes), the trie tree searching unit 150b outputs the effect that there is not matching data (Step S362).

On the other hand, when the stack is not empty (Step S361: No), the trie tree searching unit 150b sets the middle node of the stack as the present node and shifts the pointer of the input key by which the pointer is moved (Step S363).

The trie tree searching unit 150b determines whether the priority of the tag key and the priority of the input key are the same (Step S364). When the priority of the tag key and the priority of the input key are the same (Step S365: Yes), the trie tree searching unit 150b outputs the data (value) of the present node (Step S366).

On the other hand, when the priority of the input key is different from that of the tag key (Step S365: No), the trie tree searching unit 150b determines whether the priority of the tag key is larger than that of the input key (Step S367).

When the priority of the tag key is smaller than that of the input key (Step S368: No), the trie tree searching unit 150b deletes the first half of the stack that includes the middle of the stack (Step S369) and moves the process control to Step S360.

On the other hand, when the priority of the tag key is larger than that of the input key (Step S368: Yes), the trie tree searching unit 150b deletes the second half of the stack that includes the middle of the stack (Step S370) and moves the process control to Step S360.

Figure 51:
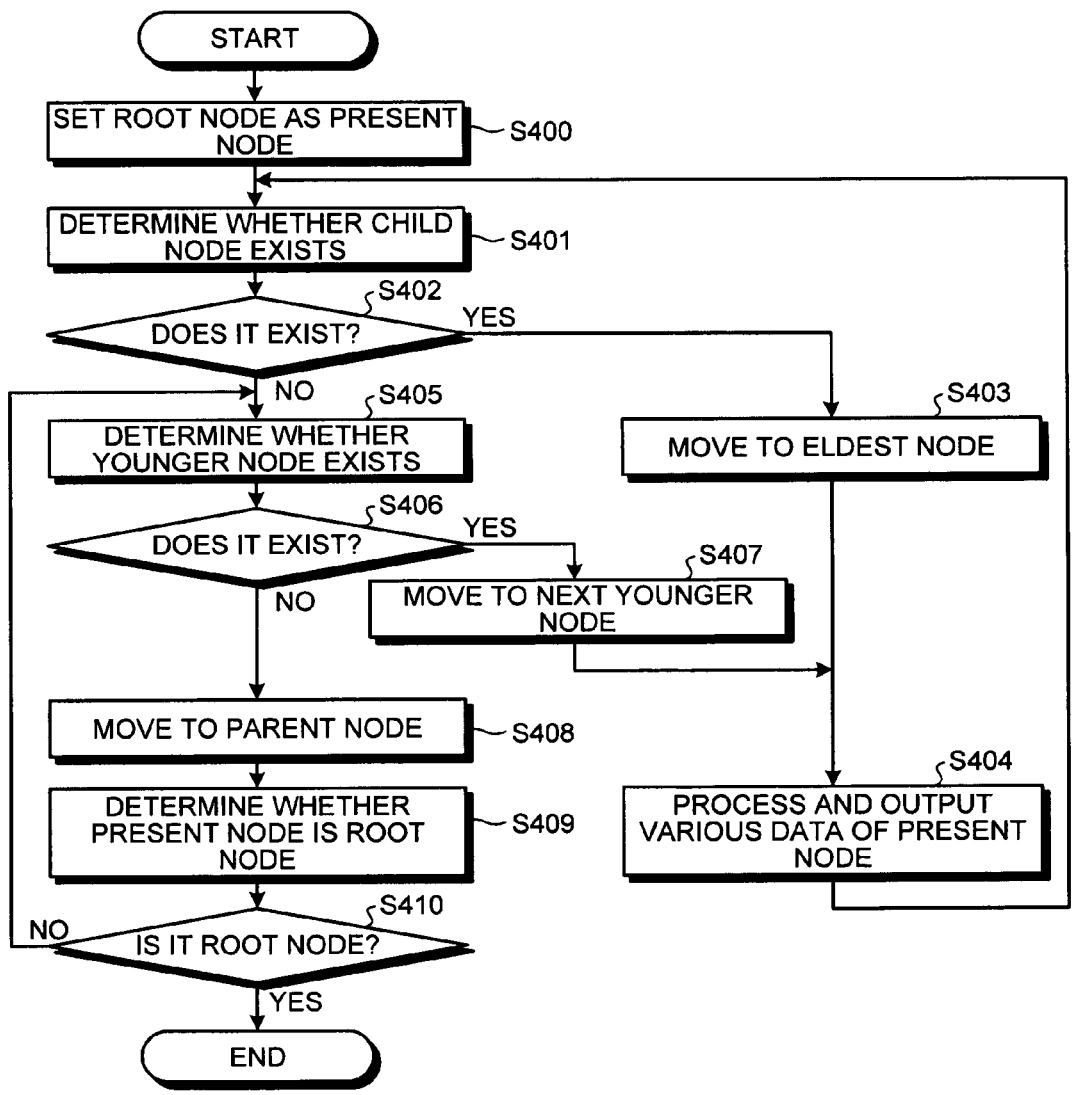
FIG. 51 is a flowchart illustrating processing procedures of a summary value extraction process.

Next, it will be explained about a process in which the retrieval device 100 extracts a summary value. FIG. 51 is a flowchart illustrating processing procedures of a summary value extraction process. As illustrated in FIG. 51, the trie tree searching unit 150b sets the root node as the present node (Step S400), and determines whether a child node exists (Step S401).

When a child node exists (Step S402: Yes), the trie tree searching unit 150b moves to an eldest node among child nodes (Step S403), processes and outputs the various data of the present node (Step S404), and moves the process control to Step S401. At Step S404, when several values are registered in the eldest node, for example, the trie tree searching unit 150b performs a process for adding the values and outputs the added value.

On the other hand, when a child node does not exist (Step S402: No), the trie tree searching unit 150b determines whether a younger node exists (Step S405). When a younger node exists (Step S406: Yes), the trie tree searching unit 150b moves to the next younger node (Step S407) and moves the process control to Step S404.

On the other hand, when a younger node does not exist (Step S406: No), the trie tree searching unit 150b moves to the parent node (Step S408) and determines whether the present node is the root node (Step S409).

When the present node is not the root node (Step S410: No), the trie tree searching unit 150b moves the process control to Step S405. On the other hand, when the present node is the root node (Step S410: Yes), the trie tree searching unit 150b terminates the process.

Figure 52:
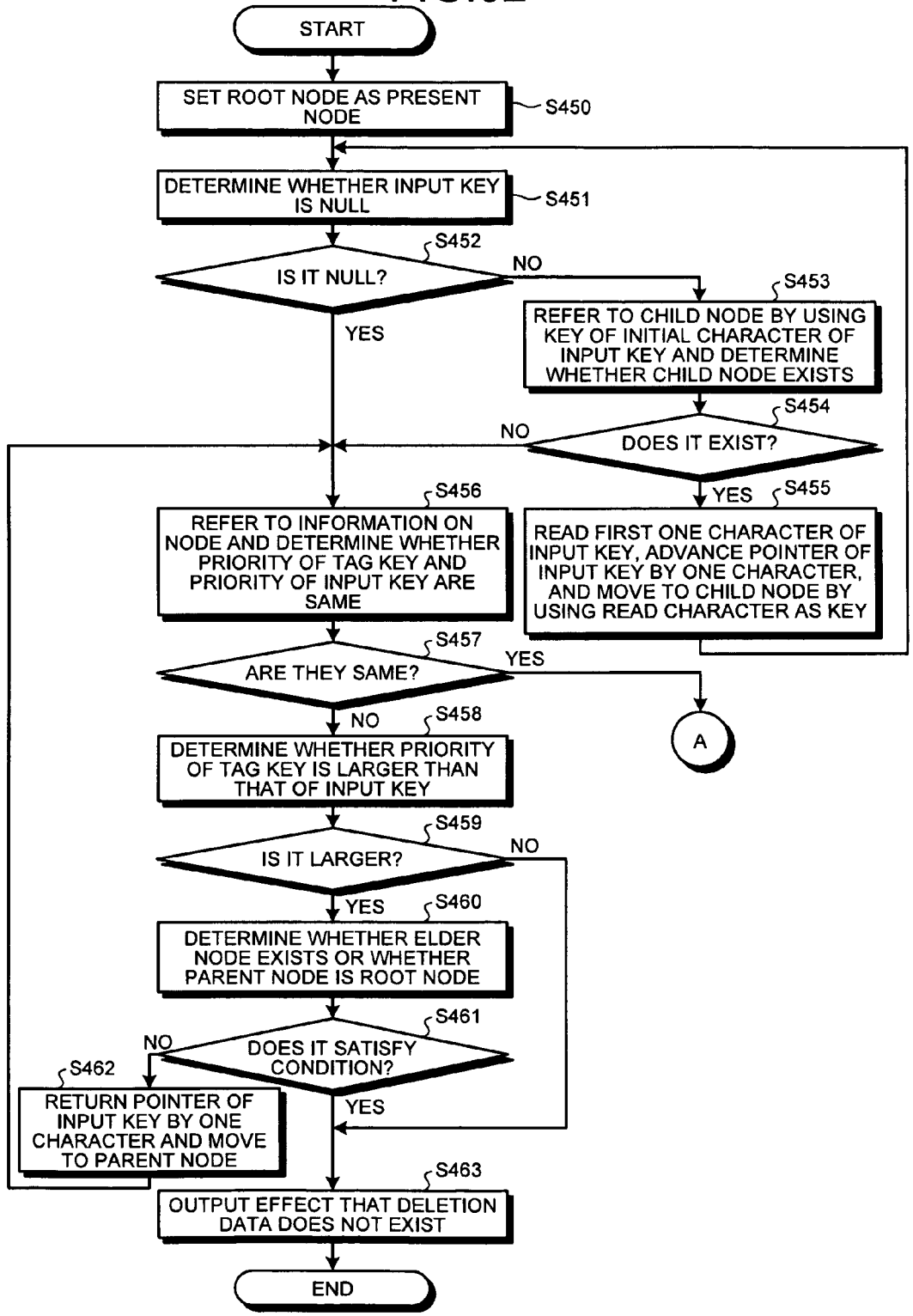
FIG. 52 is a flowchart (1) illustrating processing procedures of a deletion process.
Figure 53:
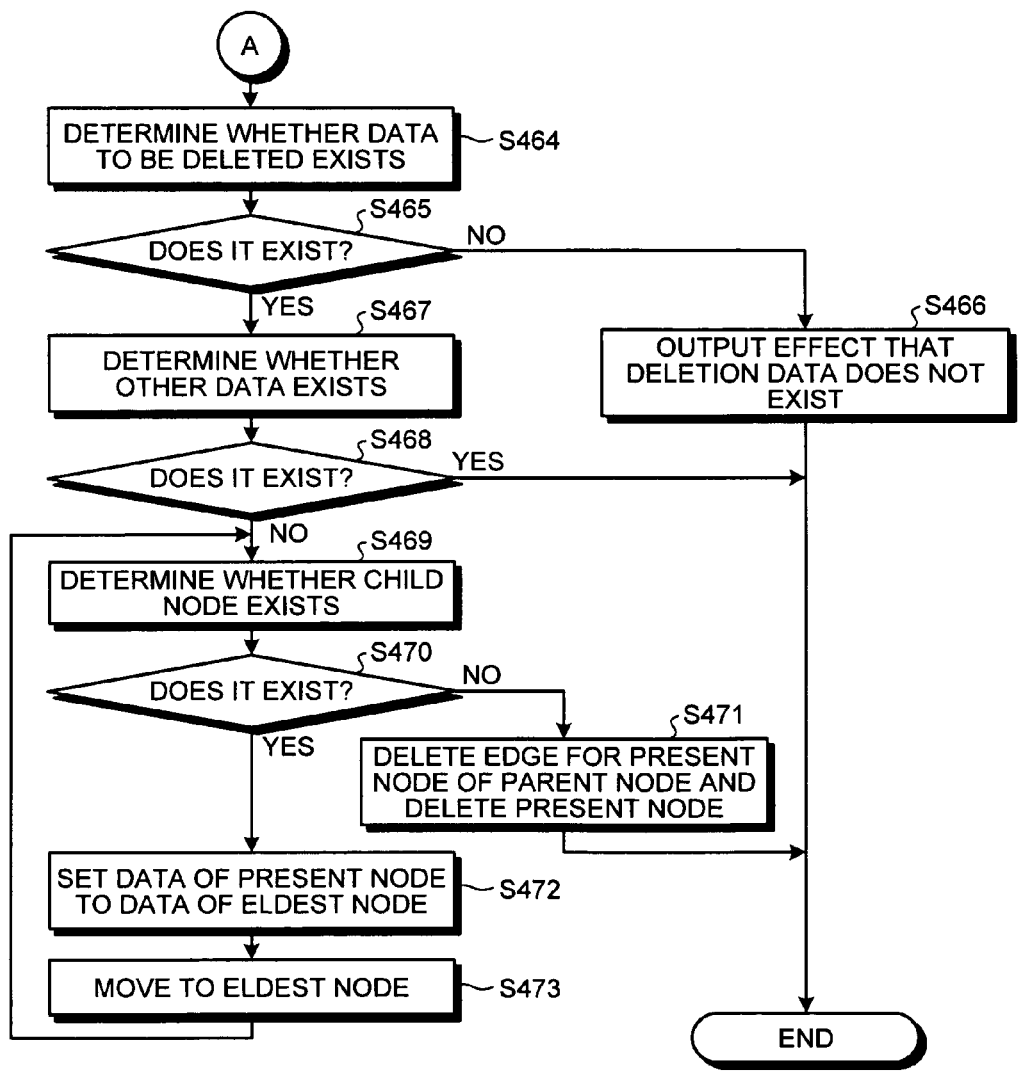
FIG. 53 is a flowchart (2) illustrating processing procedures of the deletion process.

Next, it will be explained about a deletion process in which the retrieval device 100 deletes the data of the trie tree 140b. FIGS. 52 and 53 are flowcharts illustrating processing procedures of a deletion process. As illustrated in FIG. 52, the trie tree searching unit 150b sets a root node as the present node (Step S450) and determines whether an input key is null (Step S451).

When the input key is not null (Step S452: No), the trie tree searching unit 150b refers to a child node by using the key of the initial character of the input key and determines whether a child node exists (Step S453). When a child node does not exist (Step S454: No), the trie tree searching unit 150b moves the process control to Step S456.

On the other hand, when a child node exists (Step S454: Yes), the trie tree searching unit 150b reads the first one character of the input key, advances the pointer of the input key by one character, moves to the child node by using the read character as a key (Step S455), and moves the process control to Step S451.

Meanwhile, when the input key is null at Step S452 (Step S452: Yes), the trie tree searching unit 150b refers to information on the node and determines whether the priority of the tag key is the same as that of the input key (Step S456).

When the priority of the tag key and the priority of the input key are not the same (Step S457: No), the trie tree searching unit 150b determines whether the priority of the tag key is larger than that of the input key (Step S458). When the priority of the tag key is smaller than that of the input key (Step S459: No), the trie tree searching unit 150b moves the process control to Step S463.

When the priority of the tag key is larger than that of the input key (Step S459: Yes), the trie tree searching unit 150b determines whether an elder node exists or whether the parent node is the root node (Step S460).

When an elder node does not exist and the parent node is not the root node (when it does not satisfy a condition) (Step S461: No), the trie tree searching unit 150b returns the pointer of the input key by one character to move to the parent node (Step S462), and moves the process control to Step S456.

On the other hand, when an elder node exists or when the parent node is the root node (Step S461: Yes), the trie tree searching unit 150b outputs the effect that deletion data does not exist (Step S463).

Meanwhile, when the priority of the tag key is the same as that of the input key at Step S457 (Step S457: Yes), the trie tree searching unit 150b moves the process control to Step S464 of FIG. 53.

The trie tree searching unit 150b determines whether data (value) to be deleted exists (Step S464). When data to be deleted does not exist (Step S465: No), the trie tree searching unit 150b outputs the effect that deletion data does not exist (Step S466).

On the other hand, when data to be deleted exists (Step S465: Yes), the trie tree searching unit 150b determines whether other data (value) exists (Step S467). When other data exists (Step S468: Yes), the trie tree searching unit 150b terminates the process.

On the other hand, when other data does not exist (Step S468: No), the trie tree searching unit 150b determines whether a child node exists (Step S469). When a child node does not exist (Step S470: No), the trie tree searching unit 150b deletes an edge for the present node of the parent node (releases connection) and deletes the present node (Step S471).

On the other hand, when a child node exists (Step S470: Yes), the trie tree searching unit 150b sets data of the eldest node as data of the present node (Step S472) to move to the eldest node (Step S473) and moves the process control to Step S469.

As described above, because one tag key is associated with one node and thus a node not having a tag key does not exist when the trie tree generating unit 150a creates the trie tree 140b, the retrieval device 100 according to the present embodiment can improve a memory utilization ratio.

Moreover, because a tag key having a low priority is registered in a node close to a root node when the trie tree generating unit 150a registers a tag key in each node of the trie tree 140b, the retrieval device 100 according to the present embodiment can narrow down a node region that is a comparison target and thus can improve the processing efficiency of a retrieval process when the trie tree searching unit 150b performs the retrieval process and the like.

In the meantime, among the processes described in the present embodiments, the whole or a part of processes that have been automatically performed can be manually performed. Alternatively, the whole or a part of processes that have been manually performed can be automatically performed in a well-known method. Also, processing procedures, control procedures, concrete titles, and information including various types of data and parameters, which are described in the document and the drawings, can be arbitrarily changed except that they are specially mentioned.

Each component of each device illustrated in the drawings is a functional concept. Therefore, these components are not necessarily constituted physically as illustrated in the drawings. In other words, the specific configuration of dispersion/integration of each device is not limited to the illustrated configuration. Therefore, all or a part of each device can dispersed or integrated functionally or physically in an optional unit in accordance with various types of loads or operating conditions. Furthermore, all or a part of each process function performed by each device can be realized by CPU and a program that is analyzed and executed by the CPU or can be realized by a hardware by wired logic.

Figure 54:
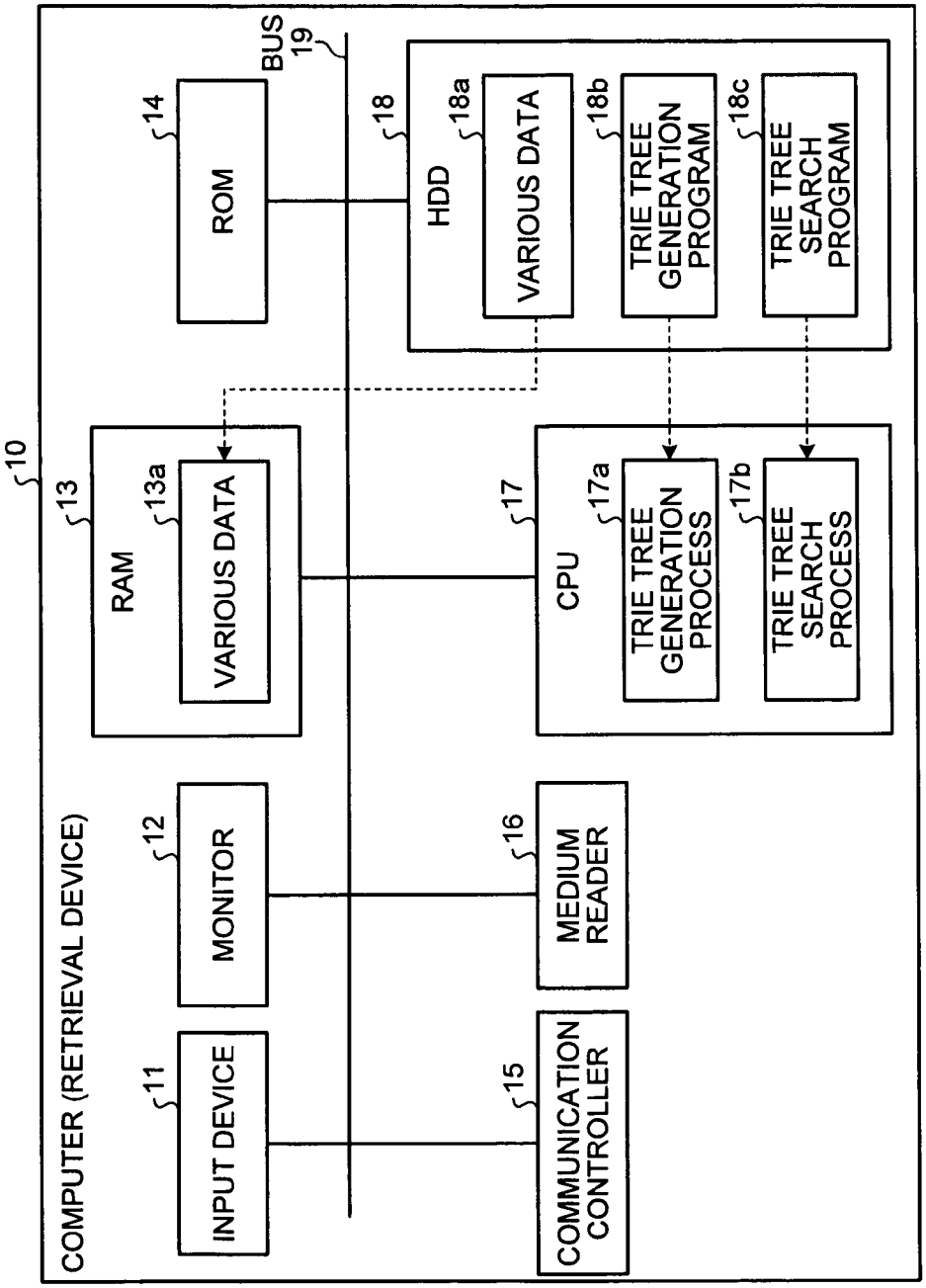
FIG. 54 is a diagram illustrating the hardware configuration of a computer corresponding to the retrieval device illustrated in the embodiment.

FIG. 54 is a diagram illustrating the hardware configuration of a computer 10 corresponding to the retrieval device 100 according to the present embodiment. As illustrated in FIG. 54, the computer (the retrieval device) 10 includes an input device 11, a monitor 12, an RAM (random access memory) 13, a ROM (read only memory) 14, a communication controller 15 that communicates with other devices via a network, a medium reader 16, a CPU (central processing unit) 17, and an HDD (hard disk drive) 18, which are connected via a bus 19.

The HDD 18 stores therein a trie tree generation program 18b and a trie tree search program 18c that has the same function as that of the retrieval device 100 described above. The CPU 17 reads and executes the trie tree generation program 18b and the trie tree search program 18c to start a trie tree generation process 17a and a trie tree search process 17b.

Herein, the trie tree generation process 17a corresponds to the trie tree generating unit 150a illustrated in FIG. 10. Moreover, the trie tree search process 17b corresponds to the trie tree searching unit 150b illustrated in FIG. 10.

The HDD 18 further stores therein various data 18a corresponding to the data stored in the storage unit 140 illustrated in FIG. 10. The CPU 17 reads out the various data 18a stored in the HDD 18, loads the various data in the RAM 13, and constructs a trie tree by using various data 13a.

As described above, according to an aspect of the present invention, because a computer associates one tag key with one node and removes a node not having a tag key by executing a program stored in a storage medium, a memory utilization ratio can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium that stores a program making a computer realize a character string registration function, the character string registration function comprising:

storing in a storage device a trie tree in which nodes corresponding to predetermined characters are connected in accordance with a tree structure;

reading out, characters of a new character string in sequence one-by-one from a head thereof to trace nodes included in the trie tree in accordance with characters corresponding to the nodes and determining a specific node that is located at a lowest side from nodes having an elder node among the traced nodes, the elder node and the specific node being located in a same layer and being connected to a same node that is directly located in a layer above the elder node and the specific node, the elder node being located at an upper side of the specific node;

reading out the characters of the new character string from the specific node sequentially;

determining whether a child node of the specific node exists by using a key of an initial character of the new character string when a priority of character string registered in the specific node is smaller than the priority of the new character string;

adding a new node as a child node of the specific node to be corresponded with the read character when the child node does not exist; and registering the new character string and the priority to the child node of the specific node, wherein a previous character string, registered previously in a last node that registered a character string most recently, is registered into the child node traced by the previous character string from the last node when the new character string, that is different from the character string previously registered and the previous character string can trace a child node from the last node, has registered into one of traced nodes, and the previous character string in the last node is registered into the new node that is added below the last node when the new character string, that is different from the character string previously registered and the previous character string cannot trace any child node from the last node, has registered into one of traced nodes.

2. The non-transitory computer-readable storage medium according to claim 1, wherein the character string registration function further comprises setting a priority to each character string registered in each node and registering each character string in each node on the basis of the priority.

3. The non-transitory computer-readable storage medium according to claim 2, wherein the program making the computer further realize a character string search function comprises:

reading out, when retrieving a search character string, characters of the search character string in sequence from a head thereof to trace the nodes of the trie tree;

determining a specific node that is located at a lowest side from nodes having an elder node among the traced nodes; and sequentially reading out the characters of the search character string from the specific node to retrieve a character string identical with the search character string from character strings registered in nodes included in a route up to a finally arriving node to arrive at finally.

4. The non-transitory computer-readable storage medium according to claim 3, wherein the character string registration function includes reading out the characters of the new character strings in sequence from the head to trace the nodes of the trie tree and determining a child node of a root node as the specific node when a node having an elder node does not exist among the traced nodes.

5. The non-transitory computer-readable storage medium according to claim 1, wherein the character string registration function includes reading out the characters of the new character strings in sequence from the head to trace the nodes of the trie tree and determining a child node of a root node as the specific node when a node having an elder node does not exist among the traced nodes.

6. The non-transitory computer-readable storage medium according to claim 1, wherein the character string registration function further comprises dividing the predetermined characters expressed with a bit stream into several bit streams and storing in the storage device the trie tree in which nodes corresponding to the divided bit streams are connected in accordance with the tree structure.

7. A trie tree generation method comprising:

storing in a storage device a trie tree in which nodes corresponding to predetermined characters are connected in accordance with a tree structure;

reading out characters of a new character string in sequence one-by-one from a head thereof to trace nodes included in the trie tree in accordance with characters corresponding to the nodes and determining a specific node that is located at a lowest side from nodes having an elder node among the traced nodes, the elder node and the specific node being located in a same layer and being connected to a same node that is directly located in a layer above the elder node and the specific node, the elder node being located at an upper side of the specific node;

reading out the characters of the new character string from the specific node sequentially;

determining whether a child node of the specific node exists by using a key of an initial character of the new character string when a priority of character string registered in the specific node is smaller than the priority of the new character string;

adding a new node as a child node of the specific node to be corresponded with the read character when the child node does not exist; and registering the new character string and the priority to the child node of the specific node, wherein a previous character string, registered previously in a last node that registered a character string most recently, is registered into the child node traced by the previous character string from the last node when the new character string, that is different from the character string previously registered and the previous character string can trace a child node from the last node, has registered into one of traced nodes, and the previous character string in the last node is registered into the new node that is added below the last node when the new character string, that is different from the character string previously registered and the previous character string cannot trace any child node from the last node, has registered into one of traced nodes.

8. The trie tree generation method according to claim 7, further comprising: setting a priority to each character string registered in each node and registering each character string in each node on the basis of the priority.

9. A trie tree generation device comprising:

a memory; and a processor coupled to the memory, wherein the processor executes a process comprising:

storing in a storage device a trie tree in which nodes corresponding to predetermined characters are connected in accordance with a tree structure;

reading out, characters of a new character string in sequence one-by-one from a head thereof to trace nodes included in the trie tree in accordance with characters corresponding to the nodes and determining a specific node that is located at a lowest side from nodes having an elder node among the traced nodes, the elder node and the specific node being located in a same layer and being connected to a same node that is directly located in a layer above the elder node and the specific node, the elder node being located at an upper side of the specific node;

reading out the characters of the new character string from the specific node sequentially;

determining whether a child node of the specific node exists by using a key of an initial character of the new character string when a priority of character string registered in the specific node is smaller than the priority of the new character string;

adding a new node as a child node of the specific node to be corresponded with the read character when the child node does not exist; and registering the new character string and the priority to the child node of the specific node, wherein a previous character string, registered previously in a last node that registered a character string most recently, is registered into the child node traced by the previous character string from the last node when the new character string, that is different from the character string previously registered and the previous character string can trace a child node from the last node, has registered into one of traced nodes, and the previous character string in the last node is registered into the new node that is added below the last node when the new character string, that is different from the character string previously registered and the previous character string cannot trace any child node from the last node, has registered into one of traced nodes.

10. The trie tree generation device according to claim 9, wherein the process further comprises setting a priority to each character string registered in each node and registering each character string in each node on the basis of the priority.

11. The trie tree generation device according to claim 9, wherein the process further comprises dividing the predetermined characters expressed with a bit stream into several bit streams and storing in the storage device the trie tree in which nodes corresponding to the divided bit streams are connected in accordance with the tree structure.

12. The non-transitory computer-readable storage medium according to claim 1, wherein the adding assigns the new node that has a smaller priority closer to a root node.

* * * * *